US008376600B2

(12) United States Patent
Bartol et al.

(10) Patent No.: US 8,376,600 B2
(45) Date of Patent: Feb. 19, 2013

(54) LIGHTING DEVICE

(75) Inventors: Anthony J. Bartol, Plymouth, WI (US); Neal R. Verfuerth, Plymouth, WI (US); Jun Wang, Sheboygan, WI (US); Brandon J. King, Manitowoc, WI (US)

(73) Assignee: Orion Energy Systems, Inc., Manitowoc, WI (US)

( * ) Notice: Subject to any disclaimer, the term of this patent is extended or adjusted under 35 U.S.C. 154(b) by 698 days.

(21) Appl. No.: 12/559,240

(22) Filed: Sep. 14, 2009

(65) Prior Publication Data

US 2010/0061088 A1 Mar. 11, 2010

Related U.S. Application Data

(63) Continuation-in-part of application No. 11/771,317, filed on Jun. 29, 2007, now Pat. No. 7,638,743.

(51) Int. Cl.
*G02B 17/00* (2006.01)
*G02B 21/00* (2006.01)

(52) U.S. Cl. ............ 362/557; 362/1; 362/145; 362/267; 362/555; 362/558; 362/576; 359/597

(58) Field of Classification Search ................. 52/173.3, 52/200; 359/591, 597, 641; 362/1, 145, 362/184, 235, 267, 296.01, 557, 558, 576, 362/555
See application file for complete search history.

(56) References Cited

U.S. PATENT DOCUMENTS

| | | | |
|---|---|---|---|
| 1,254,520 | A | 1/1918 | Macduff |
| 2,403,240 | A | 12/1943 | Sawin |
| 2,485,148 | A | 10/1949 | Fralin |
| 2,636,977 | A | 4/1953 | Foster |
| 3,292,319 | A | 12/1966 | Mccarthy |
| 3,337,035 | A | 8/1967 | Pennbacker |
| 3,416,266 | A | 12/1968 | Eron |
| 3,511,559 | A | 5/1970 | Foster |
| 4,023,043 | A | 5/1977 | Stevenson |
| 4,114,186 | A | 9/1978 | Dominguez |
| 4,135,181 | A | 1/1979 | Bogacki et al. |
| 4,144,462 | A | 3/1979 | Sieron et al. |
| 4,190,800 | A | 2/1980 | Kelly et al. |

(Continued)

FOREIGN PATENT DOCUMENTS

| | | |
|---|---|---|
| GB | 2 237 826 | 5/1991 |
| GB | 2 250 172 | 11/1991 |

(Continued)

OTHER PUBLICATIONS

"About Sun Dome Tubular Skylights," having a date indication of © 2009, 8 pages.

(Continued)

*Primary Examiner* — Stephen F Husar
(74) *Attorney, Agent, or Firm* — Foley & Lardner LLP

(57) ABSTRACT

A lighting device includes a substantially cylindrical tube defining an interior and an exterior, and a longitudinal axis extending between a first end and a second end. The first end of the tube defines a substantially cylindrical opening disposed in a plane at a first angle that is substantially perpendicular to the longitudinal axis, and the second end of the tube defines a substantially elliptical opening disposed in a plane at a second angle that is substantially non-perpendicular to the longitudinal axis. A reflective surface is provided on the interior of the tube, and a substantially cylindrical flashing is provided about the exterior of the tube. A substantially transparent dome is coupled to the tube proximate the first end, and a diffuser is coupled to the tube proximate the second end.

49 Claims, 46 Drawing Sheets

U.S. PATENT DOCUMENTS

| | | | |
|---|---|---|---|
| 4,204,194 A | 5/1980 | Bogacki | |
| 4,204,195 A | 5/1980 | Bogacki | |
| 4,306,769 A | 12/1981 | Martinet | |
| 4,360,881 A | 11/1982 | Martinson | |
| 4,387,417 A | 6/1983 | Plemmons et al. | |
| 4,489,386 A | 12/1984 | Breddan | |
| 4,727,593 A | 2/1988 | Goldstein | |
| 4,733,505 A | 3/1988 | Van Dame | |
| 4,809,468 A | 3/1989 | Bareiss | |
| 4,841,914 A | 6/1989 | Chattan | |
| 4,860,511 A | 8/1989 | Weisner et al. | |
| 4,883,340 A | 11/1989 | Dominguez | |
| 5,099,622 A | 3/1992 | Sutton | |
| 5,253,444 A | 10/1993 | Donoho et al. | |
| 5,261,179 A | 11/1993 | Schwinler | |
| 5,353,543 A | 10/1994 | Teraoka | |
| 5,371,661 A | 12/1994 | Simpson | |
| 5,426,620 A | 6/1995 | Budney | |
| 5,546,712 A | 8/1996 | Bixby | |
| 5,572,438 A | 11/1996 | Ehlers et al. | |
| 5,598,042 A | 1/1997 | Mix et al. | |
| 5,644,173 A | 7/1997 | Elliason et al. | |
| 5,649,394 A | 7/1997 | Ohba | |
| 5,655,339 A | 8/1997 | DeBlock et al. | |
| 5,713,160 A | 2/1998 | Heron | |
| 5,717,609 A | 2/1998 | Packa et al. | |
| 5,729,387 A | 3/1998 | Takahashi et al. | |
| 5,758,331 A | 5/1998 | Johnson | |
| 5,836,114 A | 11/1998 | Ohba | |
| 5,918,404 A | 7/1999 | Ohba | |
| 5,956,462 A | 9/1999 | Langford | |
| 5,962,989 A | 10/1999 | Baker | |
| 6,003,471 A | 12/1999 | Ohba | |
| 6,122,603 A | 9/2000 | Budike, Jr. | |
| 6,169,979 B1 | 1/2001 | Johnson | |
| 6,257,735 B1 | 7/2001 | Baar | |
| D447,266 S | 8/2001 | Verfuerth | |
| 6,363,667 B2 | 4/2002 | O'Neill | |
| 6,367,419 B1 | 4/2002 | Gosselin | |
| 6,418,674 B1 | 7/2002 | Deraedt | |
| D463,059 S | 9/2002 | Verfuerth | |
| 6,467,933 B2 | 10/2002 | Baar | |
| 6,528,957 B1 | 3/2003 | Luchaco | |
| 6,535,859 B1 | 3/2003 | Yablonowski et al. | |
| 6,585,396 B1 | 7/2003 | Verfuerth | |
| D479,826 S | 9/2003 | Verfuerth et al. | |
| 6,622,097 B2 | 9/2003 | Hunter | |
| 6,633,823 B2 | 10/2003 | Bartone et al. | |
| 6,644,836 B1 | 11/2003 | Adams | |
| D483,332 S | 12/2003 | Verfuerth | |
| 6,717,660 B1 | 4/2004 | Bernardo | |
| D494,700 S | 8/2004 | Hartman et al. | |
| 6,785,592 B1 | 8/2004 | Smith et al. | |
| 6,813,864 B2 | 11/2004 | Landis | |
| 6,828,695 B1 | 12/2004 | Hansen | |
| 6,832,135 B2 | 12/2004 | Ying | |
| 6,938,210 B1 | 8/2005 | Huh | |
| 6,979,097 B2 | 12/2005 | Elam et al. | |
| 6,983,210 B2 | 1/2006 | Matsubayashi et al. | |
| 7,027,736 B1 | 4/2006 | Mier-Langner et al. | |
| 7,130,832 B2 | 10/2006 | Bannai et al. | |
| 7,167,777 B2 | 1/2007 | Budike, Jr. | |
| 7,264,177 B2 | 9/2007 | Buck et al. | |
| D557,817 S | 12/2007 | Verfuerth et al. | |
| D560,469 S | 1/2008 | Bartol et al. | |
| 7,369,056 B2 | 5/2008 | McCollough, Jr. | |
| 7,401,942 B1 | 7/2008 | Verfuerth et al. | |
| 7,518,531 B2 | 4/2009 | Butzer et al. | |
| D595,894 S | 7/2009 | Verfuerth et al. | |
| 7,563,006 B1 | 7/2009 | Verfuerth et al. | |
| 7,575,338 B1 | 8/2009 | Verfuerth | |
| D606,697 S | 12/2009 | Verfuerth et al. | |
| 7,628,506 B2 | 12/2009 | Verfuerth et al. | |
| 7,638,743 B2 | 12/2009 | Bartol et al. | |
| 7,639,423 B2 * | 12/2009 | Kinney et al. | 359/591 |
| D617,028 S | 6/2010 | Verfuerth et al. | |
| D617,029 S | 6/2010 | Verfuerth et al. | |
| 7,746,003 B2 | 6/2010 | Verfuerth et al. | |
| 7,762,861 B2 | 7/2010 | Verfuerth et al. | |
| D621,410 S | 8/2010 | Verfuerth et al. | |
| D621,411 S | 8/2010 | Verfuerth et al. | |
| 7,780,310 B2 | 8/2010 | Verfuerth et al. | |
| 7,784,966 B2 | 8/2010 | Verfuerth et al. | |
| D623,340 S | 9/2010 | Verfuerth et al. | |
| 7,847,706 B1 | 12/2010 | Ross et al. | |
| D632,006 S | 2/2011 | Verfuerth et al. | |
| 8,033,686 B2 | 10/2011 | Recker et al. | |
| D650,225 S | 12/2011 | Bartol et al. | |
| 8,070,312 B2 | 12/2011 | Verfuerth et al. | |
| 8,138,690 B2 | 3/2012 | Chemel et al. | |
| 2001/0055965 A1 | 12/2001 | Delp et al. | |
| 2002/0082748 A1 | 6/2002 | Enga et al. | |
| 2002/0103655 A1 | 8/2002 | Boies et al. | |
| 2002/0162032 A1 | 10/2002 | Gundersen et al. | |
| 2002/0172049 A1 | 11/2002 | Yueh | |
| 2003/0011486 A1 | 1/2003 | Ying | |
| 2003/0016143 A1 | 1/2003 | Ghazarian | |
| 2003/0036820 A1 | 2/2003 | Yellepeddy et al. | |
| 2003/0041017 A1 | 2/2003 | Spool et al. | |
| 2003/0041038 A1 | 2/2003 | Spool et al. | |
| 2003/0046252 A1 | 3/2003 | Spool et al. | |
| 2003/0084358 A1 | 5/2003 | Bresniker et al. | |
| 2003/0084359 A1 | 5/2003 | Bresniker et al. | |
| 2003/0093332 A1 | 5/2003 | Spool et al. | |
| 2003/0171851 A1 | 9/2003 | Brickfield et al. | |
| 2003/0179577 A1 | 9/2003 | Marsh | |
| 2004/0006439 A1 | 1/2004 | Hunter | |
| 2004/0024483 A1 | 2/2004 | Holcombe | |
| 2004/0076001 A1 | 4/2004 | Lutes | |
| 2004/0078153 A1 | 4/2004 | Bartone et al. | |
| 2004/0078154 A1 | 4/2004 | Hunter | |
| 2004/0083163 A1 | 4/2004 | Cooper | |
| 2004/0095237 A1 | 5/2004 | Chen et al. | |
| 2004/0128266 A1 | 7/2004 | Yellepeddy et al. | |
| 2004/0193329 A1 | 9/2004 | Ransom et al. | |
| 2005/0027636 A1 | 2/2005 | Gilbert et al. | |
| 2005/0034023 A1 | 2/2005 | Maturana et al. | |
| 2005/0035717 A1 | 2/2005 | Adamson et al. | |
| 2005/0038571 A1 | 2/2005 | Brickfield et al. | |
| 2006/0044152 A1 | 3/2006 | Wang | |
| 2006/0065750 A1 | 3/2006 | Fairless | |
| 2006/0085301 A1 | 4/2006 | Leahy | |
| 2007/0145915 A1 | 6/2007 | Roberge et al. | |
| 2008/0143273 A1 | 6/2008 | Davidson et al. | |
| 2008/0147465 A1 | 6/2008 | Raines et al. | |
| 2008/0183337 A1 | 7/2008 | Szabados | |
| 2008/0266664 A1 | 10/2008 | Winston et al. | |
| 2008/0275802 A1 | 11/2008 | Verfuerth et al. | |
| 2009/0000217 A1 | 1/2009 | Verfuerth et al. | |
| 2009/0147507 A1 | 6/2009 | Verfuerth et al. | |
| 2009/0243517 A1 | 10/2009 | Verfuerth et al. | |
| 2009/0248217 A1 | 10/2009 | Verfuerth et al. | |
| 2009/0299811 A1 | 12/2009 | Verfuerth et al. | |
| 2009/0315485 A1 | 12/2009 | Verfuerth et al. | |
| 2010/0061088 A1 | 3/2010 | Bartol et al. | |
| 2010/0246168 A1 | 9/2010 | Verfuerth et al. | |
| 2011/0060701 A1 | 3/2011 | Verfuerth et al. | |
| 2011/0146669 A1 | 6/2011 | Bartol et al. | |
| 2011/0235317 A1 | 9/2011 | Verfuerth et al. | |
| 2011/0279063 A1 | 11/2011 | Wang et al. | |
| 2012/0037725 A1 | 2/2012 | Verfuerth | |
| 2012/0038281 A1 | 2/2012 | Verfuerth | |
| 2012/0038490 A1 | 2/2012 | Verfuerth | |
| 2012/0040606 A1 | 2/2012 | Verfuerth | |
| 2012/0044350 A1 | 2/2012 | Verfuerth | |

FOREIGN PATENT DOCUMENTS

| | | |
|---|---|---|
| JP | 05-336868 | 12/1993 |
| JP | 2010-046091 | 3/2010 |
| WO | WO-2004/023849 | 3/2004 |
| WO | WO 2004/023849 A1 | 3/2004 |

OTHER PUBLICATIONS

Notice of Acceptance (NOA) from Miami-Dade County, Building Code Compliance Office, Product Control Division, Approval Date Dec. 13, 2007, 2 pages.

Sun-Dome /Tubular Skylight, Daylighting Technologies, Riviera Beach, FL, revision Oct. 22, 2007, 1 page.
US Office Action for U.S. Appl. No. 11/771,317 dated Jun. 10, 2009.
US Office Action for U.S. Appl. No. 12/203,825 dated Feb. 2, 2011.
U.S. Appl. No. 13/249,001, filed Sep. 29, 2011, Verfuerth et al.
U.S. Appl. No. 13/275,536, filed Oct. 18, 2011, Verfuerth et al.
U.S. Appl. No. 13/296,058, filed Nov. 14, 2011, Verfuerth et al.
U.S. Appl. No. 13/333,293, filed Dec. 21, 2011, Verfuerth et al.
U.S. Appl. No. 61/466,411, filed Mar. 22, 2011, Verfuerth et al.
Deru et al.; BigHorn Home Improvement Center Energy Performance; ASHRAE Transactions, Atlanta: 2006 vol. 112, 26 pages.
Halliday, D., et al., Physics Part I and II; John Wiley& Sons, Inc. 1967 (9 pgs.).
Harris, L. R., et al., "Pacific Northwest Laboratory's Lighting Technology Screening Matrix," PNL-SA-23871, Apr. 1994, U.S. Department of Energy, Pacific Northwest Laboratory, Richland, Washington 99352, pp. 1-14.
Office Action on U.S. Appl. No. 13/223,129, mail date Oct. 2, 2012, 10 pages.
Office Action on U.S. Appl. No. 13/223,135, mail date Oct. 4, 2012, 10 pages.
Office Action on U.S. Appl. No. 13/223,146, mail date Oct. 22, 2012, 13 pages.
Office Action on U.S. Appl. No. 13/223,149, mail date Nov. 8, 2012, 11 pages.
Office Action on U.S. Appl. No. 13/223,151, mail date Oct. 4, 2012, 10 pages.
Office Action on U.S. Appl. No. 13/453,805, mail date Nov. 23, 2012, 17 pages.

* cited by examiner

FIG. 9a
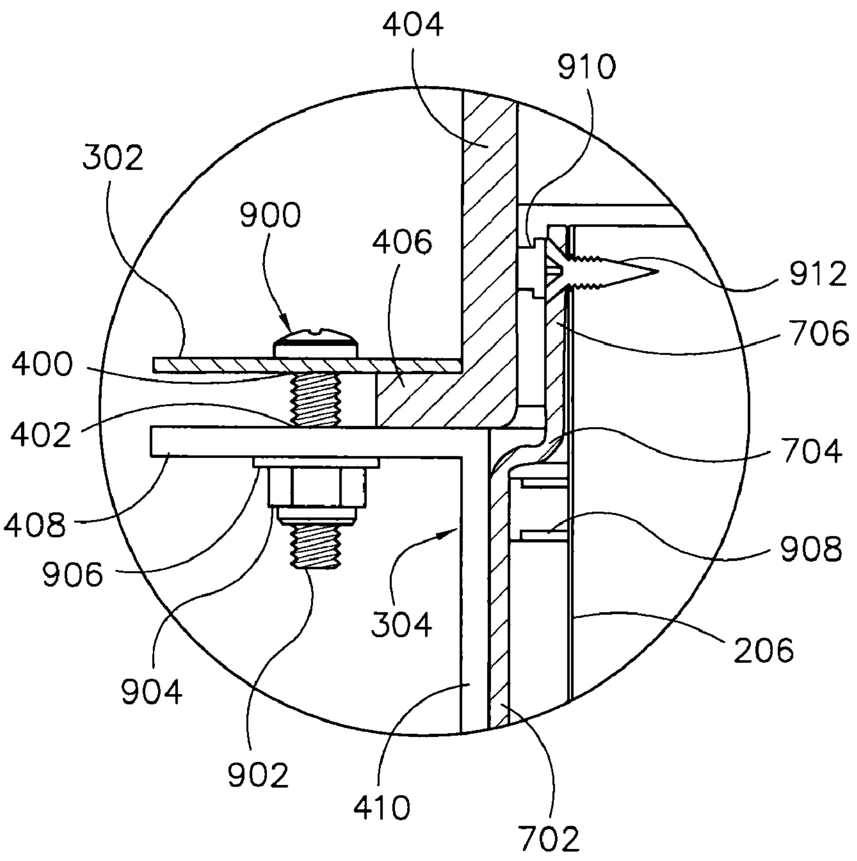
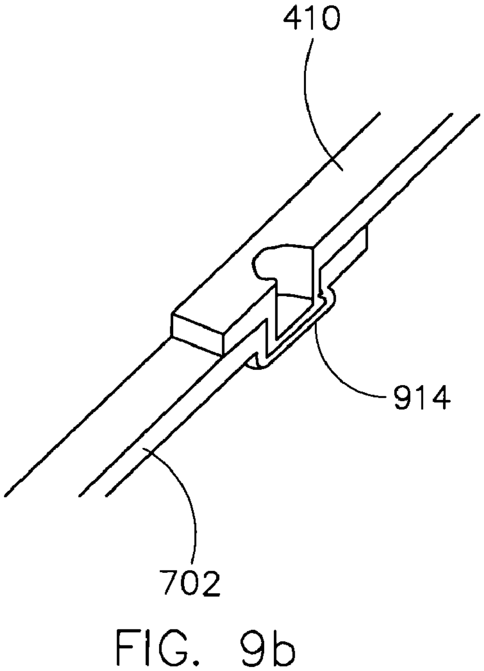
FIG. 9b

LIGHTING DEVICE

CROSS-REFERENCE TO RELATED APPLICATIONS

The present Application claims the benefit of priority as a continuation-in-part of co-pending U.S. patent application Ser. No. 11/771,317 titled "Method and System for Controlling a Lighting System" filed on Jun. 29, 2007, the disclosure of which is hereby incorporated by reference in its entirety.

FIELD

The field of the disclosure relates generally to energy conservation. More specifically, the disclosure relates to lighting devices that convey light from a source (e.g. sunlight or light from other sources) to an environment (e.g. a room or other interior space such as within a building or the like). More particularly, the disclosure relates to a lighting device, such as a light pipe, having a supplemental light source. More particularly, the disclosure also relates to a lighting device, such as a light pipe, having an angled diffuser for distribution of light within the environment.

BACKGROUND

According to the International Energy Outlook 2006, Report No. DOE/EIA-0484(2006) from the U.S. Dept. of Energy, the world's total net electricity consumption is expected to more than double during the period 2003-2030. Much of the electricity is expected to be used to provide commercial and residential lighting. Adoption of energy-efficient technologies can help to conserve electricity thereby slowing the growth in both the "peak demand" and "base demand" components of electricity demand. Base demand is the steady-state, or average, demand for electricity, while peak demand occurs when the demand for electricity is the greatest, for example, during a hot summer day when electricity use for air conditioning is very high. Reducing either type of demand is desirable, but a reduction in peak demand generally is more valuable because of the relatively high unit cost of the capacity required to provide the peak demand.

One way to conserve energy is to replace existing light fixtures that use older, less-efficient lighting technologies with light fixtures that use newer, more efficient lighting technologies. For example, highly efficient compact fluorescent light fixtures are commonly used to replace less-efficient incandescent lamps in existing household fixtures. To further reduce electricity demand, one or more light pipes may be incorporated into a wall or roof of a building. A light pipe distributes natural light from a source such as the sun or moon into an interior space. However, the generally known light pipes tend to distribute light in a generally downward manner (e.g. from a ceiling and onto a floor of the interior space). What is needed is a lighting device that can distribute light more accurately to other areas within the interior space to provide a more uniform distribution of light.

SUMMARY

In an exemplary embodiment, a lighting device includes a substantially cylindrical tube defining an interior and an exterior, and a longitudinal axis extending between a first end and a second end. The first end of the tube defines a substantially cylindrical opening disposed in a plane at a first angle that is substantially perpendicular to the longitudinal axis, and the second end of the tube defines a substantially elliptical opening disposed in a plane at a second angle that is substantially non-perpendicular to the longitudinal axis. A reflective surface is provided on the interior of the tube, and a substantially cylindrical flashing is provided about the exterior of the tube. A substantially transparent dome is coupled to the tube proximate the first end, and a diffuser is coupled to the tube proximate the second end.

In another exemplary embodiment, a lighting device includes a tube defining an interior and an exterior, and a longitudinal axis extending between a first end and a second end, where the first end of the tube configured to receive light from a light source, and the second end of the tube configured to emit light to an interior of a building. A reflective surface is disposed on the interior of the tube, and a flashing is disposed about the exterior of the tube. A substantially transparent dome is coupled to the tube proximate the first end, and a diffuser is coupled to the tube at an angle that is non-perpendicular to the longitudinal axis and configured to direct the light into the interior of the building in a direction that is non-parallel to the longitudinal axis.

In another exemplary embodiment, a method of making a lighting device is disclosed. The method including the steps of providing a tube defining an interior with a reflective surface and an exterior, and a longitudinal axis extending between a first end and a second end, the first end of the tube configured to receive light from a light source, and the second end of the tube configured to transmit the light to an interior of a building, and coupling a flashing about the exterior of the tube, and coupling a dome to the flashing proximate the first end of the tube, and providing at least one projection extending inwardly toward the axis and disposed proximate the second end of the tube, and supporting a diffuser at least temporarily on the projection, and applying a bead of a hot melt silicone material substantially along an interface between the second end of the tube and the perimeter of the diffuser, and curing the hot melt silicone material while the diffuser is supported on the projection.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements.

FIG. 9*a* depicts a detailed cross sectional side view of the mounting between a light collection system and the reflective tube of the light pipe system of FIG. 2*a* in accordance with an exemplary embodiment.

FIG. 9*b* depicts a detailed cross sectional side view of the mounting between a flashing and a mounting flange of the light pipe system of FIG. 2*a* in accordance with an exemplary embodiment.

DETAILED DESCRIPTION

Figure 1:
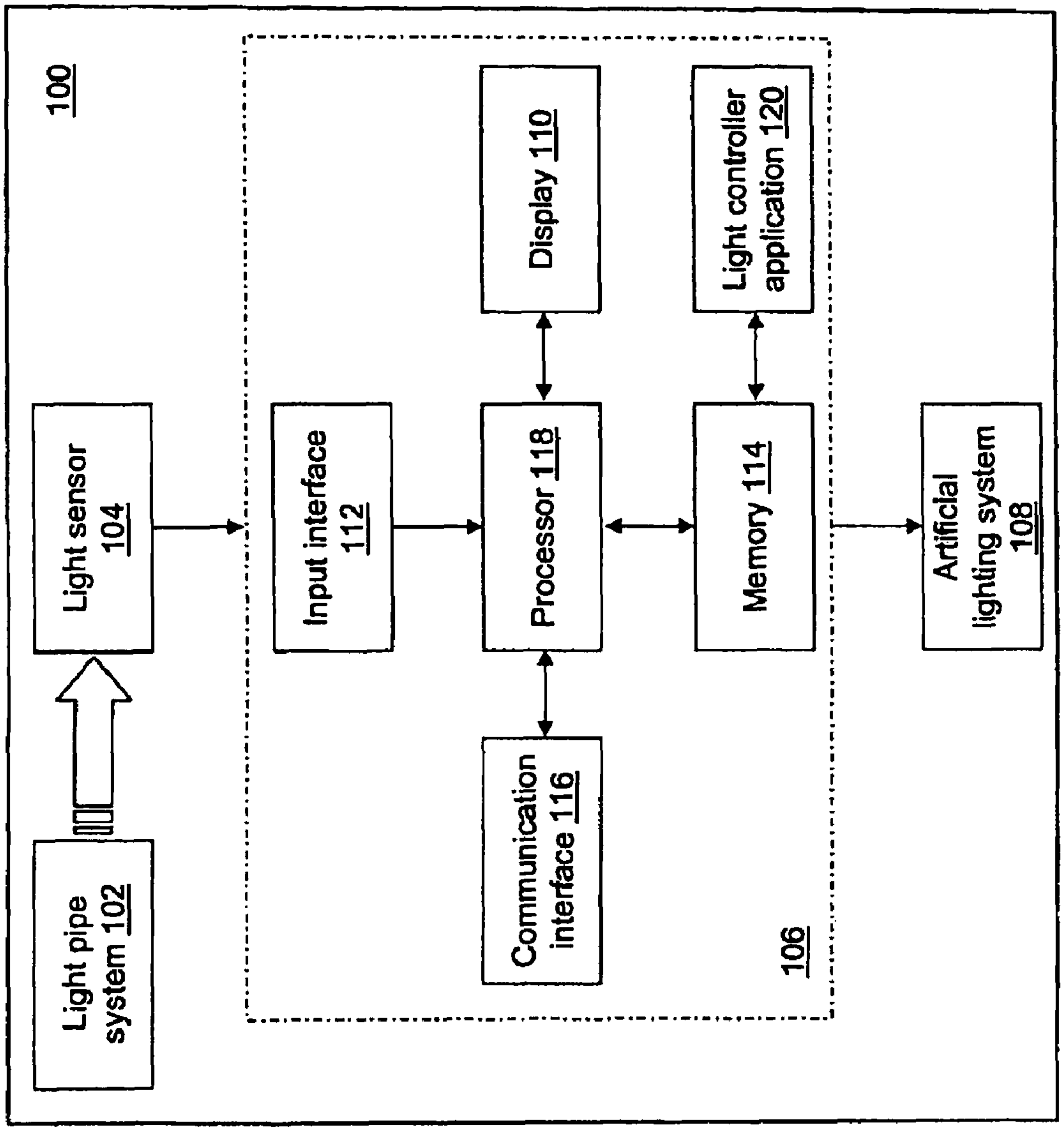
FIG. 1 depicts a block diagram of an automated lighting system including both natural and artificial lighting systems in accordance with an exemplary embodiment.

With reference to FIG. 1, a block diagram of an automated lighting system 100 which includes both natural and artificial lighting systems is shown in accordance with an exemplary embodiment. Automated lighting system 100 may include a light pipe system 102, a light sensor 104, a controller 106, and an artificial lighting system 108. Other natural lighting systems may be included such as skylights, windows, etc. Light pipe system 102 provides natural light from the sun or moon to an interior space. Light sensor 104 measures a light level in the interior space. For example, a light level may indicate a brightness using a numerical or relative scale. Light sensor 104 may be positioned to measure the light level at or near a specific area of the interior space, such as a work area. Controller 106 controls artificial lighting system 108 based on the measured light level. Artificial lighting system 108 may include lighting systems of different types, manufactures, and models.

Controller 106 may include a display 110, an input interface 112, a memory 112, a communication interface 116, a processor 118, and a light controller application 120. Different and additional components may be incorporated into controller 106. Display 110 presents information to a user of controller 106 as known to those skilled in the art. For example, display 110 may be a thin film transistor display, a light emitting diode display, a liquid crystal display, or any of a variety of different displays known to those skilled in the art now or in the future.

Input interface 112 provides an interface for receiving information from the user for entry into controller 106 as known to those skilled in the art. Input interface 112 may use various input technologies including, but not limited to, a keypad, a keyboard, a pen and touch screen, a mouse, a track ball, a touch screen, one or more buttons, a rotary dial, etc. to allow the user to enter information into controller 106 or to make selections presented in a user interface displayed on display 110. Input interface 112 may provide both an input and an output interface. For example, a touch screen both allows user input and presents output to the user. Controller 106 may have one or more input interfaces that use the same or a different technology.

Memory 114 is an electronic holding place or storage for information so that the information can be accessed by processor 118 as known to those skilled in the art. Controller 106 may have one or more memories that use the same or a different memory technology. Memory technologies include, but are not limited to, any type of RAM, any type of ROM, any type of flash memory, etc. Controller 106 also may have one or more drives that support the loading of a memory media such as a compact disk, digital video disk, or a flash stick.

Communication interface 116 provides an interface for receiving and transmitting data between devices using various protocols, transmission technologies, and media as known to those skilled in the art. The communication interface may support communication using various transmission media that may be wired or wireless. Controller 106 may include a plurality of communication interfaces that use the same or a different transmission technology.

Processor 118 executes instructions as known to those skilled in the art. The instructions may be carried out by a special purpose computer, logic circuits, or hardware circuits. Thus, processor 118 may be implemented in hardware, firmware, software, or any combination of these methods. The term “execution” is the process of running an application or the carrying out of the operation called for by an instruction. The instructions may be written using one or more programming language, scripting language, assembly language, etc. Processor 118 executes an instruction, meaning that it performs the operations called for by that instruction. Processor 118 operably couples with display 110, with input interface 112, with memory 114, and with communication interface 116 to receive, to send, and to process information. Processor 118 may retrieve a set of instructions from a permanent memory device and copy the instructions in an executable form to a temporary memory device that is generally some form of RAM. Controller 106 may include a plurality of processors that use the same or a different processing technology.

Light controller application 120 performs operations associated with controlling a light level of an interior space. The operations may be implemented using hardware, firmware, software, or any combination of these methods. With reference to the exemplary embodiment of FIG. 1, light controller application 120 is implemented in software stored in memory 114 and accessible by processor 118 for execution of the instructions that embody the operations of light controller application 120. Light controller application 120 may be written using one or more programming languages, assembly languages, scripting languages, etc.

Light sensor 104 and controller 106 may be integrated into a single device. Light sensor 104 and controller 106 may be connected directly. For example, light sensor 104 may connect to controller 106 using a cable. Additionally, light sensor 104 may connect to controller 106 using a network that may be wired or wireless.

Figure 2A:
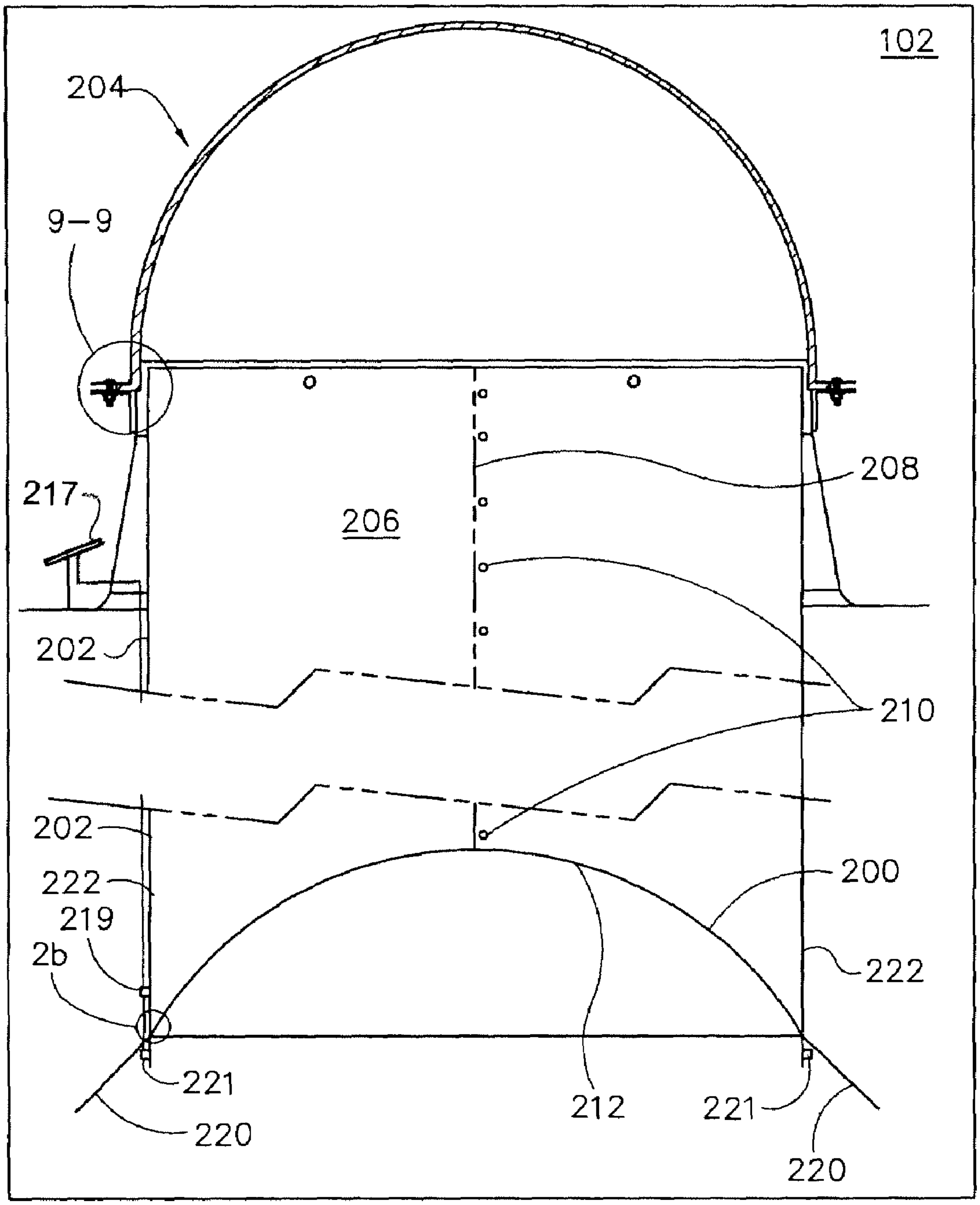
FIG. 2*a* depicts a cross sectional side view of light pipe system providing natural light in the automated lighting system of FIG. 1 in accordance with an exemplary embodiment.

With reference to FIG. 2*a*, a light pipe system 102 is shown in accordance with an exemplary embodiment. In an exemplary embodiment, light pipe system 102 is formed of components having a generally circular shape though other shapes may be used without limitation. Light pipe system 102 may include a diffuser 200, a reflective tube 202, and a light collection system 204. Reflective tube 202 is a sheet of highly efficient, reflective material. For example, silver coated aluminum, MIRO®, etc. may be used as known to those skilled in the art. The sheet of reflective material is rolled to form a tube having a wall 206 and joined along an joint 208. In an exemplary embodiment, the joint 208 is joined using rivets 210 though other fastening methods and mechanisms may be used without limitation. Aluminum tape may be placed over the rivets 210. Reflective tube 202 may be formed to have a variety of lengths and to form a tube having a variety of diameters based on the characteristics of diffuser 200, of light collection system 204, of the roofing/wall defining the interior space, and of the interior space to be lit.

Figure 2B:
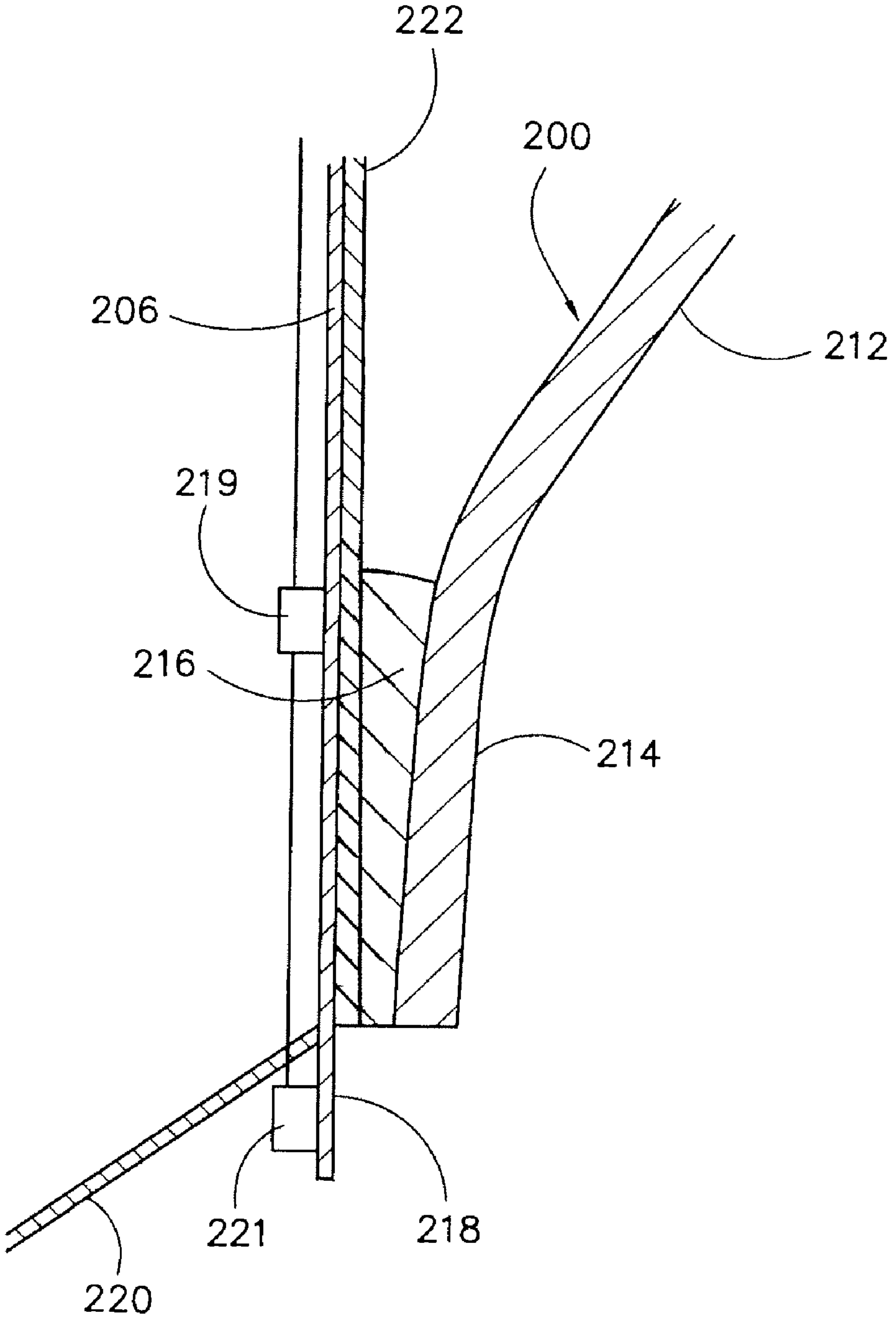
FIG. 2*b* depicts a detailed side cross sectional view of the mounting between a diffuser and a reflective tube of the light pipe system of FIG. 2*a* in accordance with an exemplary embodiment.

Diffuser 200 may be a prismatic diffuser. In the exemplary embodiment of FIG. 2*a*, diffuser 200 is mounted within reflective tube 202 so that a concave portion 212 is concave relative to the interior space. With reference to FIG. 2*b*, diffuser 200 may include concave portion 212 and a tapered portion 214. Tapered portion 214 extends from concave portion 212 to transition a concave surface of concave portion 212 to form an approximately parallel surface to reflective tube 202. A caulk 216 may be used to seal diffuser 200 within wall 206 of reflective tube 202 to reduce condensation, dust, heat loss, and the build-up of other materials within an interior space formed by wall 206 of reflective tube 202. Caulk 216 may comprise a silicone material, such as hot melt silicone intended to provide superior adhesion and strength to the assembly. In an exemplary embodiment, no fastener is used to mount diffuser 200 within reflective tube 202. A bead of caulk 216 may be applied to an inner surface of wall 206 of reflective tube 202 near a mounting edge 218. Mounting edge 218 of wall 206 of reflective tube 202 may be positioned over diffuser 200 with concave portion 212 positioned as shown in FIGS. 2*a* and 2*b*. As wall 206 of reflective tube 202 is positioned adjacent tapered portion 214 of diffuser 200, caulk 216 fills any gap between wall 206 of reflective tube 202 and tapered portion 214 of diffuser 200. As used herein, the term “mount” includes join, unite, connect, associate, insert, hang, hold, affix, attach, fasten, bind, paste, secure, bolt, screw, rivet, solder, weld, and other like terms.

With continuing reference to FIGS. 2*a* and 2*b*, light pipe system 102 may further include a cone skirt 220 and reflector 222. Cone skirt 220 may be formed of a reflective material. Cone skirt 220 may be mounted to light pipe system 102 or may be mounted to an interior surface of the roofing/wall. Cone skirt 220 directs light toward the interior space to be lit.

Reflector 222 may be formed of a white reflective material such as Anolux® manufactured by Anofol S.r.l. of Italy. Reflector 222 may be positioned on an interior surface of reflective tube 202 above or adjacent to or overlapping caulk with 216. In an exemplary embodiment, reflector 222 may have a length of approximately twelve inches. Reflector 222 reduces glare from diffuser 200 an increases light to the floor area.

Figure 2C:
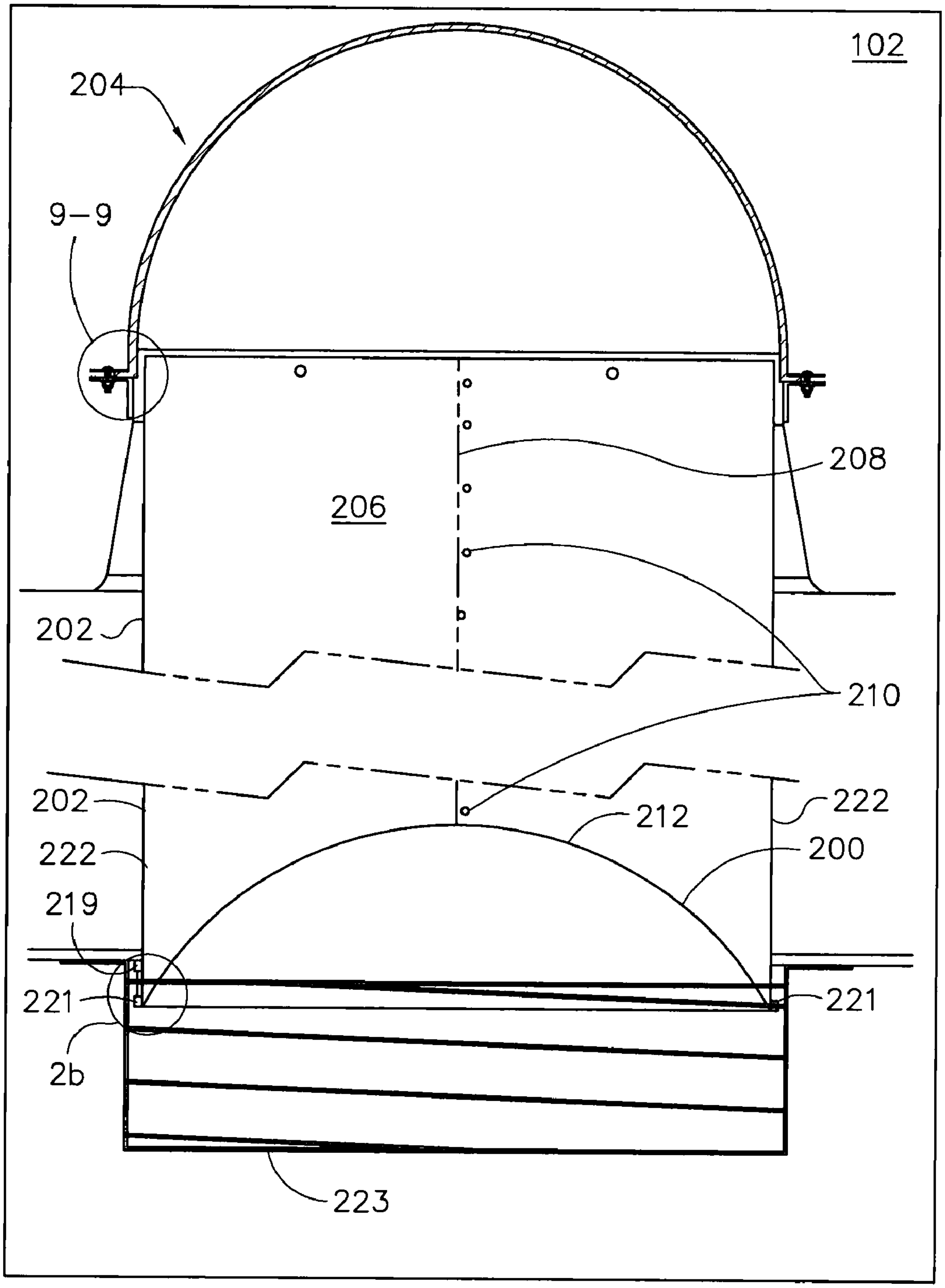
FIG. 2*c* depicts a cross sectional side view of light pipe system providing natural light in the automated lighting system of FIG. 1 in accordance with another exemplary embodiment.

With reference to FIGS. 2*a*-2*c*, the wall 206 of reflective tube 202 may include an artificial light source 221 disposed at or proximate a lower edge of the wall 206 (shown for example as substantially surrounding the outer perimeter of tube 202 at a lower end of wall 206). Such artificial light source 221 may comprise an LED light in the form of a ring or string provided about the tube 202. The light source 221 may be formed integrally with the tube 202, or attached separately as a new installation, or may facilitate use as an optional feature or as a retrofit on existing light pipe systems. The LED's may be attached using any suitable method or mounting arrangement, such as adhesive, ring-clamp, band, strap, mounting frame, etc. The LEDs may be attached directly to the wall 206 of tube 202, or may be coupled indirectly by use of a supplemental LED mounting surface or device such as a bracket or other suitable fixture for positioning the LEDs at a suitable location for providing a desired light dispersion pattern. The optics for dispersing the light from light source 221 are shown according to one embodiment as including the light source 221 disposed about an outside perimeter of tube 202 such that light emitted from light source 221 is reflected by reflector 222 of cone skirt 220, so that the emitted light is directed downward toward the interior space in a desired pattern. Such a pattern may include emitting the light in a generally radially outward direction from the light pipe and reflecting the emitted light in a downward and generally radially opposite direction by the reflector 222. According to alternative embodiments, other optics, configurations or reflective patterns may be used to obtain a desired light distribution from the supplemental light source. In addition, other devices such as lenses or other forms of reflective devices may be used. Portions of the tube wall 206 and/or the reflector 220 and/or any supplemental LED mounting surface or device may have a high-emissivity coating or material applied thereto and intended to better reject heat generated by the LEDs. According to one embodiment, coating may be a paint, tape, or other suitable layer of a high emissivity material disposed on the reflector and/or the tube proximate the location of the LEDs to provide the desired heat rejection performance. In the event that the LEDs are secured in place by a clamp, frame, or other suitable component, such component may also include the high emissivity coating.

According to one embodiment, light source 221 is intended to provide supplemental lighting to supplement the amount of external light transmitted to the interior space by the light pipe system during "intermediate" periods when available external light is almost, but not entirely, sufficient to provide the desired light level within the interior space, as detected by light sensors within the interior space. According to one embodiment where interior artificial lighting sources are controlled by light sensors within the interior space (i.e. lights energized when light from the light pipe system decreases to a certain level and lights de-energized when light from the light pipe system increases to a certain level), the supplemental light from light source 221 can be sufficient to delay or avoid energizing the artificial lighting sources during periods of "intermediate" external brightness, or if the artificial light sources are energized, the supplemental light from light source 221 may permit the artificial lighting sources to be de-energized. The supplemental light from light source 221 is intended to provide a low-cost, efficient source of light that can minimize or avoid the need to energize interior artificial lighting during periods of intermediate external light availability.

Operation of supplemental light source 221 may be controlled by the same sensors used to control the artificial lighting for the interior space. For example, when the sensors determine that the light level within the interior space has decreased to a predetermined level and increased lighting is required, the controllers for the artificial light sources may first send a signal to supplemental light source 221 to energize. When the sensors determine that the light level within the interior space has decreased to a predetermined level with the supplemental light source 221 energized and increased light level is still required, the controllers for the artificial light sources may then send a signal to de-energize supplemental light source 221 and to energize the artificial light source within the interior space according to a pre-established control scheme such as those further described herein. Supplemental light sources 221 may be controlled by (or otherwise interface with) a wireless communication device such as a transceiver 219 operating on a suitable radio frequency or the like for communicating with the controller and/or sensors. Alternatively, light source 221 may have a transceiver with an integrated sensor that directly controls operation of light source 221 and communicates the status of the light source 221 to the controller. According to the illustrated embodiment, transceiver 219 is disposed on an outside surface of wall 206 and communicates with light source 221 through a suitable connection (e.g. wired connection, etc.). Transceiver 219 may include a sensor for control of light source 221 and may be configured to interface or communicate with a master controller or transceiver, or with other local transceivers associated with other light pipes. Transceiver 219 may also include suitable control equipment for switching the light source on/off, and may include suitable memory for logging the time on/off of the supplemental light source. Transceiver 219 may also provide an appropriate switching device(s) for turning on and off a supply of electrical power to the LEDs (e.g. switches, relays, etc.) which are operably coupled to a suitable electrical power supply. According to one embodiment, the electrical power supply includes a solar power generating device such as (but not limited to) a photovoltaic panel 217 (see FIG. 2*a*) which may be provided separately from the light pipe assembly, or may be provided as an integral component with the light pipe assembly. According to other embodiments, the electrical power supply may be any suitable power supply available within (or available to) the facility, such as, but not limited to, an existing power supply for use with other artificial lighting devices in the facility.

Figure 46:
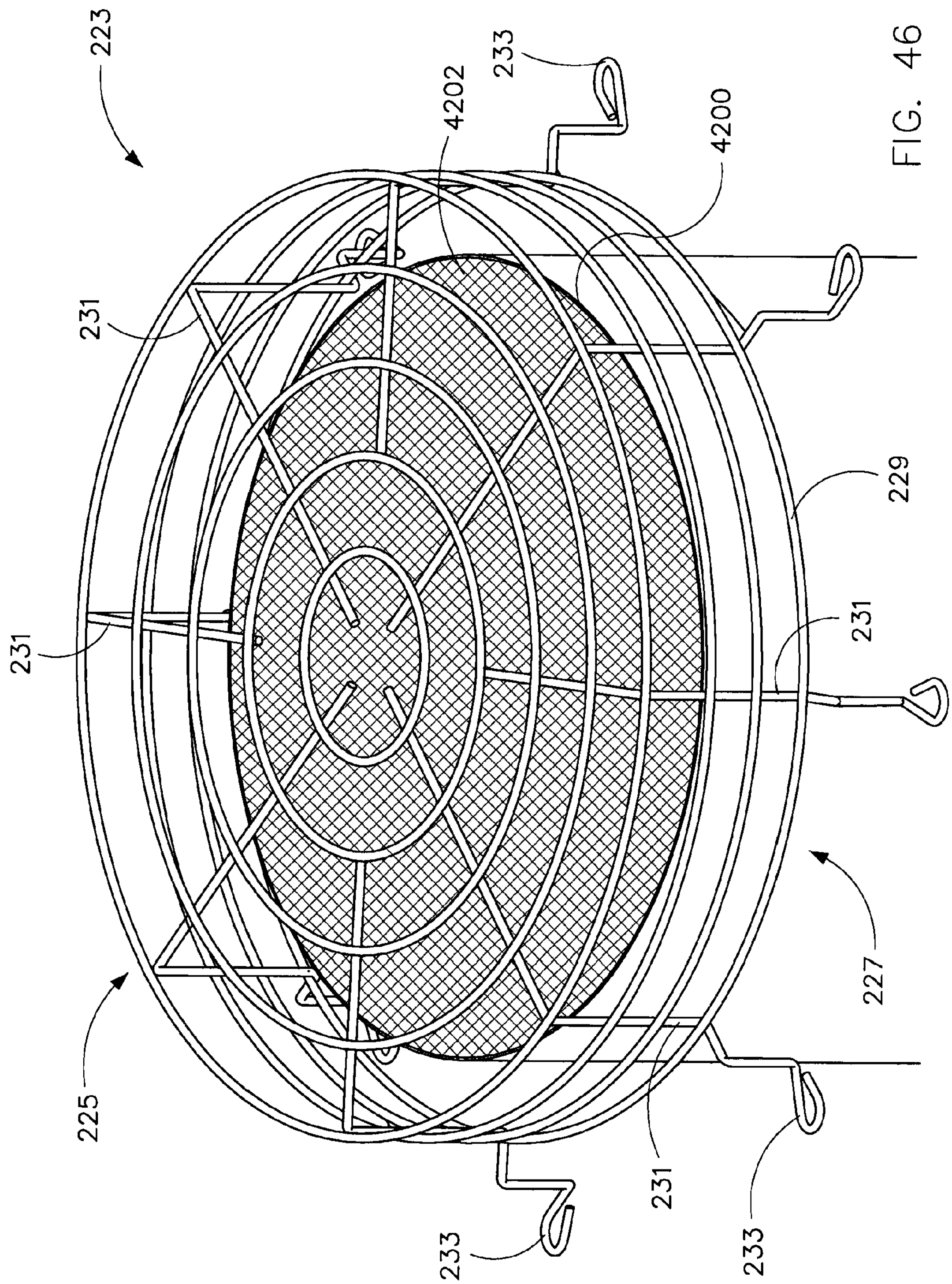
FIG. 46 depicts a perspective view of a guard for a light pipe system.

With reference to FIGS. 2*c* and 46, light pipe system 102 is further shown according to an exemplary embodiment to include a guard 223 disposed about the light-emitting end of the light pipe proximate the diffuser. Guard 223 may be coupled to a ceiling or other surface through which the light pipe extends (as shown in FIG. 2*c*) to provide enhanced robustness and protection for the entire light pipe assembly in the event that the light pipe is inadvertently impacted from within the facility. According to other embodiments, the guard may be coupled directly to an outer portion of the light pipe. According to one embodiment, the guard is formed from a material such as metal (e.g. galvanized or powder coated steel wire, stainless steel wire etc.) such as may be fabricated by bending, rolling, etc. and welded at the junctions, or may be impact-resistant plastic formed in a suitable fabrication process (e.g. molding, etc.). Alternatively, the guard may be formed from plastic-coated wire or other material having sufficient strength to resist impact and protect the light pipe, while withstanding the elements to which the light pipe may be exposed. According to the illustrated embodiment, the guard is formed in a substantially cylindrical shape with a side wall portion 225 (such as may be formed from a continuous helical spiral or stacked rings or the like interconnected by vertical ribs) and a bottom wall portion 227 (such as may be formed from a flat spiral or concentric rings or the like interconnected by radially extending spokes that transition to the vertical ribs) having wire spacing between approximately 1-3 inches to prevent entry by objects such as baseballs, tennis balls and the like, yet minimize any reduction in light emission from the light pipe. According to other embodiments, the guard may have any suitable wire spacing or pattern to suit a desired application. According to further embodiments, the guard may be configured for use with a light pipe having an angular diffuser, such as that shown and described with reference to FIG. 38.

According to one embodiment, the bottom wall portion 225 and side wall portions 227 are formed from a single wire 229 spirally wound from the center of the bottom wall to the outer edge of the bottom wall (where it joins the lower edge of the side wall) where a ring is formed, and then helically wound from the lower edge of the side wall to the upper edge of the side wall, where the wire is wound to form a ring. The wire of the spirally and helically wound wall portions is secured by radially extending wires 231 (e.g. spokes/ribs, etc.) that originate at or near the center of the bottom wall, and are bend at substantially 90 degrees at the outer edge of the bottom wall and lower edge of the side wall. According to one embodiment, the ribs 231 may extend above the ring at the upper end of the side wall 227 and are then bent at an angle of substantially 90 degrees and closed in a loop 233 (e.g. an attachment/fastening loop or eye, etc.) that is substantially parallel to a ceiling surface for use in fastening the guard to a ceiling surface with suitable fasteners or the like. At least several of the wire loops 233 may be arranged in a variably offset pattern or "turned" relative to the others (e.g. in a manner such that the loops are asymmetric with respect to one another and/or to the guard), for adaptation to ceiling surfaces having ridges or ribs (e.g. as are common in corrugated steel roof panels, and the like) so that the guard can be rotated to a position about the light fixture so that all or most of the wire loops align with the rib or ridge portions of the roof panel to permit attachment of the guard to the panel at more locations than could otherwise be achieved with wire loops that are symmetrically disposed. Attachment of the guard to a relatively secure structure surrounding the light pipe is also intended to provide an enhancement for security of the building by providing a barrier or obstacle to unauthorized access to the facility by an intruder through the light pipe.

Figure 3:
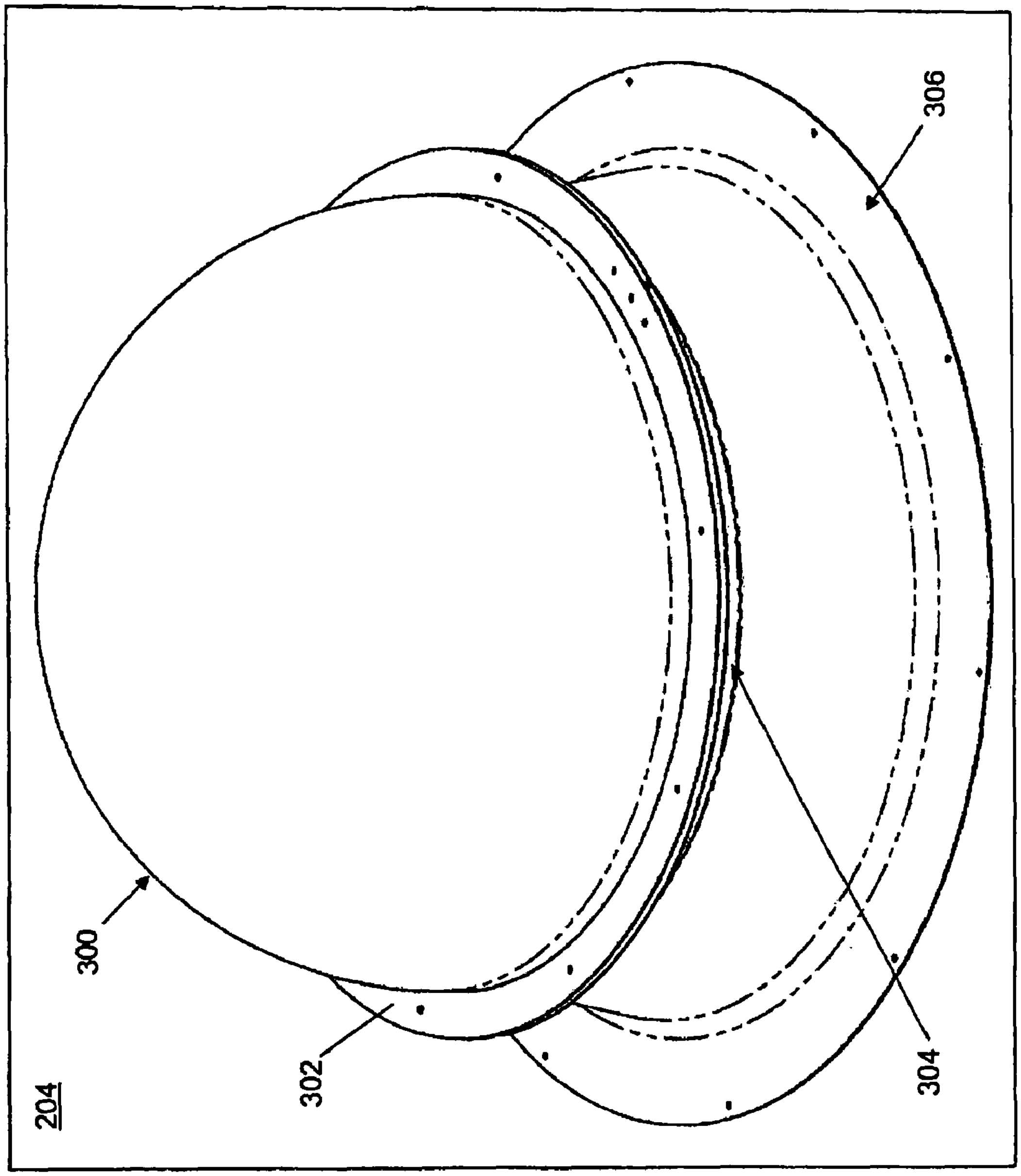
FIG. 3 depicts a perspective view of a light collection system of the light pipe system of FIG. 2 in accordance with an exemplary embodiment.

With reference to FIG. 3, light collection system 204 is shown in accordance with an exemplary embodiment. Light collection system 204 may include a light collector 300, a clamp ring 302, a mounting flange 304, and a flashing 306. Flashing 306 is positioned to encircle and to mount to a first portion of reflective tube 202. The first portion of reflective tube 202 is opposite diffuser 200. Flashing 306 is positioned on a surface to which the light pipe system is mounted for use. The surface, for example, may be a roof or an exterior wall of a building. Flashing 306 may be formed of aluminum. Reflective tube 202 extends through the surface to the interior space to allow natural light into the interior space. Mounting flange 304 mounts to a first portion of flashing 306 opposite the surface to which the flashing 306 is mounted.

Figure 4:
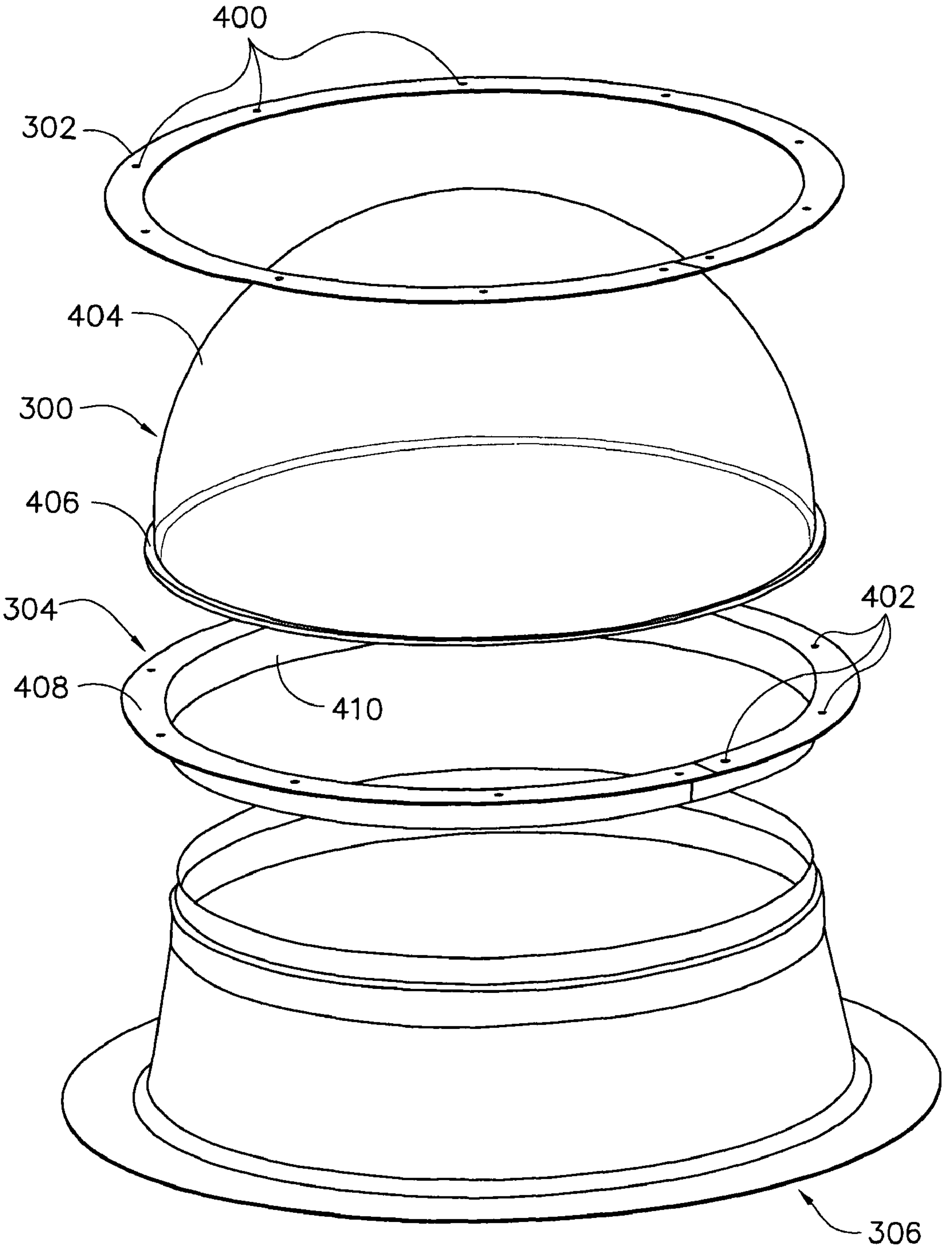
FIG. 4 depicts an exploded, perspective view of the light collection system of FIG. 3 in accordance with an exemplary embodiment.

With reference to FIG. 4, light collector 300 includes a shell 404 and a flange 406. In an exemplary embodiment, light collector 300 is formed of a sheet of acrylic material using a free forming process that uses air pressure differentials to form shell 404 of light collector 300 without a mold as described with reference to FIG. 23. In an exemplary embodiment, shell 404 has an oblate shape. Products formed using this method generally have improved optical characteristics over those formed using molds. Flange 406 of light collector 300 defines a generally circular opening which is positioned so that shell 404 covers the interior space formed by reflective tube 202.

Clamp ring 302 is positioned over flange 406 of light collector 300. Clamp ring 302 may include first fastener holes 400. Mounting flange 304 may include a flange 408 and a wall 410 which extends from flange 408 at an approximately 90 degree angle though other angles may be used. In an exemplary embodiment, flange 408 and wall 410 extend approximately 1.5 inches. Flange 408 of mounting flange 304 may include second fastener holes 402. In general, first fastener holes 400 are formed in clamp ring 302 to align with second fastener holes 402 of mounting flange 304 so that flange 406 of light collector 300 can be mounted and held between clamp ring 302 and flange 408 of mounting flange 304. Mounting flange 304 and clamp ring 302 may be formed of aluminum.

Figure 5:
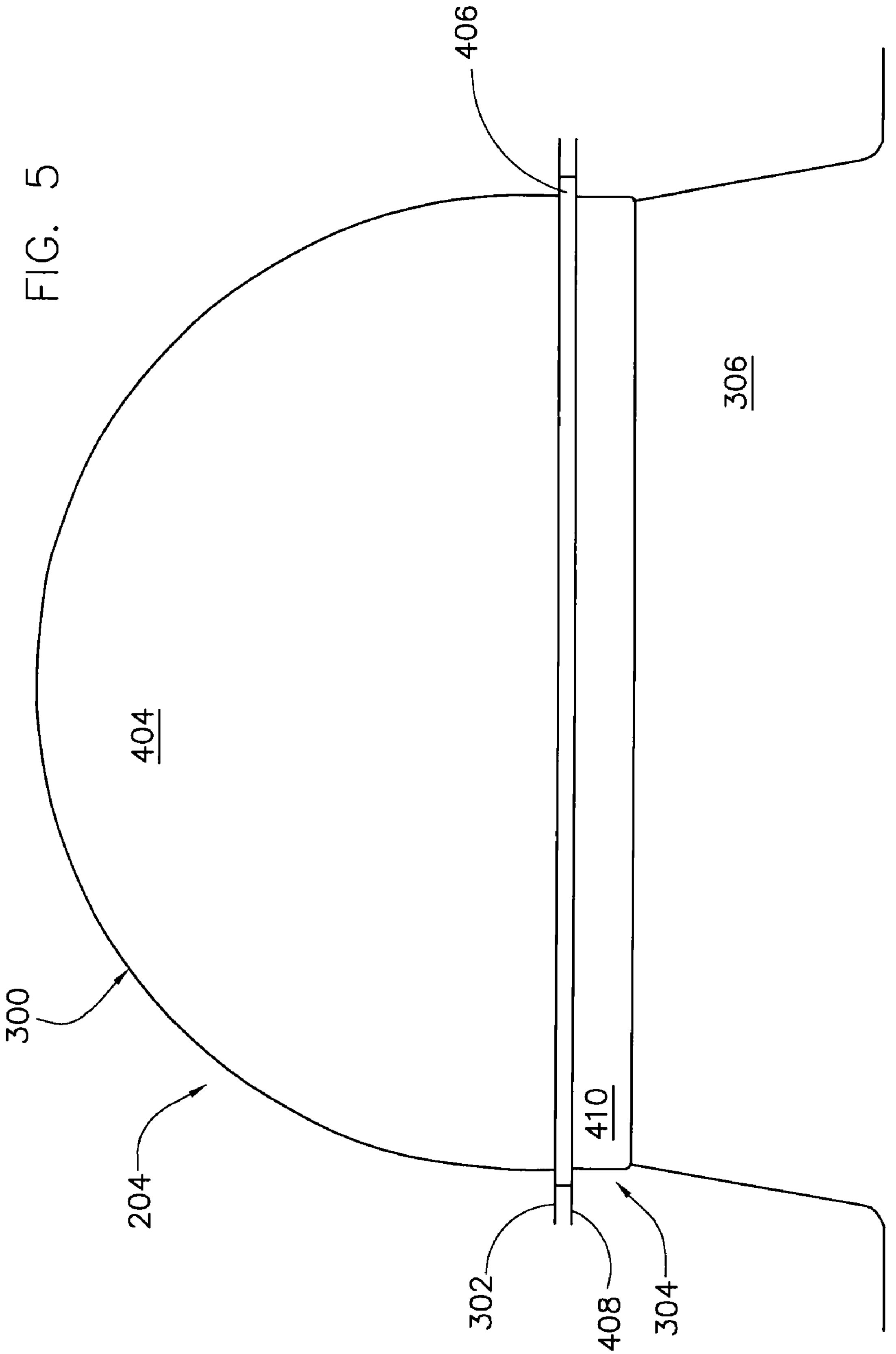
FIG. 5 depicts a side view of the light collection system of FIG. 3 in accordance with an exemplary embodiment.

With reference to FIG. 5, a side view of light collection system 204 is shown in accordance with an exemplary embodiment. In an exemplary embodiment, wall 410 of mounting flange 304 frictionally abuts the first portion of flashing 306. To avoid any water freezing therebetween, there is no gap between wall 410 of mounting flange 304 and the first portion of flashing 306. Flange 408 of mounting flange 304 extends outward away from the interior space formed by reflective tube 202. Flange 406 of light collector 300 is positioned against flange 408 of mounting flange 304. Clamp ring 302 is positioned against flange 406 of light collector 300.

Figure 6:
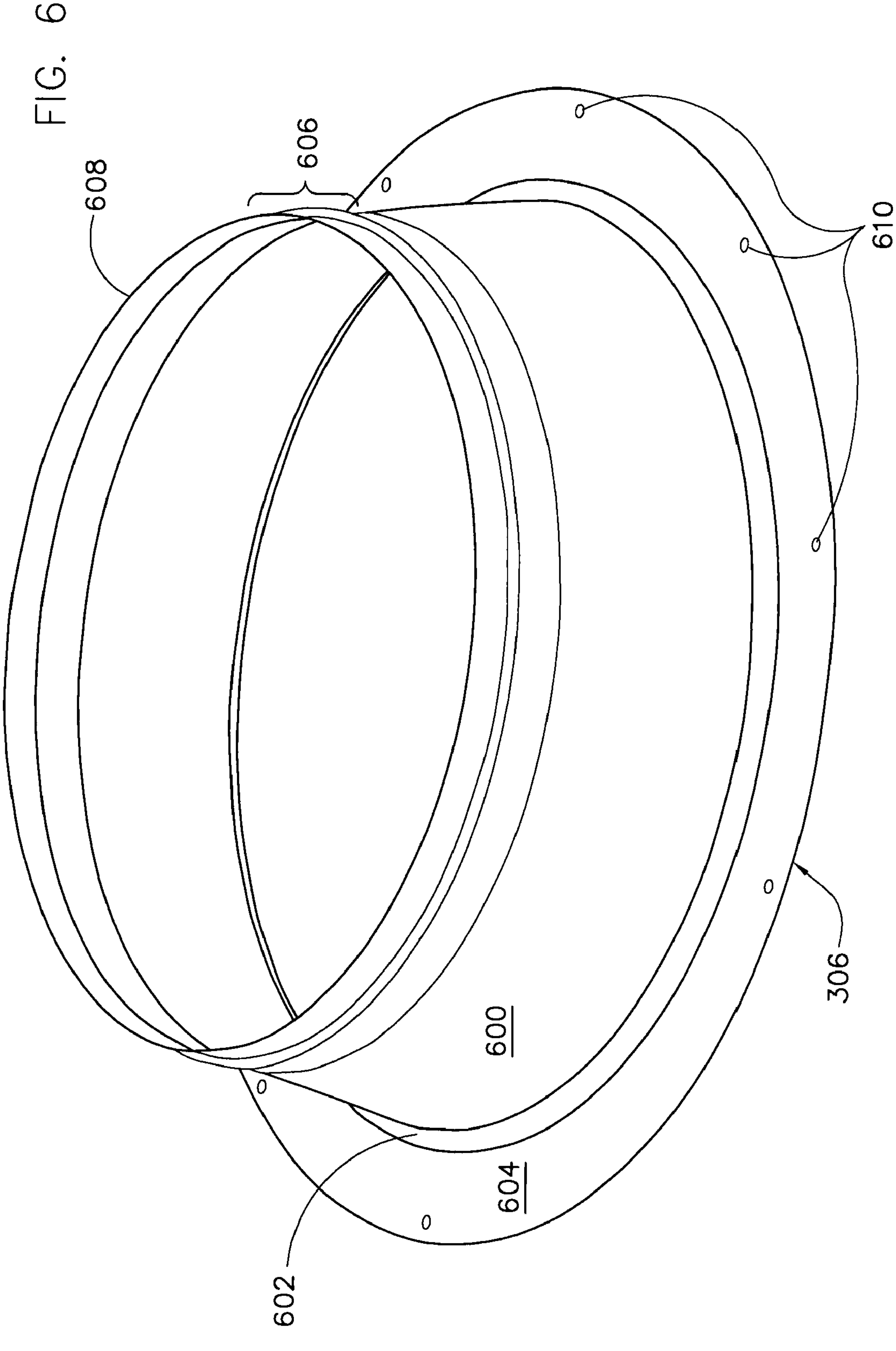
FIG. 6 depicts a perspective view of a flashing of the light collection system of FIG. 3 in accordance with an exemplary embodiment.

With reference to FIG. 6, flashing 306 is shown in accordance with an exemplary embodiment. In an exemplary embodiment, flashing 306 is formed of a single sheet of spun aluminum with no seams. Flashing 306 may include a wall 600, a transition wall 602, a flange 604, a mounting wall 606, and a peripheral edge 608. Transition wall 602 extends from a first side of wall 600 of flashing 306. Flange 604 of flashing 306 extends from a first side of transition wall 602. The first side of transition wall 602 is opposite wall 600 of flashing 306. Transition wall 602 provides a transitional surface between wall 600 and flange 604 of flashing 306. Mounting wall 606 extends from a second side of wall 600 of flashing 306. The second side of transition wall 602 is opposite the first side of transition wall 602. Peripheral edge 608 forms a generally circular shape along mounting wall 606 opposite the second side of wall 600 of flashing 306. As known to those skilled in the art, roofing or siding materials may be positioned to cover at least a portion of flashing 306 including flange 604, transition wall 602, and/or wall 600.

Figure 7:
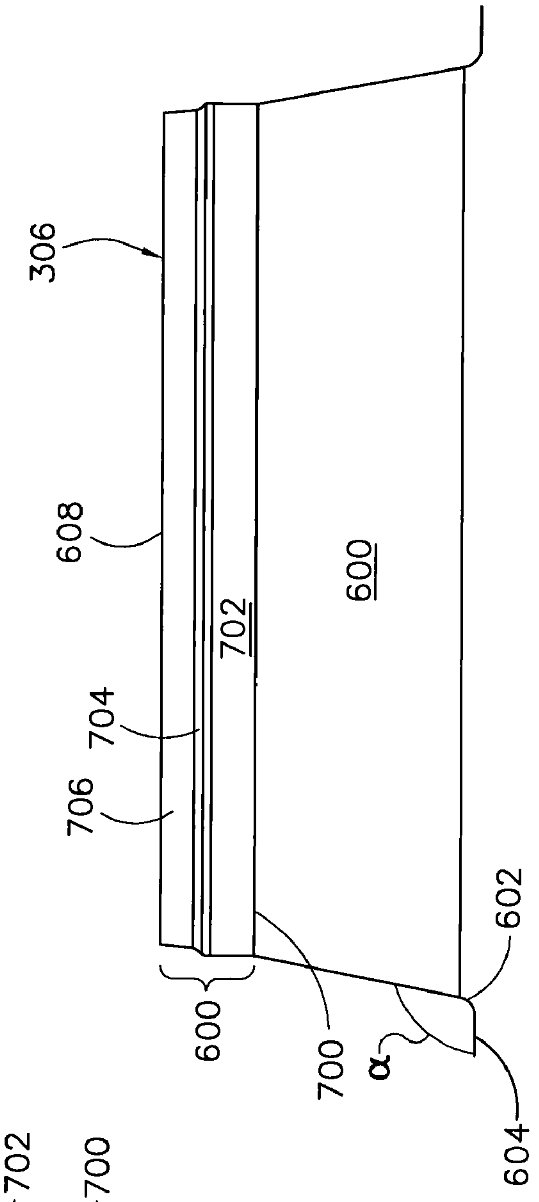
FIG. 7 depicts a side view of the flashing of FIG. 6 in accordance with an exemplary embodiment.

With reference to FIG. 7, transition wall 602 forms an angle $\alpha$ between wall 600 and flange 604 of flashing 306. In an exemplary embodiment, angle $\alpha$ is greater than 90 degrees. Mounting wall 606 may include a first mounting surface 702, a transition surface 704, and a second mounting surface 706. First mounting surface 702 extends from an edge 700 of wall 600 of flashing 306. Transition surface 704 provides a transition between first mounting surface 702 and second mounting surface 706. Peripheral edge 608 is formed along second mounting surface 706.

Figure 8:
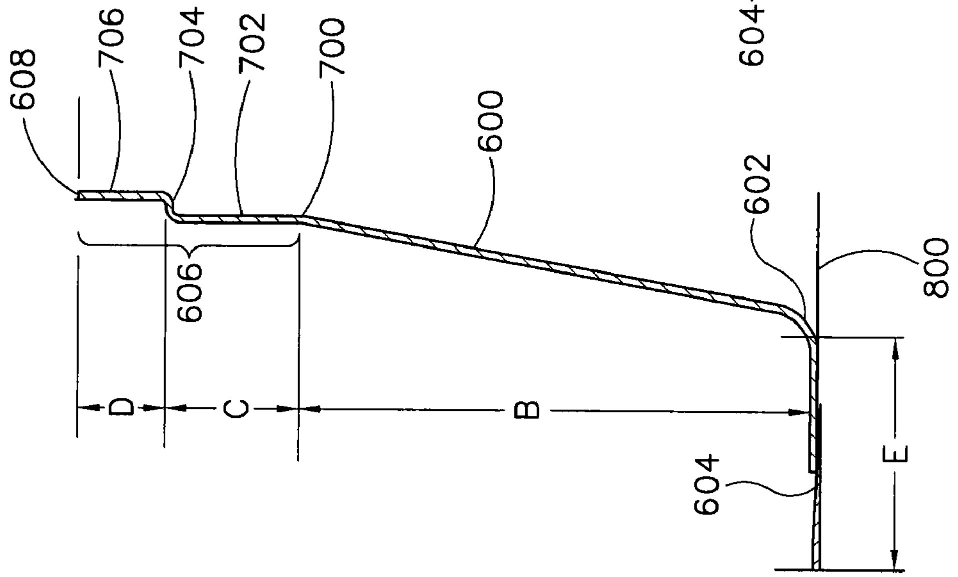
FIG. 8 depicts an enlarged, side view of the flashing of FIG. 7 in accordance with an exemplary embodiment.

With reference to FIG. 8, wall 600 of flashing 306 extends a height B from flange 604 of flashing 306 to edge 700. In an exemplary embodiment, height B is approximately six inches for a light pipe including a diffuser having a diameter of 22.25 inches. First mounting surface 702 extends a height C from edge 700 to transition surface 704. In an exemplary embodiment, height C is approximately 1.5 inches for a light pipe including a diffuser having a diameter of 22.25 inches. First mounting surface 702 extends in a generally perpendicular direction relative to a horizontal surface 800. Transition surface 704 extends in a generally parallel direction relative to horizontal surface 800. Second mounting surface 706 extends a height D from transition surface 704 to peripheral edge 608. In an exemplary embodiment, height D is approximately one inch for a light pipe including a diffuser having a diameter of 22.25 inches. Second mounting surface 706 extends in a generally perpendicular direction relative to horizontal surface 800. In an exemplary embodiment, flange 604 of flashing 306 is parallel to or extends down from horizontal surface 800. In general, horizontal surface 800 extends in the direction of the surface to which the light pipe system is mounted. Flange 604 of flashing 306 extends a length E from transition wall 602. In an exemplary embodiment, length E is approximately three inches for a light pipe including a diffuser having a diameter of 22.25 inches.

With reference to FIG. 9*a*, a detailed cross sectional side view of the mounting between light collection system 204 and reflective tube 202 is shown in accordance with an exemplary embodiment. Wall 410 of mounting flange 304 frictionally abuts first mounting surface 702 of flashing 306 to maintain light collector 300 in position relative to flashing 306. A fastener 900 extends through a first fastener hole of the first fastener holes 400 and through a first fastener hole of the second fastener holes 402 to mount clamp ring 302 to flange 408 of mounting flange 304. Clamp ring 302 and flange 408 of mounting flange 304 extend further than flange 406 of light collector 300 so that fastener 900 does not extend through flange 406 of light collector 300. In an exemplary embodiment, clamp ring 302 extends approximately 1.5 inches. Fastener 900 clamps flange 406 of light collector 300 between clamp ring 302 and flange 408 of mounting flange 304. In an exemplary embodiment, flange 406 of light collector 300 extends approximately 0.375 inches from shell 404. In the exemplary embodiment of FIG. 9*a*, fastener 900 includes a screw 902, a nut 904, and a washer 906. In an exemplary embodiment, screw 902 is a one inch screw formed of aluminum. In an exemplary embodiment, nut 904 is a nylon locking hex nut formed of aluminum. In an exemplary embodiment, washer 906 is formed of aluminum.

In an alternative embodiment, a different fastening mechanism may be used to connect the components of light pipe system 102. For example, a question mark fastener comprising a band clamp or a barrel clamp type of fastener may be used with a T-bolt or straight hex bolt to close the clamp. Flange 408 of mounting flange 304 and flange 406 of light collector 300 are positioned within an open upper end of the question mark section of the question mark fastener. The clamp may replace fastener 900 and clamp ring 302. A V-section clamp may also be used with bolt anchor points added to a V section of the V-section clamp.

A first gasket 908 may be positioned between first mounting surface 702 of flashing 306 and wall 206 of reflective tube 202 to abut against transition surface 704 of mounting wall 606. In an exemplary embodiment, first gasket 908 is a horsehair gasket. A second gasket 910 may be positioned between shell 404 of light collector 300 and second mounting surface 706 of flashing 306. In an exemplary embodiment, second gasket 910 is a horsehair gasket. First gasket 908 and second gasket 910 reduce airflow and keep contaminants from entering light pipe system 102. Fewer or additional gaskets may be included. In an exemplary embodiment, silicone may be applied between flashing 306 and reflective tube 202 to reduce airflow and keep contaminants from entering light pipe system 102. A second fastener 912 extends through a first fastener hole in second mounting surface 706 of flashing 306 and through a first fastener hole of wall 206 of reflective tube 202 to mount flashing 306 to reflective tube 202. Second fastener 912 extends into the interior space formed by reflective tube 202. Second fastener 912 is positioned above flange 406 of light collector 300 along shell 404 of light collector 300. In an exemplary embodiment, second fastener 912 is a sheet metal screw formed of stainless steel. Clamp ring 302 may be formed of a plurality of sections which may overlap to form various size rings.

With reference to FIG. 9*b*, a detailed cross sectional side view of a mounting between flashing 306 and mounting flange 304 is shown in accordance with an exemplary embodiment. Wall 410 of mounting flange 304 frictionally abuts first mounting surface 702 of flashing 306 to maintain light collector 300 in position relative to flashing 306. To provide additional stability over the frictional fitting, a joint 914 may be formed between wall 410 of mounting flange 304 and first mounting surface 702 of flashing 306. For example, joint 914 may be formed using a Tog-L-Loc® sheet metal joining system such as that developed by BTM Corporation of Marysville, Mich. A sealant also may be applied between wall 410 of mounting flange 304 and first mounting surface 702 of flashing 306 to minimize any airflow or water leakage between wall 410 of mounting flange 304 and first mounting surface 702 of flashing 306.

In an exemplary embodiment, an insulation sleeve may be positioned between flashing 306 and reflective tube 202 to reduce airflow and keep contaminants from entering light pipe system 102 and to reduce heat loss from light pipe system 102. The insulation sleeve may be formed of a fiberglass material. The insulation sleeve may be taped to an inside surface of flashing 306 and may extend from approximately adjacent first gasket 908 to the roofing/wall or 2-3 inches below/into the roofing/wall. A counter flashing may be positioned between mounting flange 304 and an exterior surface of the roofing/wall to deflect moisture away from light pipe system 102. The counter flashing may be mounted to mounting flange 304 using first fastener holes 400 and second fastener holes 402. Additionally, in an exemplary embodiment, a plurality of rods may mount to mounting flange 304 extending upward toward shell 404. A filament may be extended between the plurality of rods to discourage birds from roosting on light pipe system 102.

Figure 10:
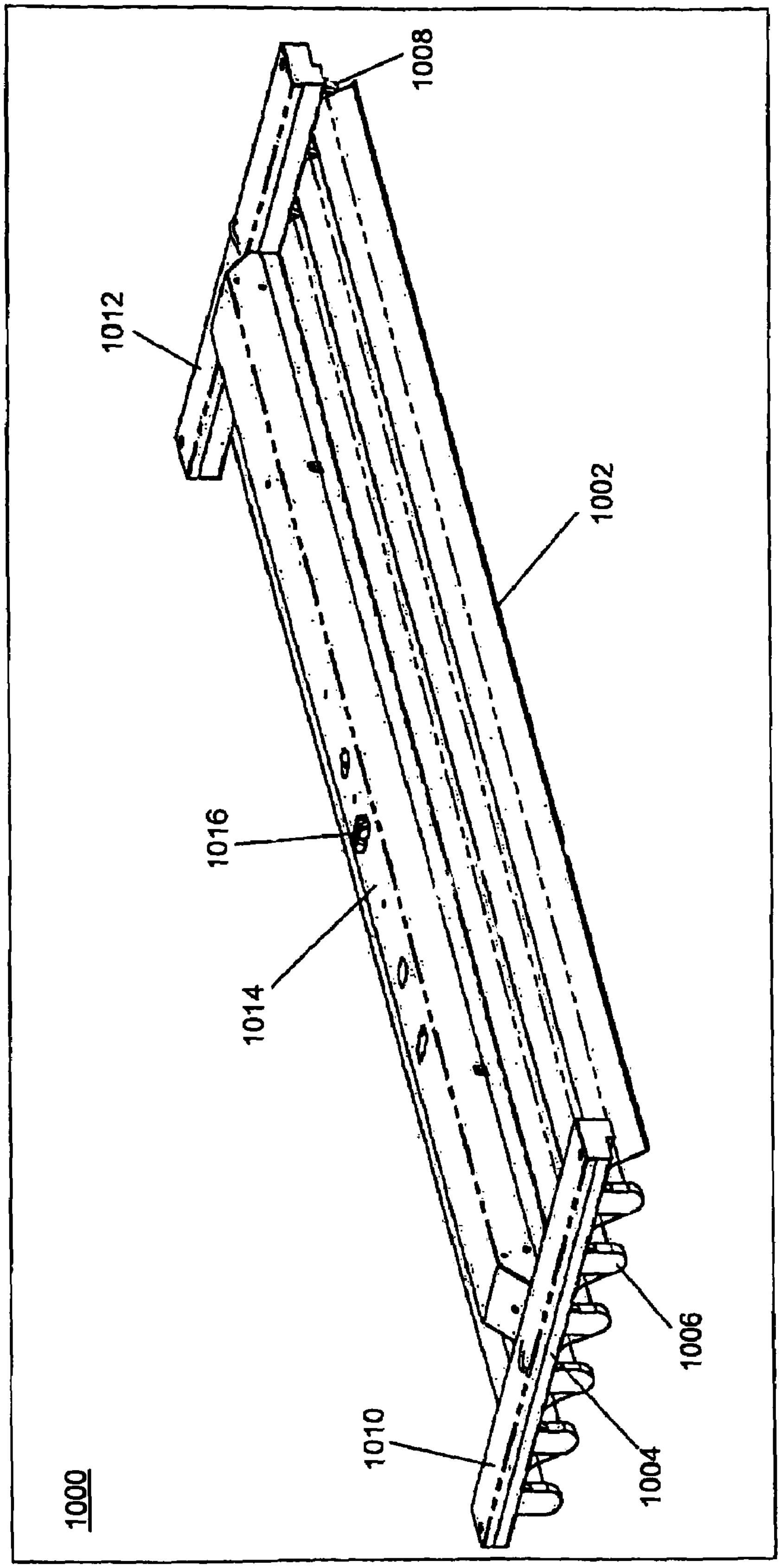
FIG. 10 depicts a perspective view of a light fixture providing artificial light in the automated lighting system of FIG. 1 in accordance with an exemplary embodiment.

With reference to FIG. 10, a light fixture 1000 of artificial lighting system 108 is shown in accordance with an exemplary embodiment. Other light fixtures of different types, manufactures, and models may be used without limitation. Light fixture 1000 may include a reflective sheet 1002, a support frame 1004, a first lamp holder 1006, a second lamp holder 1008, a first raceway cover 1010, a second raceway cover 1012, a ballast cover 1014, and a power connector 1016. Light fixture 1000 may mount to or otherwise suspend from a ceiling as known to those skilled in the art. For example, first raceway cover 1010, second raceway cover 1012, and/or ballast cover 1014 may mount to the ceiling. Power connector 1016 can be connected to a power supply connector to provide power to light fixture 1000.

Figure 11:
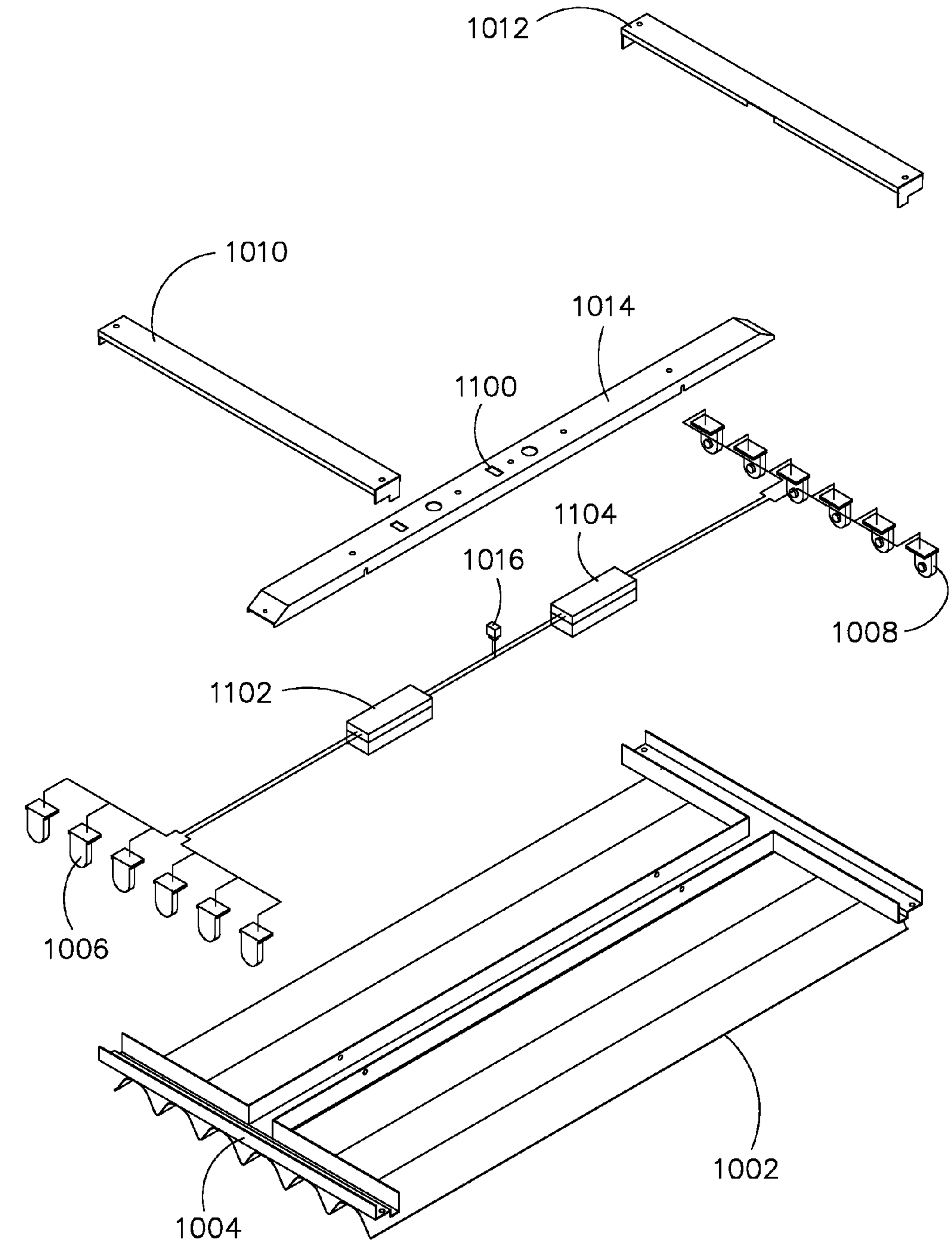
FIG. 11 depicts an exploded, perspective view of the light fixture of FIG. 10 in accordance with an exemplary embodiment.

With reference to FIG. 11, an exploded view of light fixture 1000 is shown in accordance with an exemplary embodiment. First lamp holder 1006 and second lamp holder 1008 include one or more sockets for mounting opposed ends of a lamp. In the exemplary embodiment of FIG. 11, light fixture 1000 includes six pairs of sockets to connect with six lamps. In an exemplary embodiment, the lamps are fluorescent tubes. Reflective sheet 1002 may mount to support frame 1004. Reflective sheet 1002 reflects light from the lamps toward the interior space to be lit and may include a peak formed to accommodate a lamp. Support frame 1004 may form a generally "I" shaped cavity. The center of the "I" shaped cavity may support one or more ballasts and wiring to first lamp holder 1006 and to second lamp holder 1008. The ends of the "I" shaped cavity may support first lamp holder 1006 and second lamp holder 1008. First raceway cover 1010 fits over a first end of the "I" shaped cavity of support frame 1004 to enclose first lamp holder 1006. Second raceway cover 1012 fits over a second end of the "I" shaped cavity of support frame 1004 to enclose second lamp holder 1008. Ballast cover 1014 fits over the center of the "I" shaped cavity of support frame 1004 to enclose the one or more ballasts and associated wiring. Power connector 1016 extends through an aperture 1100 through ballast cover 1014. In an exemplary embodiment, power connector 1016 may be a 6-pin "Mate-N-Lock" socket connector of the type sold by the AMP division of Tyco Electronics of Harrisburg, Pa.

Figure 12:
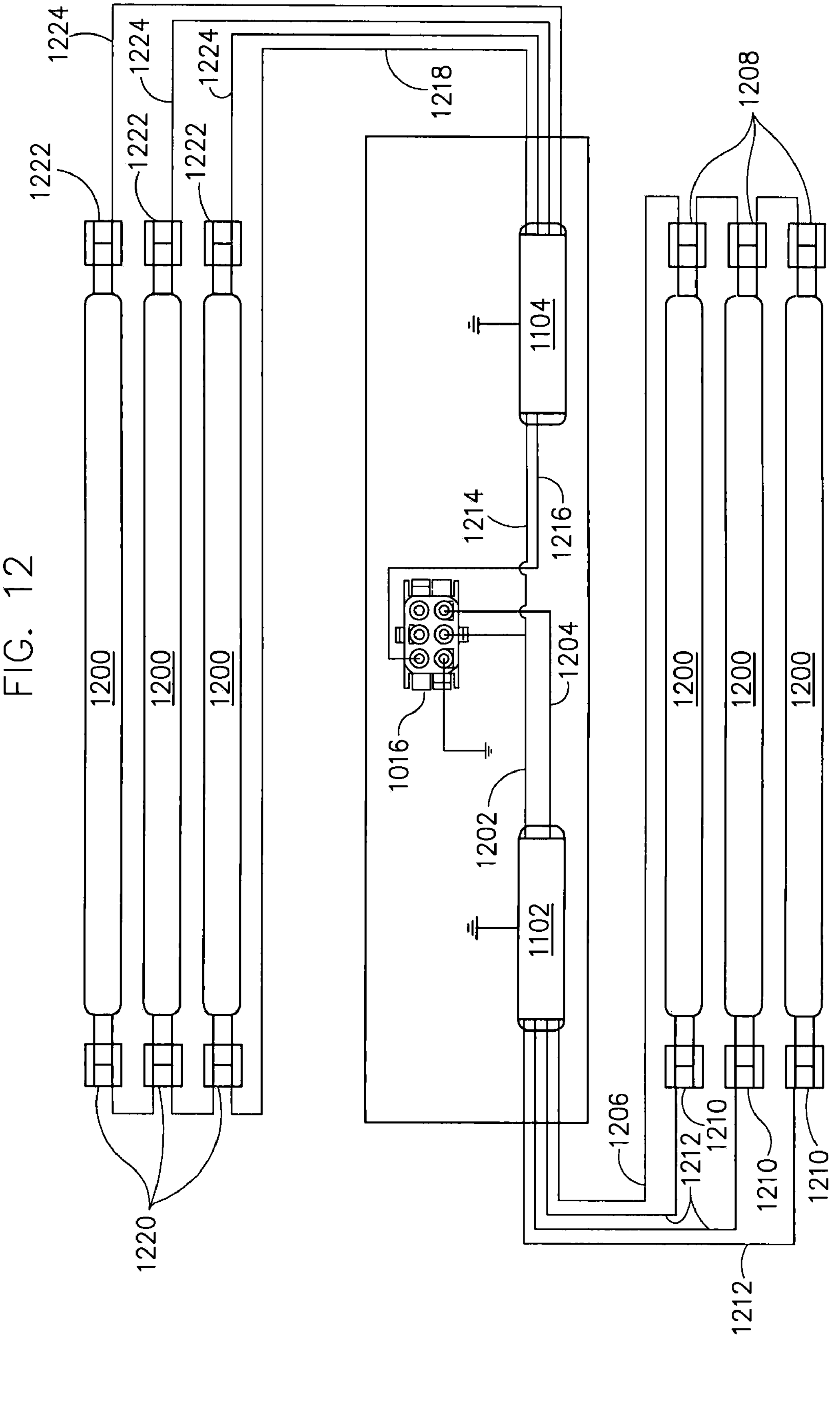
FIG. 12 depicts a circuit diagram of the light fixture of FIG. 10 in accordance with an exemplary embodiment.

In the exemplary embodiment of FIG. 11, light fixture 1000 includes a first ballast 1102 and a second ballast 1104 with each ballast providing power to three of the six lamps. In an exemplary embodiment, first ballast 1102 and second ballast 1104 may be a model 49776 electronic ballast available from GE Lighting of Cleveland, Ohio. A fewer or a greater number of ballasts may be used that may include a fewer or a greater number of lamps per ballast. With reference to FIG. 12, a wiring diagram of light fixture 1000 is shown in accordance with an exemplary embodiment. As stated previously, in the exemplary embodiment of FIG. 11, light fixture 1000 includes six pairs of sockets to connect with six lamps 1200 which are fluorescent tubes. A first wire 1202 connects first ballast 1102 with a "hot" line of power connector 1016. A second wire 1204 connects first ballast 1102 with a ground line of power connector 1016. A first output wire 1206 connects first ballast 1102 with a first socket. A second socket and a third socket are connected in daisy chain fashion to the first socket using first sockets 1208 which may be included in first lampholder 1006 as known to those skilled in the art. Second sockets 1210 connect with the first lamp, the second lamp, and the third lamp at opposite ends relative to first sockets 1208. Second sockets 1210 may be included in second lampholder 1008 as known to those skilled in the art. Three wires 1212 connect second sockets 1210 with first ballast 1102.

A third wire 1214 connects second ballast 1104 with a "hot" line of power connector 1016. A fourth wire 1216 connects second ballast 1104 with a ground line of power connector 1016. A first output wire 1218 connects second ballast 1104 with a fourth socket. A fifth socket and a sixth socket are connected in daisy chain fashion to the fourth socket using third sockets 1220 which may be included in second lampholder 1008 as known to those skilled in the art. Fourth sockets 1222 connect with the fourth lamp, the fifth lamp, and the sixth lamp at opposite ends relative to third sockets 1220. Fourth sockets 1222 may be included in first lampholder 1006 as known to those skilled in the art. Three wires 1224 connect fourth sockets 1222 with second ballast 1104. Thus, in the exemplary embodiment, light fixture 1000 includes two independently controllable lamp circuits which may be the same or different. If used with a dimmable ballast, additional control signal lines may connect power connector 1016 with first ballast 1102 and/or second ballast 1104.

Figure 13:
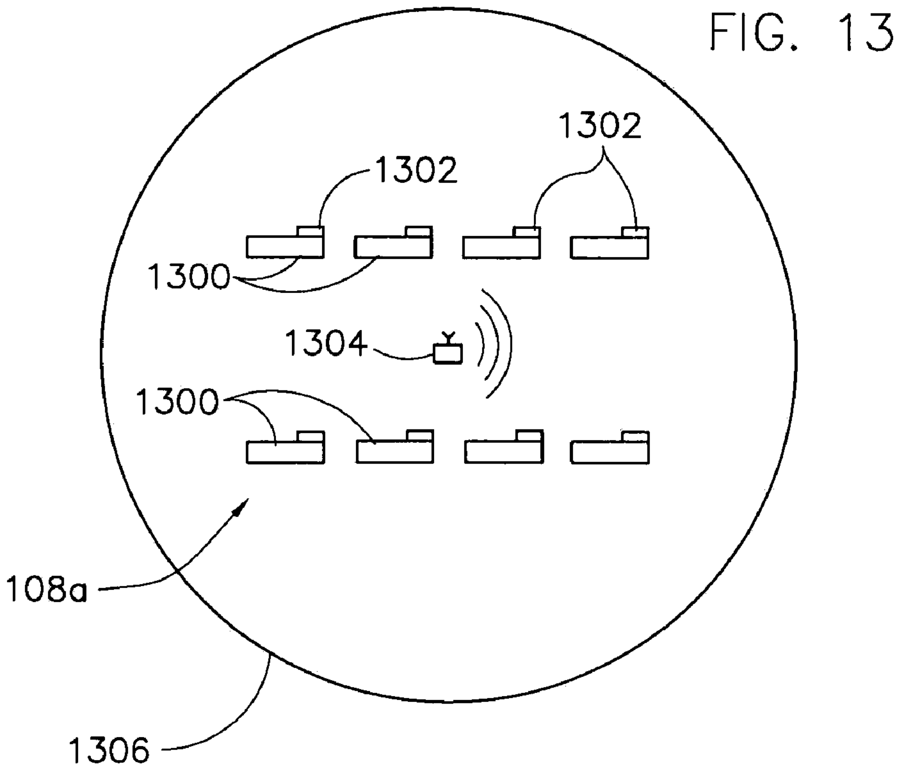
FIG. 13 depicts an artificial lighting system of the automated lighting system of FIG. 1 in accordance with a first exemplary embodiment.

With reference to FIG. 13, a first lighting system **108*a* is shown in accordance with a first exemplary embodiment. First lighting system 108*a* may be an example implementation of artificial lighting system 108. First lighting system 108*a* may include a plurality of light fixtures 1300. One or more of the plurality of light fixtures 1300 may be implemented as a light fixture 1000. One or more of the plurality of light fixtures 1300 may be the same or may be different. Associated with each of the plurality of light fixtures 1300 is a receiver 1302 which receives a control signal from a transmitter 1304. The control signal may include a lighting indicator specific to each light fixture of the plurality of light fixtures 1300 or may include the same lighting indicator for each of the plurality of light fixtures 1300**. Additionally, the control signal may include a lighting indicator specific to each independently controllable lamp circuit of each light fixture. The lighting indicator may indicate on/off or may indicate a lighting level.

Each receiver 1302 may be assigned an address unique to the receiver, unique to the plurality of light fixtures 1300, and/or unique to the independently controllable lamp circuit of each light fixture. Thus, the same or different addresses may be assigned to each receiver/independently controllable lamp circuit, and the control signal may include an address for each independently controllable lamp circuit of each light fixture, an address for each light fixture of the plurality of light fixtures 1300, or an address for the plurality of light fixtures 1300 with an associated lighting indicator. A single receiver 1302 may be used to control the supply of power to multiple light fixtures that are "daisy chained" together using a "daisy chain" modular wiring system power supply line such as the one described in U.S. Pat. No. 6,746,274.

Transmitter 1304 may send the control signal using a radio frequency to any receivers 1302 within an effective range 1306 defined based on the characteristics of the transmitter as known to those skilled in the art. Thus, transmitter 1304 can simultaneously control one or more light fixtures/independently controllable lamp circuits. Transmitter 1304 may be configured to encode a receiver address in the control signal. Each receiver 1302 may be configured to respond only to control signals encoded with its receiver address. The light fixture associated with each receiver 1302 can be turned on or off or dimmed based on the value of the lighting indicator. The address and lighting indicator information may be encoded in the control signal using a variety of methods as known to those skilled in the art.

Figure 14:
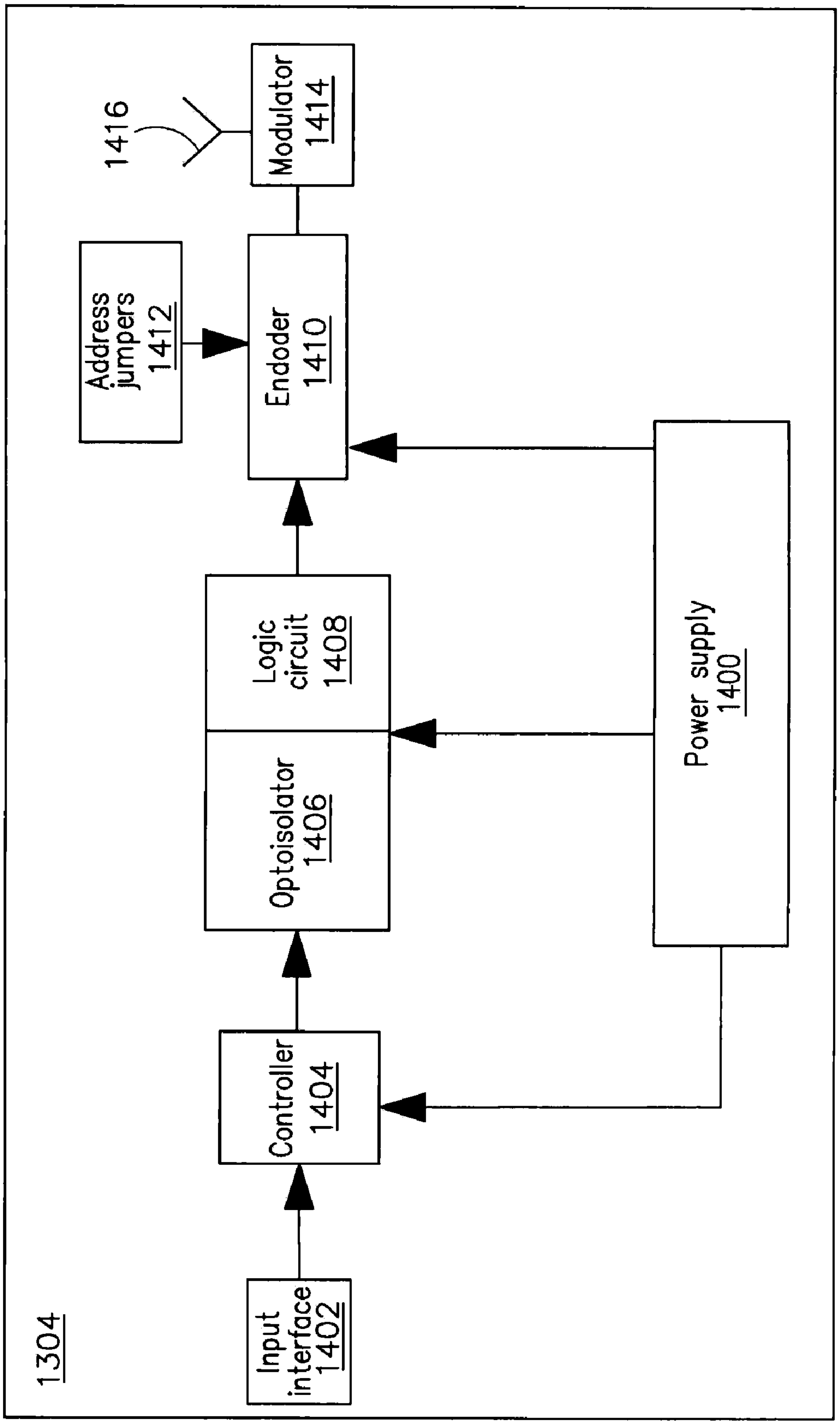
FIG. 14 depicts a block diagram of a transmitter of the artificial lighting system of FIG. 13 in accordance with an exemplary embodiment.

With reference to FIG. 14, transmitter 1304 is shown in accordance with an exemplary embodiment. Transmitter 1304 may include a power supply 1400, an input interface 1402, a controller 1404, an optoisolator 1406, a logic circuit 1408, an encoder 1410, address jumpers 1412, a modulator 1414, and an antenna 1416. Transmitter 1304 may include additional or different components. For example, transmitter 1304 may include a display. Power supply 1400 provides power to transmitter 1304. Controller 1404 can be any suitable logic device, for example, a microprocessor or microcontroller, programmable logic controller, custom logic circuitry, etc.

Input interface 1402 provides an interface for receiving information from the user for input to controller 1404 as known to those skilled in the art. Input interface 1402 may use various input technologies including, but not limited to, a keypad, a keyboard, a pen and touch screen, a mouse, a track ball, a touch screen, one or more buttons, a rotary dial, etc. to allow the user to enter information into controller 1404 or to make selections presented in a user interface displayed on the display. Input interface 1402 may provide both an input and an output interface. For example, a touch screen both allows user input and presents output to the user. Transmitter 1304 may have one or more input interfaces that use the same or a different technology.

Logic circuit 1408 may monitor the input to input interface 1402. For example, logic circuit 1408 may monitor keystrokes entered into input interface 1402. The user may enter information into transmitter 1304 such as a value of the lighting indicator. Address jumpers 1412 may provide a receiver address of a destination receiver. Encoder 1410 encodes the entered lighting indicator and the provided receiver address into a baseband signal supplied to modulator 1414. In an exemplary embodiment, encoder 1410 may be a model PT2262 remote control encoder sold by Princeton Technology Corp. of Sindian City, Taipei 23145, Taiwan. Other encoders may be used. Modulator 1414 provides a modulated signal to antenna 1416 for sending the control signal. In an exemplary embodiment, modulator 1414 is a radio frequency modulation circuit constructed of discrete components or using an integrated circuit.

Figure 15:
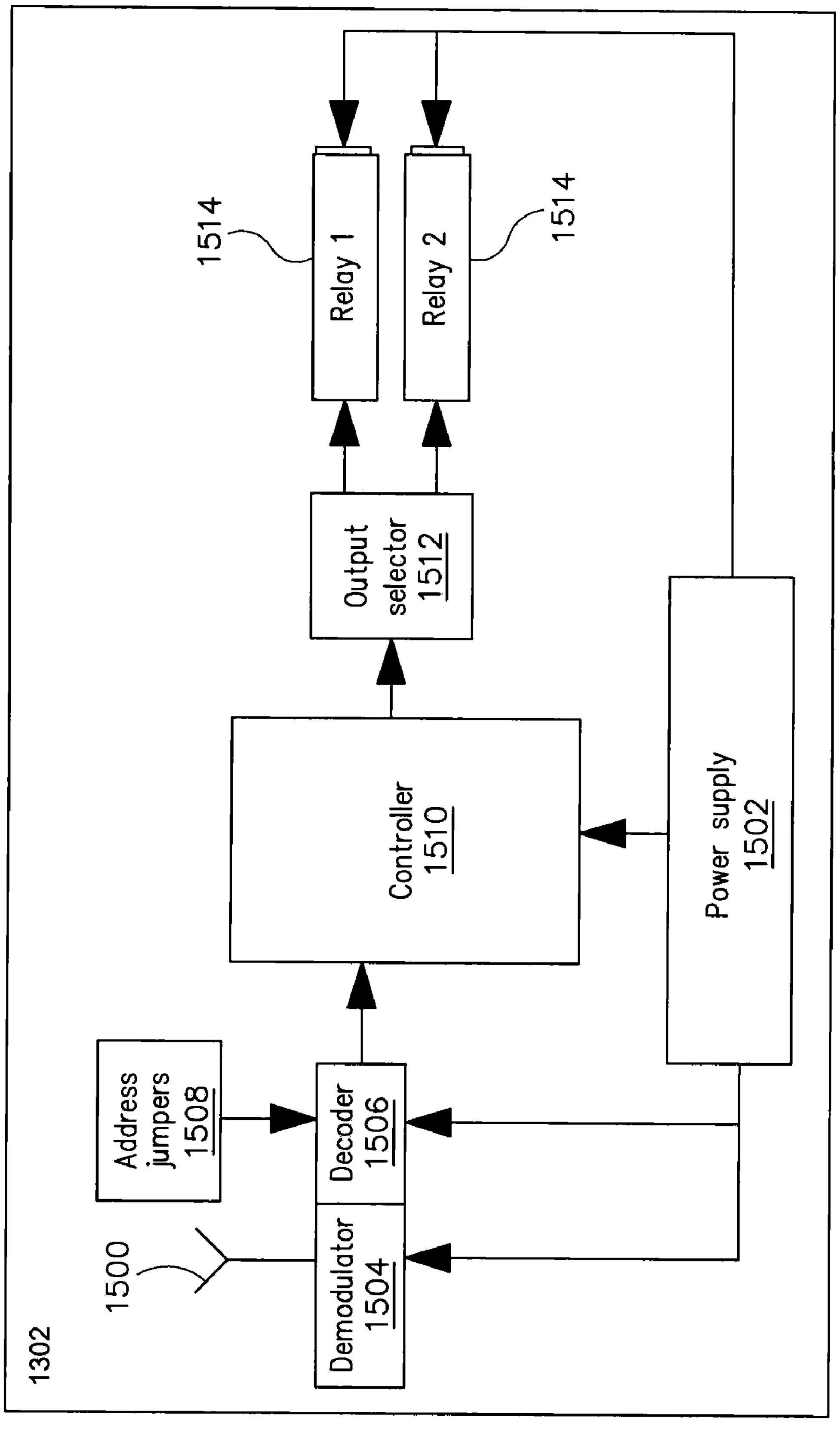
FIG. 15 depicts a block diagram of a receiver of the artificial lighting system of FIG. 13 in accordance with an exemplary embodiment.

With reference to FIG. 15, receiver 1302 is shown in accordance with an exemplary embodiment. Receiver 1302 may include an antenna 1500, a power supply 1502, a demodulator 1504, a decoder 1506, address jumpers 1508, a controller 1510, an output selector 1512, and one or more relays 1514 depending on the number of independently controllable lamp circuits. Receiver 1302 may include additional or different components. Antenna 1500 receives the control signal, for example, from transmitter 1304. For example, antenna 1500 may receive a radio frequency signal. Power supply 1502 provides power to receiver 1302. Demodulator 1504 demodulates the received control signal to a baseband signal. In an exemplary embodiment, demodulator 1504 may be a model TDL9927 superheterodyne receiver sold by Foshan Tuodi Electronics Co., Ltd. of Bao'an District of Shenzhen City, Guangdong Province, China. Decoder 1506 decodes the demodulated control signal to extract the values of the receiver address and the lighting indicator. In an exemplary embodiment, decoder 1506 may be a model PT2272 remote control decoder sold by Princeton Technology Corp. of Sindian City, Taipei 23145, Taiwan.

Address jumpers 1508 may be used to define the address of receiver 1302 and to provide the address to decoder 1506 for comparison with the receiver address extracted from the control signal. Decoder 1506 may recognize only control signals encoded with a receiver address that matches the address of receiver 1302. In an alternative embodiment, decoder 1506 may recognize all received control signals, irrespective of the receiver address encoded in the control signal. Controller 1510 may determine which control signals to process based on a receiver address supplied to controller 1510, for example, using switches, address jumpers 1508, values stored in a memory, etc.

Controller 1404 can be any suitable logic device, for example, a microprocessor or microcontroller, programmable logic controller, custom logic circuitry, etc. In the exemplary embodiment of FIG. 15, controller 1404 includes an output bus that supplies the extracted value of the lighting indicator to output selector 1512. In an exemplary embodiment, output selector 1512 includes output configuration jumpers which select one or more of the one or more relays 1514. Using relay outputs, an independently controllable lamp circuit can be turned on or off based on the value of the lighting indicator. Thus, receiver 1302 may control the supply of power to a light fixture by connecting a supply of electrical power to a first terminal of a first relay, and connecting a second terminal of the first relay to the power input terminal of a circuit powering a lamp or group of lamps in the light fixture. In this way, when a control signal with a lighting indicator value is received, the state of the relay changes to either a closed circuit to supply power to the lamp or group of lamps in the circuit, or an open circuit to remove power from the circuit.

In an alternative embodiment, dimmer circuitry may be used instead of relays to control each independently controllable lamp circuit based on a light level defined by the extracted value of the lighting indicator. Receiver 1302 may be used to control a dimmable ballast in the light fixture. In this configuration, power may be connected directly to the light fixture. Receiver 1302 provides a low voltage control signal to the dimmable ballast. The low voltage control signal could be generated, for example, by a resistive divider network configured by output selector 1512. The low voltage control signal may be supplied to one or more of the one or more relays 1514 by output selector 1512. The other side of the relay may be connected to a control signal input terminal on a dimmable electronic ballast in the light fixture. Instead of using relays to supply the low voltage control signals, receiver 1302 may include one or more digital to analog converter circuits to provide continuously variable low voltage control signals to the dimmable ballast in the light fixture according to the extracted value of the lighting indicator.

Figure 16:
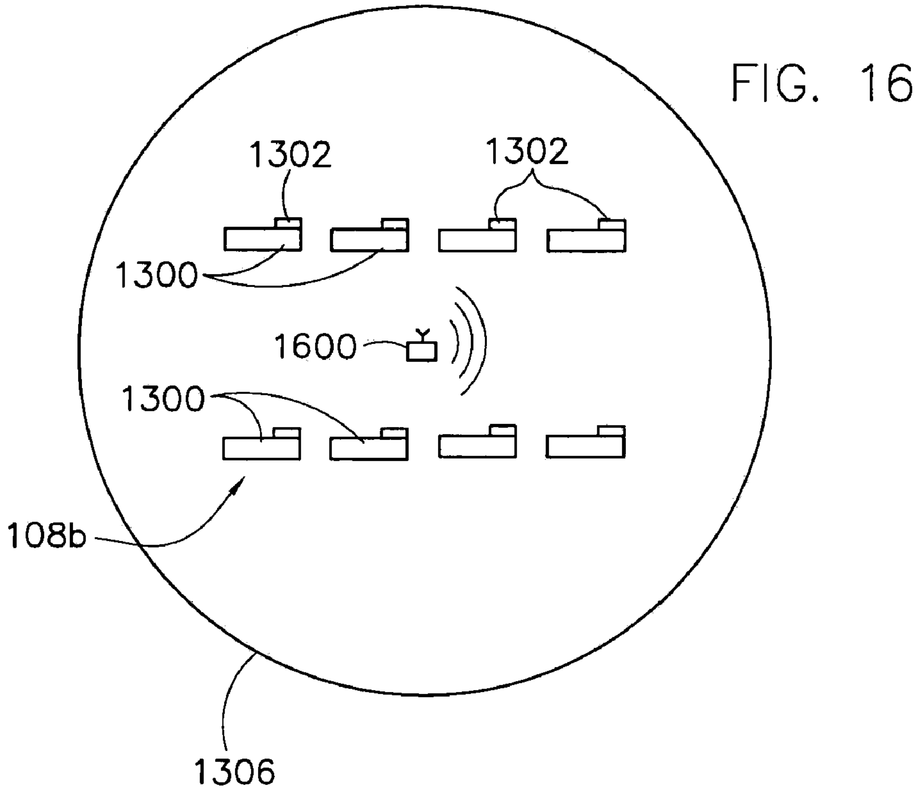
FIG. 16 depicts an artificial lighting system of the automated lighting system of FIG. 1 in accordance with a second exemplary embodiment.

In another exemplary embodiment, a transmitter may integrate with or otherwise interact with controller 106. With reference to FIG. 16, a second lighting system **108*b* is shown in accordance with a second exemplary embodiment. Second lighting system 108*b* may be an example implementation of artificial lighting system 108 integrated with light sensor 104 and/or controller 106. Second lighting system 108*b* may include the plurality of light fixtures 1300. One or more of the plurality of light fixtures 1300 may be the same or may be different. Associated with each of the plurality of light fixtures 1300 is receiver 1302 which receives a control signal from a controller 1600**.

Figure 17:
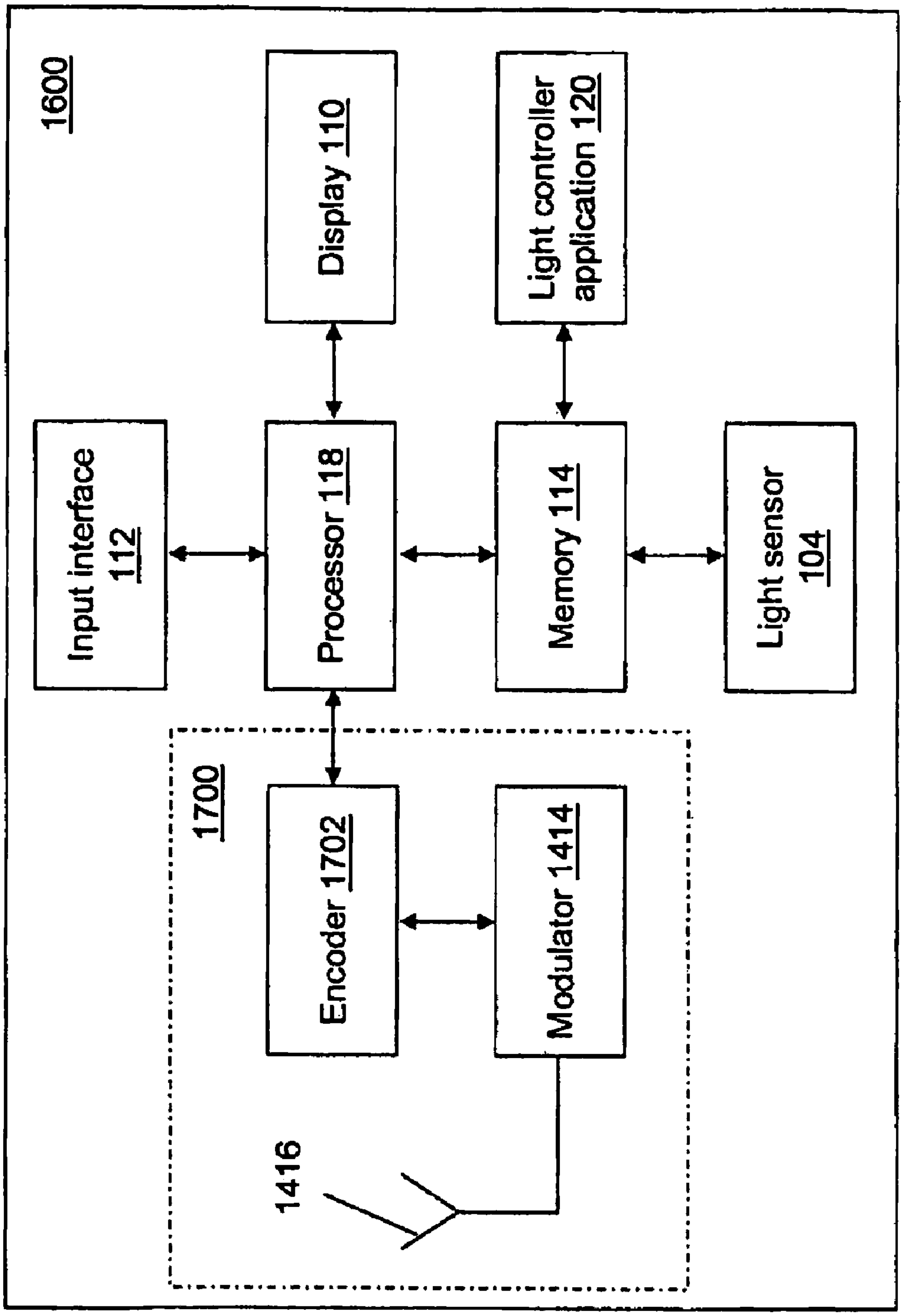
FIG. 17 depicts a block diagram of a controller of the artificial lighting system of FIG. 16 in accordance with an exemplary embodiment.

With reference to FIG. 17, controller 1600 is shown in accordance with an exemplary embodiment. Controller 1600 may send the control signal using a radio frequency to any receivers 1302 within an effective range 1306. Thus, controller 1600 can simultaneously control one or more light fixtures/independently controllable lamp circuits. Controller 1600 may be configured to encode a receiver address in the control signal. Controller 1600 may include light sensor 104, display 110, input interface 112, memory 114, processor 118, light controller application 120, and a transmitter 1700. Light sensor 104 and controller 1600 may be integrated into a single device. Light sensor 104 and controller 1600 may be connected directly. For example, light sensor 104 may connect to controller 1600 using a cable. Different and additional components may be incorporated into controller 1600. For example, controller 1600 may include a communication interface which allows light sensor 104 to connect to controller 1600 using a network that may be wired or wireless.

Light controller application 120 may determine the receiver addresses and the value of the lighting indicator for each receiver address using a light level measured by light sensor 104. Light sensor 104 may periodically measure a light level and store the measured light level in memory 114 so that light controller application 120 can access the information. As known to those skilled in the art, light sensor 104 may be configured to send the measured light level in a message to light controller application 120 without storing the value in memory 114.

Light controller application 120 may accept a lighting control value entered by a system user to set the desired light level in the interior space. For example, the user may enter the desired light level using input interface 112. The user may enter a table of desired light levels which may define the desired light level, for example, as a function of the time of day, of the date, etc. The desired light level(s) may be stored in memory 114. Light controller application 120 compares the desired light level with the light level measured by light sensor 104 and received by light controller application 120. Based on the comparison, light controller application 120 determines the receiver addresses and the value of the lighting indicator for each receiver address. Light controller application 120 may interact with a plurality of light sensors and a plurality of transmitters.

Transmitter 1700 may include an encoder 1702, modulator 1414, and antenna 1416. Encoder 1702 receives the determined receiver addresses and lighting indicator values for each receiver address. Encoder 1702 encodes the received addresses and lighting indicators into a baseband signal supplied to modulator 1414.

Figure 18:
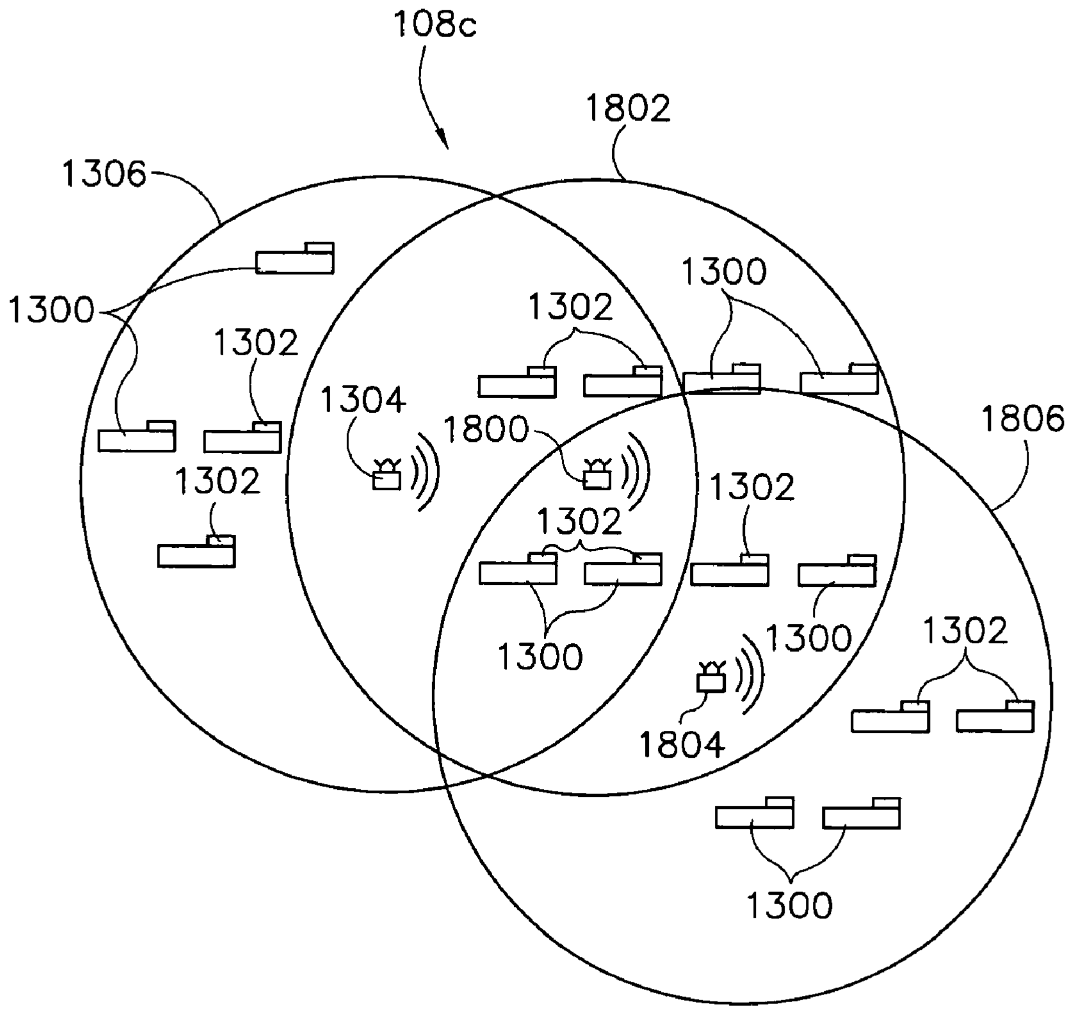
FIG. 18 depicts an artificial lighting system of the automated lighting system of FIG. 1 in accordance with a third exemplary embodiment.

With reference to FIG. 18, a third lighting system 108*c* is shown in accordance with a third exemplary embodiment. Third lighting system 108*c* may be an example implementation of artificial lighting system 108. Third lighting system 108*c* may include the plurality of light fixtures 1300, a transmitter 1304, a first repeater 1800, and a second repeater 1804. One or more of the plurality of light fixtures 1300 may be the same or may be different. Associated with each of the plurality of light fixtures 1300 is receiver 1302 which receives a control signal from transmitter 1304, first repeater 1800, and/or second repeater 1804. In an alternative embodiment, transmitter 1600 may be incorporated into third lighting system 108*c* instead of or in addition to transmitter 1304. First repeater 1800 is positioned within effective range 1306 to reliably receive a control signal from transmitter 1304. First repeater 1800 may receive the control signal from transmitter 1304 and send the control signal using a radio frequency to any receivers 1302 within a first repeater effective range 1802. Thus, first repeater 1800 can simultaneously control one or more light fixtures/independently controllable lamp circuits. Using first repeater 1800, the plurality of light fixtures 1300 positioned outside effective range 1306 can be controlled. Second repeater 1804 may be positioned outside effective range 1306, but within first repeater effective range 1802. Second repeater 1804 may receive the control signal from first repeater 1800 and send the control signal using a radio frequency to any receivers 1302 within a second repeater effective range 1806. Using second repeater 1804, the plurality of light fixtures 1300 positioned outside effective range 1306 and outside first repeater effective range 1802 can be controlled.

Transmitter 1304 may be configured to encode a receiver address or a repeater address in the control signal. In an exemplary embodiment, the address assigned to each repeater is different from any address assigned to a receiver 1302. Transmitter 1304 may send control signals to receivers within effective range 1306. In an alternative embodiment, transmitter 1304 may be configured to encode only a repeater address in the control signal so that transmitter 1304 does not send control signals encoded for processing by receivers 1302. In such a configuration, the plurality of light fixtures are positioned within first repeater effective range 1802 or second repeater effective range 1806. First repeater 1800 sends control signals to the receivers 1302 within first repeater effective range 1802 and to second repeater 1804. Second repeater 1804 sends control signals to the receivers 1302 within second repeater effective range 1806. Thus, first repeater 1800 and second repeater 1804 may encode a receiver address and/or a repeater address with the lighting indicator value. Additional repeaters may be positioned within effective range 1306, first repeater effective range 1802, and/or second repeater effective range 1806 to provide additional areas of coverage. Use and positioning of repeaters provides lighting control over a potentially wide area and around obstacles and/or electromagnetic interference sources.

Figure 19:
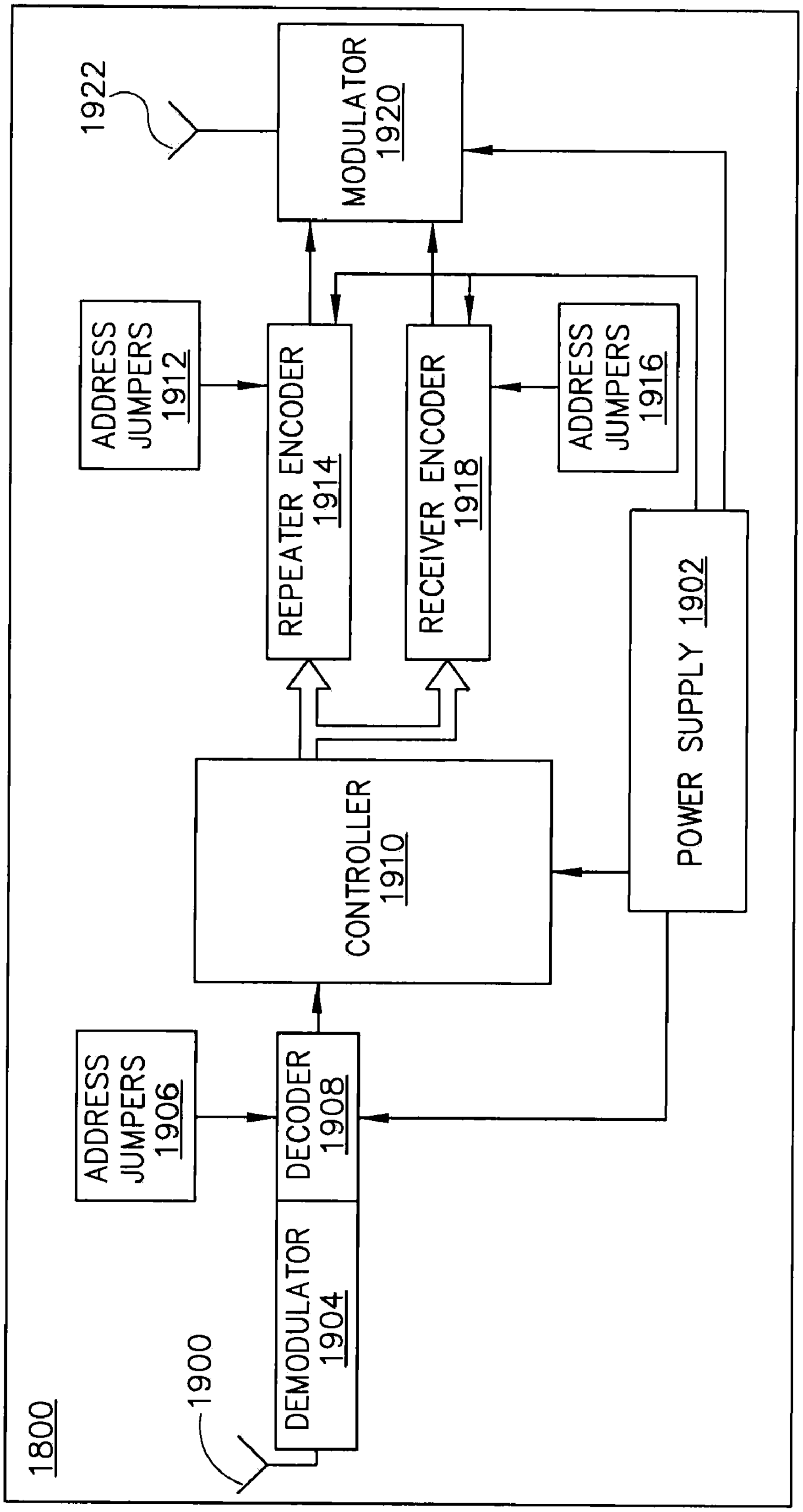
FIG. 19 depicts a block diagram of a repeater of the artificial lighting system of FIG. 18 in accordance with an exemplary embodiment.

With reference to FIG. 19, first repeater 1800 is shown in accordance with an exemplary embodiment. First repeater 1800 and second repeater 1804 may be the same or may be different. First repeater 1800 may include a receive antenna 1900, a power supply 1902, a demodulator 1904, first address jumpers 1906, a decoder 1908, a controller 1910, second address jumpers 1912, a repeater encoder 1914, third address jumpers 1916, a receiver encoder 1918, a modulator 1920, and a transmit antenna 1922. First repeater 1800 may include a single antenna which acts as a transceiver for both receiving and transmitting signals. First repeater 1800 may include additional or different components.

Receive antenna 1900 receives the control signal, for example, from transmitter 1304. Receive antenna 1900 may receive a radio frequency signal. Power supply 1902 provides power to first repeater 1800. Demodulator 1904 demodulates the received control signal to a baseband signal. In an exemplary embodiment, demodulator 1904 may be a model TDL9927 superheterodyne receiver sold by Foshan Tuodi Electronics Co., Ltd. of Bao'an District of Shenzhen City, Guangdong Province, China. First address jumpers 1906 may be used to define the address of first repeater 1800 and to provide the address to decoder 1908 for comparison with the repeater address extracted from the control signal. Decoder 1908 decodes the demodulated control signal to extract the values of the repeater address. In an exemplary embodiment, decoder 1908 may be a model PT2272 remote control decoder sold by Princeton Technology Corp. of Sindian City, Taipei 23145, Taiwan. Decoder 1908 may respond to only control signals encoded with a repeater address that matches the address of first repeater 1800. In an alternative embodiment, decoder 1908 may respond to all received control signals, irrespective of the repeater address encoded in the control signal. Decoder 1908 decodes the demodulated control signal to extract one or more receiver address and associated lighting indicator value.

Controller 1910 may determine which control signals to process based on a repeater address supplied to controller 1910, for example, using switches, first address jumpers 1906, values stored in a memory, etc. Controller 1910 can be any suitable logic device, for example, a microprocessor or microcontroller, programmable logic controller, custom logic circuitry, etc. Controller 1910 includes an output bus that supplies the extracted one or more receiver address and associated lighting indicator values to an appropriate encoder.

Second address jumpers 1912 may be used to define the address of second repeater 1804 and to provide the address to repeater encoder 1914. Repeater encoder 1914 encodes the extracted one or more receiver address and associated lighting indicator values and the repeater address provided by second address jumpers 1912 into a baseband signal supplied to modulator 1920. In an exemplary embodiment, repeater encoder 1914 may be a model PT2262 remote control encoder sold by Princeton Technology Corp. of Sindian City, Taipei 23145, Taiwan. Other encoders may be used.

Third address jumpers 1916 may be used to define the address of one or more receivers 1302 and to provide the address to receiver encoder 1918. Receiver encoder 1918 encodes the receiver address provided by third address jumpers 1916 the lighting indicator value associated with the receiver address into a baseband signal supplied to modulator 1920. In an exemplary embodiment, receiver encoder 1918 may be a model PT2262 remote control encoder sold by Princeton Technology Corp. of Sindian City, Taipei 23145, Taiwan. Other encoders may be used.

Additional second address jumpers 1912 and repeater encoder 1914 combinations may be used, for example, if first repeater 1800 is responsible for communicating with multiple repeaters positioned within first repeater effective range 1802. First repeater 1800 may not include second address jumpers 1912 and repeater encoder 1914 if a repeater is not positioned within first repeater effective range 1802. Additional third address jumpers 1916 and receiver encoder 1918 combinations also may be used, for example, if receivers are assigned different addresses in order to independently control the lighting level at different light fixtures and first repeater 1800 is responsible for communicating with multiple receivers positioned within first repeater effective range 1802.

Light fixtures/independently controllable lamp circuits may be controlled independently or based on defined groupings depending on how the receive addresses are defined. For example, if all receivers 1302 are assigned the same address, the light fixtures/independently controllable lamp circuits are controlled using the same lighting indicator value. If all receivers 1302 are assigned a unique address, the light fixtures/independently controllable lamp circuits can be controlled independently using potentially different lighting indicator values associated with each receiver address. Additionally, receivers 1302 may divided into sub-groups which have a common address within the group so that groups of light fixtures/independently controllable lamp circuits can be controlled independently using potentially different lighting indicator values associated with each group address. Repeaters and/or receivers may receive multiple control signals thereby providing signal redundancy and increasing system reliability. A ping-pong effect is avoided through the use of uniquely assigned repeater addresses and assigned repeater communication paths based on the address jumpers and repeater encoders.

Modulator 1920 provides a modulated signal to transmit antenna 1922 for sending the control signal to second repeater 1804 and/or one or more receivers 1302. In an exemplary embodiment, modulator 1920 is a radio frequency modulation circuit constructed of discrete components or using an integrated circuit. Additionally, in an exemplary embodiment, modulator 1920 is configured to provide amplitude shift keying modulation and/or frequency shift keying modulation at a nominal operating frequency of 315 megahertz (MHz) with a transmission power of about 6 millivolts/meter (mV/m) at 3 meters. However, this is not required, and other operating frequencies, modulation schemes, and transmission power levels can be used. For example, frequencies in the range of 27-930 MHz, and particularly within about 5% of 315, 434, 868, and/or 915 MHz may be used. Additionally, other frequencies such as 2.4 gigahertz may be used. Transmitter 1304, 1600, receiver 1302, and first repeater 1800 may be designed to qualify as unlicensed radio frequency devices under the Federal Communications Commission rules found in 47 C.F.R. 15.

Figure 20:
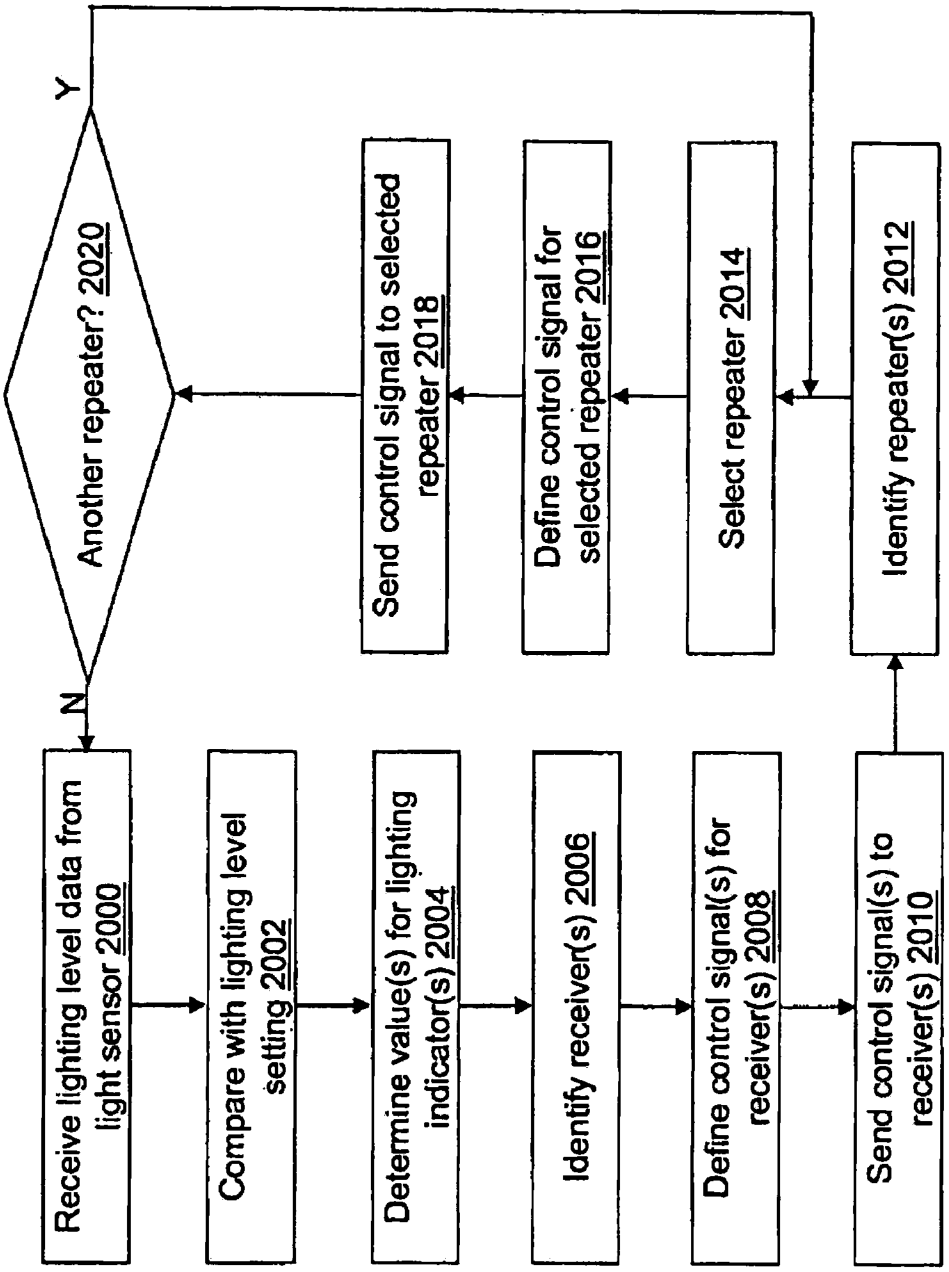
FIG. 20 depicts a flow diagram illustrating exemplary operations performed by a controller in controlling the automated lighting system of FIG. 1 in accordance with an exemplary embodiment.

With reference to FIG. 20, exemplary operations that may be associated with light controller application 120 and/or transmitter 1304, 1600 are described. Additional, fewer, or different operations may be performed, depending on the embodiment. The order of presentation of the operations is not intended to be limiting. In an operation 2000, lighting level data is received from light sensor 104. In an operation 2002, the received lighting level data is compared with a lighting level setting. The lighting level setting may indicate a desired brightness using a numerical scale. The desired brightness also may indicate a dim level for a light fixture which may be continuously variable. For example, the lighting level setting may be one to indicate lights on and zero to indicate lights off. Alternatively, the lighting level setting may be a scale between 1 and 4, 1 and 10, etc. In an operation 2004, a lighting indicator value is determined based on the comparison. Depending on the embodiment, multiple lighting indicator values may be determined for different light fixtures/independently controllable lamp circuits.

In an operation 2006, a receiver address is identified for receiving the determined lighting indicator value. Depending on the embodiment, multiple receivers may receive the same lighting indicator value. Alternatively, each receiver may receive a different lighting indicator value. Additionally, each receiver may have a unique address, may have the same address, or may have a receiver group address. In an operation 2008, a control signal is defined for the identified receiver. The control signal includes the lighting indicator value. For example, the control signal may be encoded and modulated. Multiple control signals may be defined if multiple receivers are sent independent lighting indicator values. In an operation 2010, the defined control signal is sent to the identified receiver. For example, the defined control signal may be sent by a transmit antenna using a radio frequency pulse.

In an operation 2012, one or more repeater address is identified for receiving the determined lighting indicator value associated with one or more receiver address. In an operation 2014, a repeater of the identified repeater(s) is selected. In an operation 2016, a control signal is defined for the selected repeater. The control signal includes the address for the selected repeater and the determined lighting indicator value(s) associated with one or more receiver address. For example, the control signal may be encoded and modulated. In an operation 2018, the defined control signal is sent to the selected repeater. For example, the defined control signal may be sent by a transmit antenna using a radio frequency pulse. In an operation 2020, a determination is made concerning whether or not another repeater was identified in operation 2012. If another repeater was identified in operation 2012, processing continues at operation 2014. If another repeater was not identified in operation 2012, processing continues at operation 2000.

Figure 21:
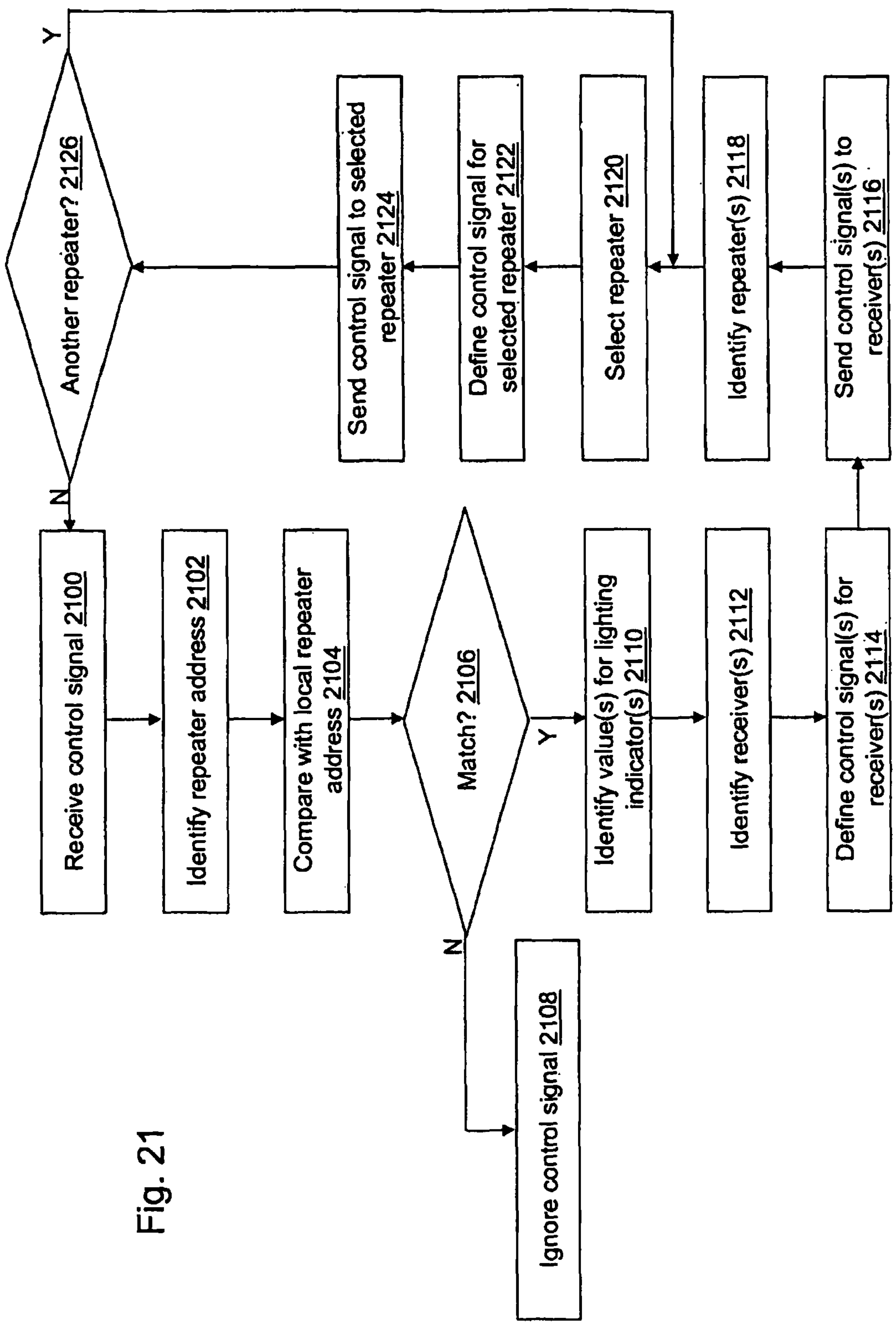
FIG. 21 depicts a flow diagram illustrating exemplary operations performed by a repeater in controlling the automated lighting system of FIG. 1 in accordance with an exemplary embodiment.

With reference to FIG. 21, exemplary operations that may be associated with first repeater 1800 are described. Additional, fewer, or different operations may be performed, depending on the embodiment. The order of presentation of the operations is not intended to be limiting. In an operation 2100, a control signal is received. For example, the control signal may be received by a receive antenna. In an operation 2102, a repeater address is identified from the received control signal. For example, the control signal may be demodulated and/or decoded to extract the repeater address. In an operation 2104, the extracted repeater address is compared with a local repeater address of first repeater 1800. In an operation 2106, a determination is made concerning whether or not there is a match between the identified repeater address and the repeater address based on the comparison. If there is not a match between the identified repeater address and the repeater address, processing continues in an operation 2108. In operation 2108, the control signal is ignored.

If there is a match between the identified repeater address and the repeater address, processing continues in an operation 2110. In operation 2110, a lighting indicator value is identified from the control signal. In an operation 2112, a receiver address associated with the lighting indicator value is identified. Depending on the embodiment, multiple lighting indicator values may be determined for different light fixtures/ independently controllable lamp circuits. In an operation 2114, a control signal is defined for the identified receiver. In an operation 2116, the control signal is sent to the identified receiver. A control signal may be defined and sent for each identified receiver. Thus, a plurality of control signals may be sent.

In an operation 2118, one or more repeater address is identified for receiving the determined lighting indicator value(s) associated with one or more receiver address. In an operation 2120, a repeater of the identified repeater(s) is selected. In an operation 2122, a control signal is defined for the selected repeater. The control signal includes the address for the selected repeater and the determined lighting indicator value(s) associated with one or more receiver address. For example, the control signal may be encoded and modulated. In an operation 2124, the defined control signal is sent to the selected repeater. For example, the defined control signal may be sent by a transmit antenna using a radio frequency pulse. In an operation 21226, a determination is made concerning whether or not another repeater was identified in operation 2118. If another repeater was identified in operation 2118, processing continues at operation 2120 by selecting the next repeater. If another repeater was not identified in operation 2118, processing continues at operation 2100.

Figure 22:
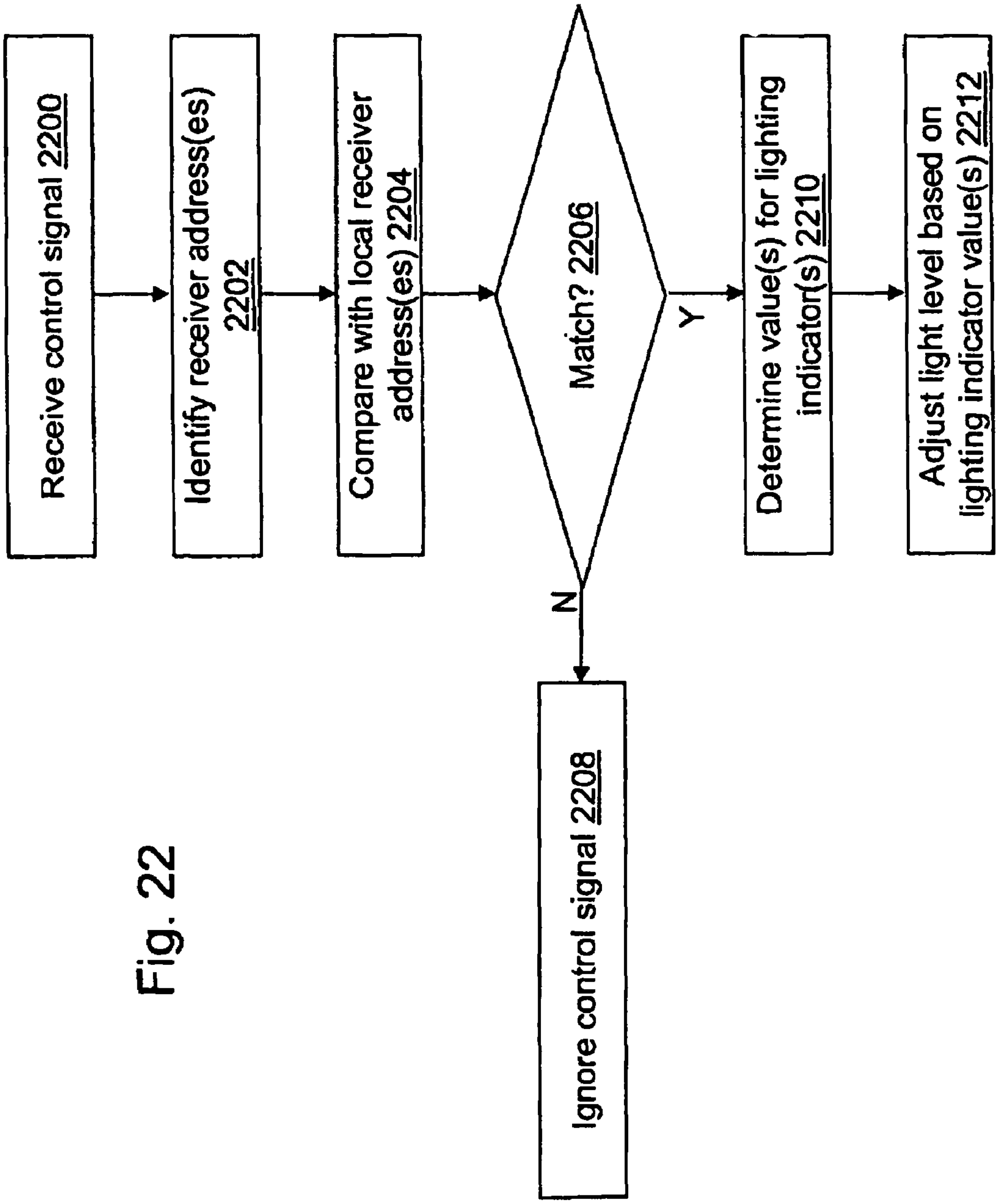
FIG. 22 depicts a flow diagram illustrating exemplary operations performed by a receiver in controlling the automated lighting system of FIG. 1 in accordance with an exemplary embodiment.

With reference to FIG. 22, exemplary operations that may be associated with receiver 1302 are described. Additional, fewer, or different operations may be performed, depending on the embodiment. The order of presentation of the operations is not intended to be limiting. In an operation 2200, a control signal is received. For example, the control signal may be received by a receive antenna. In an operation 2202, a receiver address is identified from the received control signal. For example, the control signal may be demodulated and/or decoded to extract the receiver address. In an operation 2204, the identified receiver address is compared with a local receiver address of receiver 1302. In an operation 2206, a determination is made concerning whether or not there is a match between the identified receiver address and the local receiver address based on the comparison. If there is not a match between the identified receiver address and the local receiver address, processing continues in an operation 2208. In operation 2208, the control signal is ignored.

If there is a match between the identified receiver address and the local receiver address, processing continues in an operation 2210. In operation 2210, a lighting indicator value is identified from the control signal. Depending on the embodiment, multiple lighting indicator values may be determined for independently controllable lamp circuits. In an operation 2212, the light level of the light fixture is adjusted based on the identified lighting indicator value. A control signal may be received for each independently controllable lamp circuits. Thus, a plurality of control signals may be received and processed to adjust the light level of the light fixture.

Figure 23:
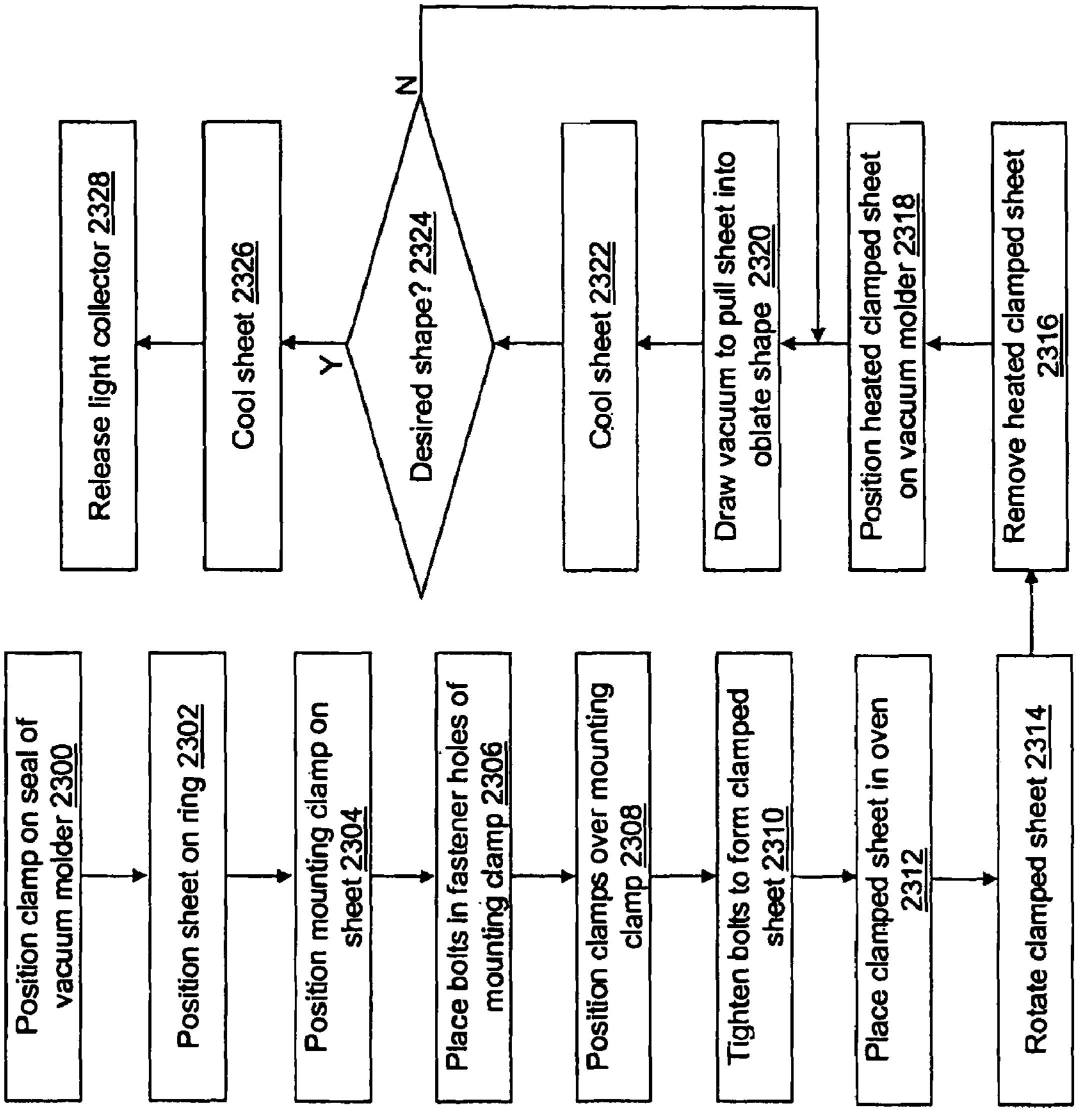
FIG. 23 depicts a flow diagram illustrating exemplary operations performed in forming a shell of the light collection system of FIG. 3 in accordance with an exemplary embodiment.
Figure 24:
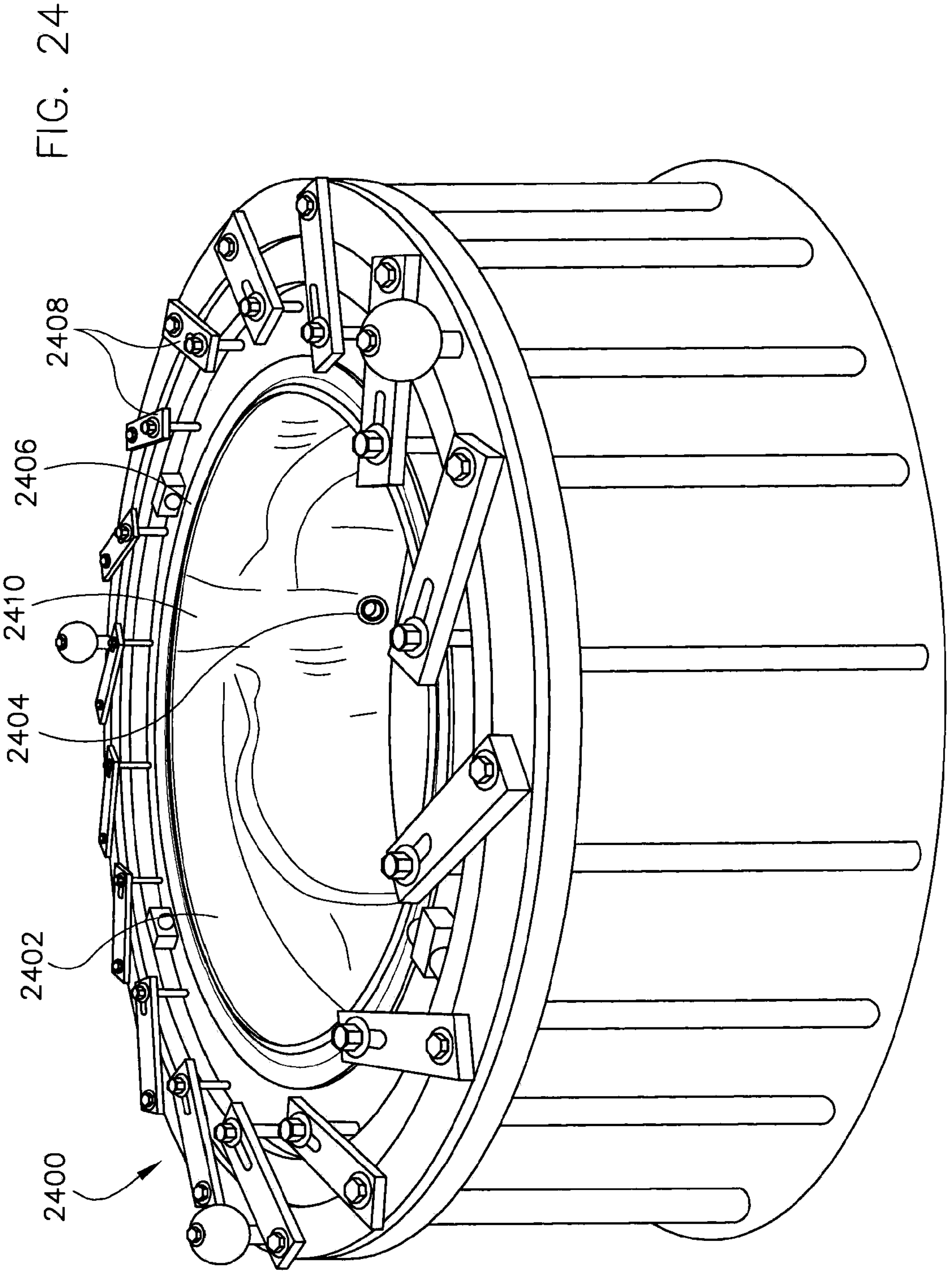
FIG. 24 depicts a vacuum molder used in forming the shell of the light collection system of FIG. 3 in accordance with an exemplary embodiment.

With reference to FIG. 23, exemplary operations are described that may be performed in forming shell 404 of light collection system 204. Additional, fewer, or different operations may be performed, depending on the embodiment. The order of presentation of the operations is not intended to be limiting. In an operation 2300, a positioning clamp is positioned on a seal of a vacuum molder. For example, with reference to FIG. 24, a vacuum molder 2400 is shown in accordance with an exemplary embodiment. Vacuum molder 2400 may include a tub 2402, a vacuum draw tube 2404, a seal 2406, and clamps 2408. Tub 2402 includes a circumferential edge 2510. Tub 2402 is sized and shaped based on a shape and a size of the desired formed product. For example, to form light collector 300, tub 2402 may have a generally cylindrical shape.

Figure 25:
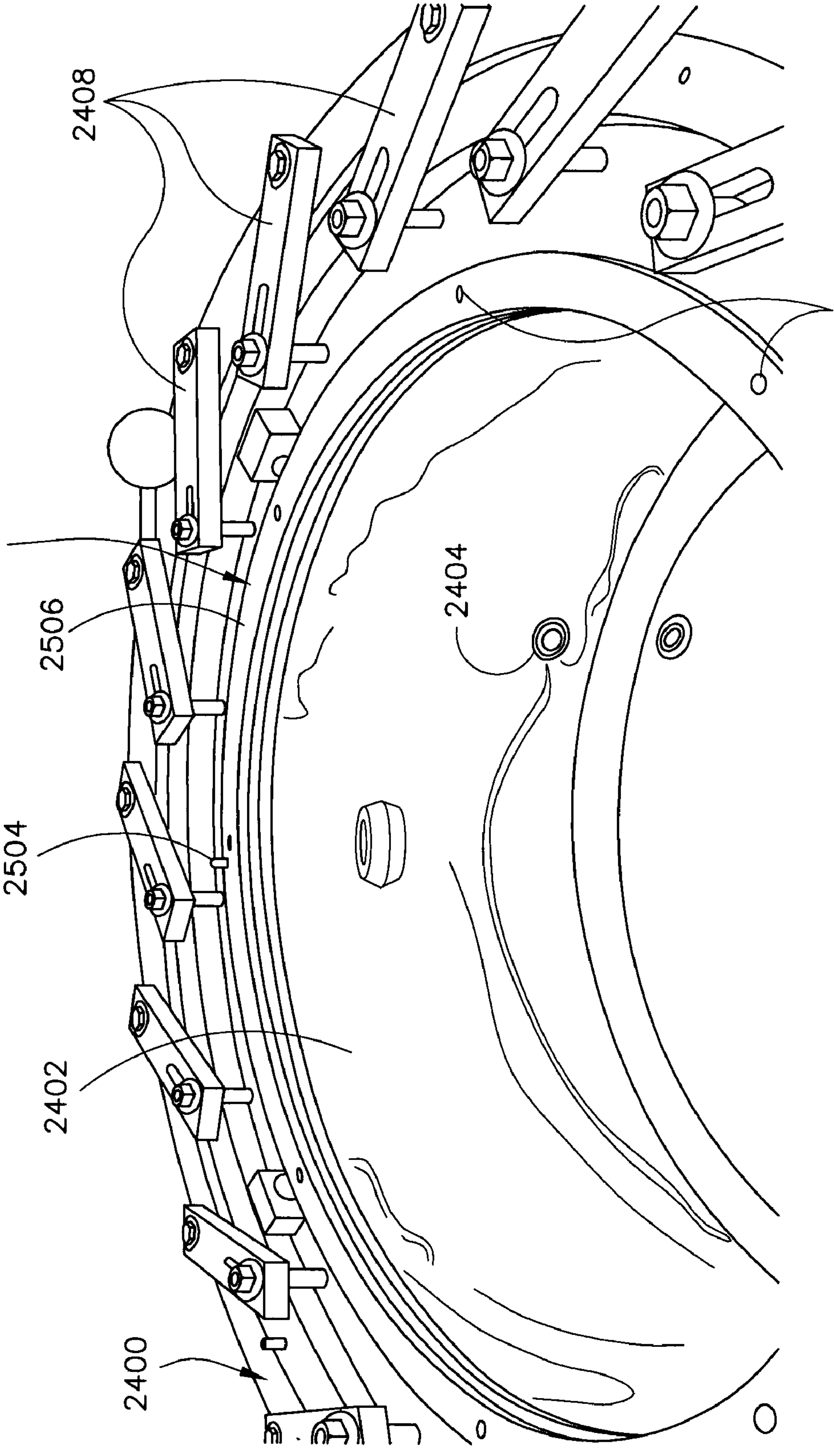
FIG. 25 depicts the vacuum molder of FIG. 24 including a positioning clamp in accordance with an exemplary embodiment.

With reference to FIG. 25, a positioning clamp 2500 is positioned over seal 2406 and centered over tub 2402 in accordance with an exemplary embodiment. Positioning clamp 2500 may include fastener holes 2502, a plurality of centering pins 2504, and a plurality of light collector centering pins 2506. For example, positioning clamp 2500 may include eight fastener holes 2502, two centering pins 2504, and three light collector centering pins 2506 distributed about a circumference of positioning clamp 2500. The three light collector centering pins 2506 may form an equilateral triangle to accurately center light collector material on positioning clamp 2500.

Figure 26:
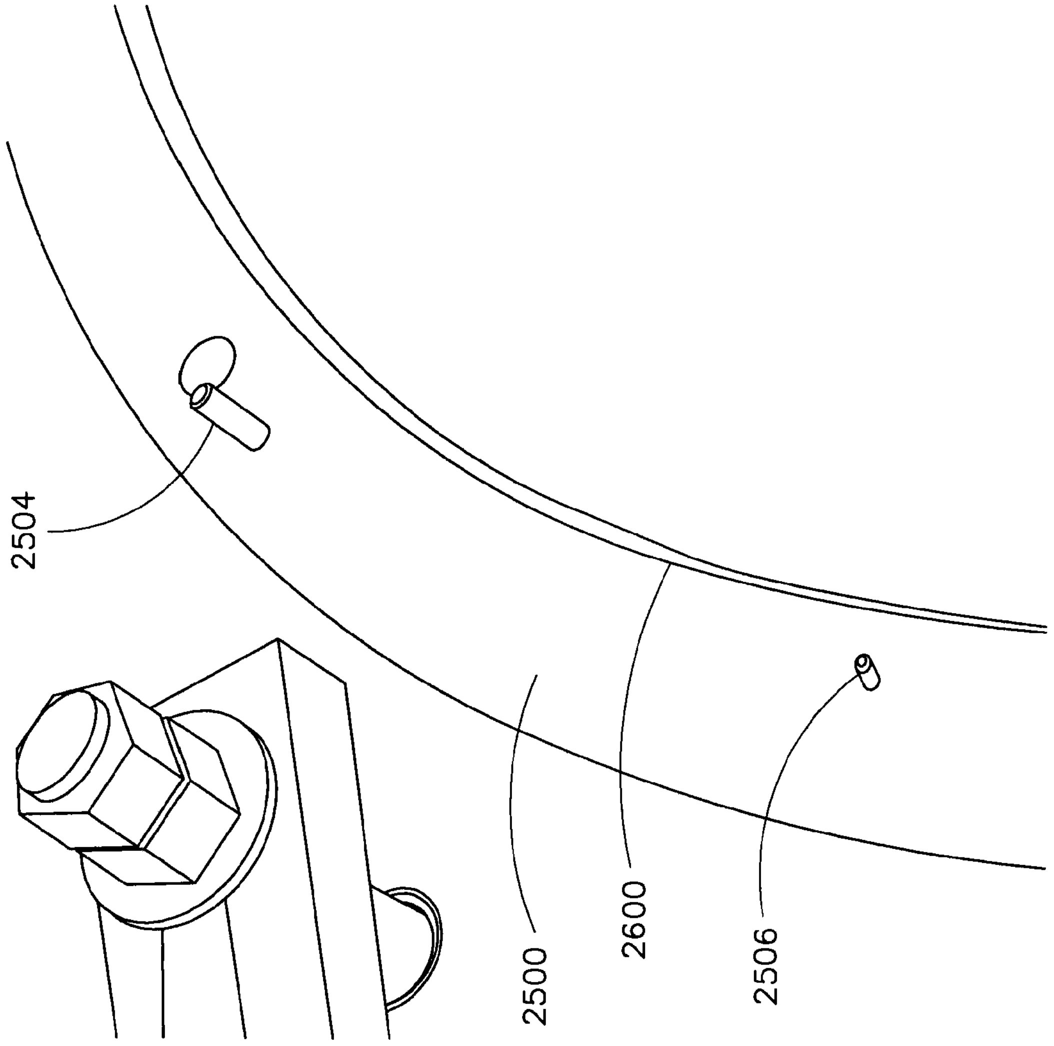
FIG. 26 depicts a detailed view of the positioning clamp of FIG. 25 in accordance with an exemplary embodiment.

With reference to FIG. 26, a detailed view of a portion of positioning clamp 2500 is shown in accordance with an exemplary embodiment. Positioning clamp 2500 may be formed of metal material. Positioning clamp 2500 may include an inner edge 2600 that faces an interior of tub 2402. Inner edge 2600 may be curved to form a transition angle between flange 406 of light collector 300 and shell 404. Circumferential edge 2510 may have a diameter that is approximately equal to or greater than a diameter of inner edge 2600. In an exemplary embodiment, inner edge 2600 has a diameter of approximately 23.4375 inches.

Figure 27:
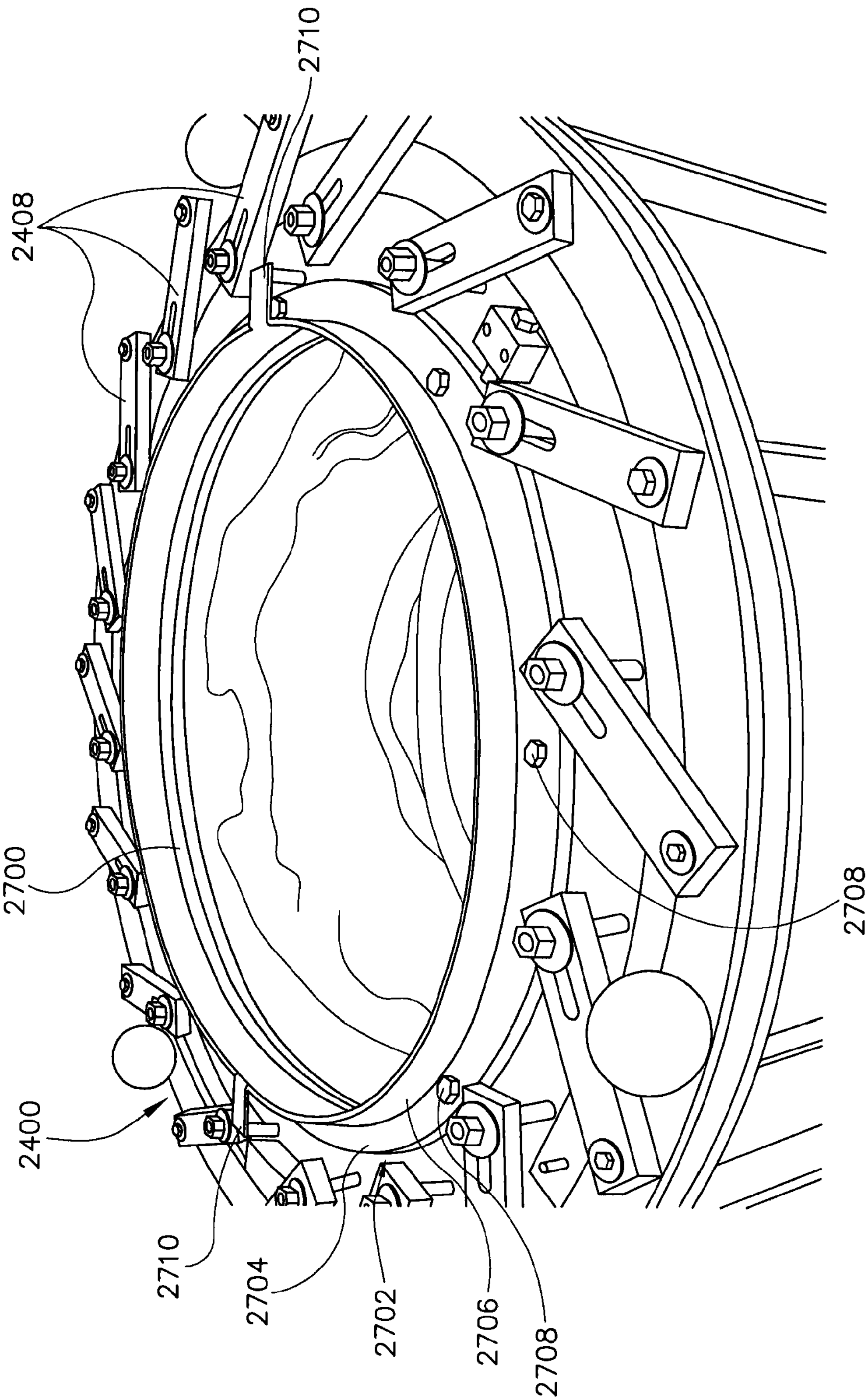
FIG. 27 depicts the vacuum molder of FIG. 24 including a mounting clamp in accordance with an exemplary embodiment.

With continuing reference to FIG. 23, in an operation 2302, a sheet of light collector material is positioned on positioning clamp 2500 using the plurality of light collector centering pins 2506 to properly center the sheet. In an exemplary embodiment, a 24-inch diameter sheet of acrylic having a 0.22 inch thickness is used. With continuing reference to FIG. 23, in an operation 2304, a mounting clamp is positioned on the sheet of light collector material. With reference to FIG. 27, a sheet 2700 of light collector material and a mounting clamp 2702 are shown in accordance with an exemplary embodiment. Mounting clamp 2702 may include fastener holes (not visible), a first flange 2704, a second flange 2706, and braces 2710. Second flange 2706 extends from first flange 2704 forming an approximately right angle between the flanges. Second flange 2706 is positioned towards the interior of tub 2402. First flange 2704 is positioned over sheet 2700 using the plurality of centering pins 2504 to properly center mounting clamp 2702 on sheet 2700. The plurality of centering pins 2504 may insert in corresponding alignment holes of mounting clamp 2702.

With continuing reference to FIGS. 23 and 27, in an operation 2306, fasteners 2708 are placed in the fastener holes of positioning clamp 2500 and mounting clamp 2702. For example, fasteners 2708 may include eight bolts. In an operation 2308, clamps 2408 are positioned over first flange 2704 of mounting clamp 2702. For example, clamps 2408 may be manually or automatically positioned. In an operation 2310, fasteners 2708 are tightened to form a clamped sheet of light collector material. In an operation 2312, the clamped sheet of light collector material is placed in an oven. For example, the clamped sheet of light collector material may be grasped using braces 2710 and placed in the oven.

Figure 28:
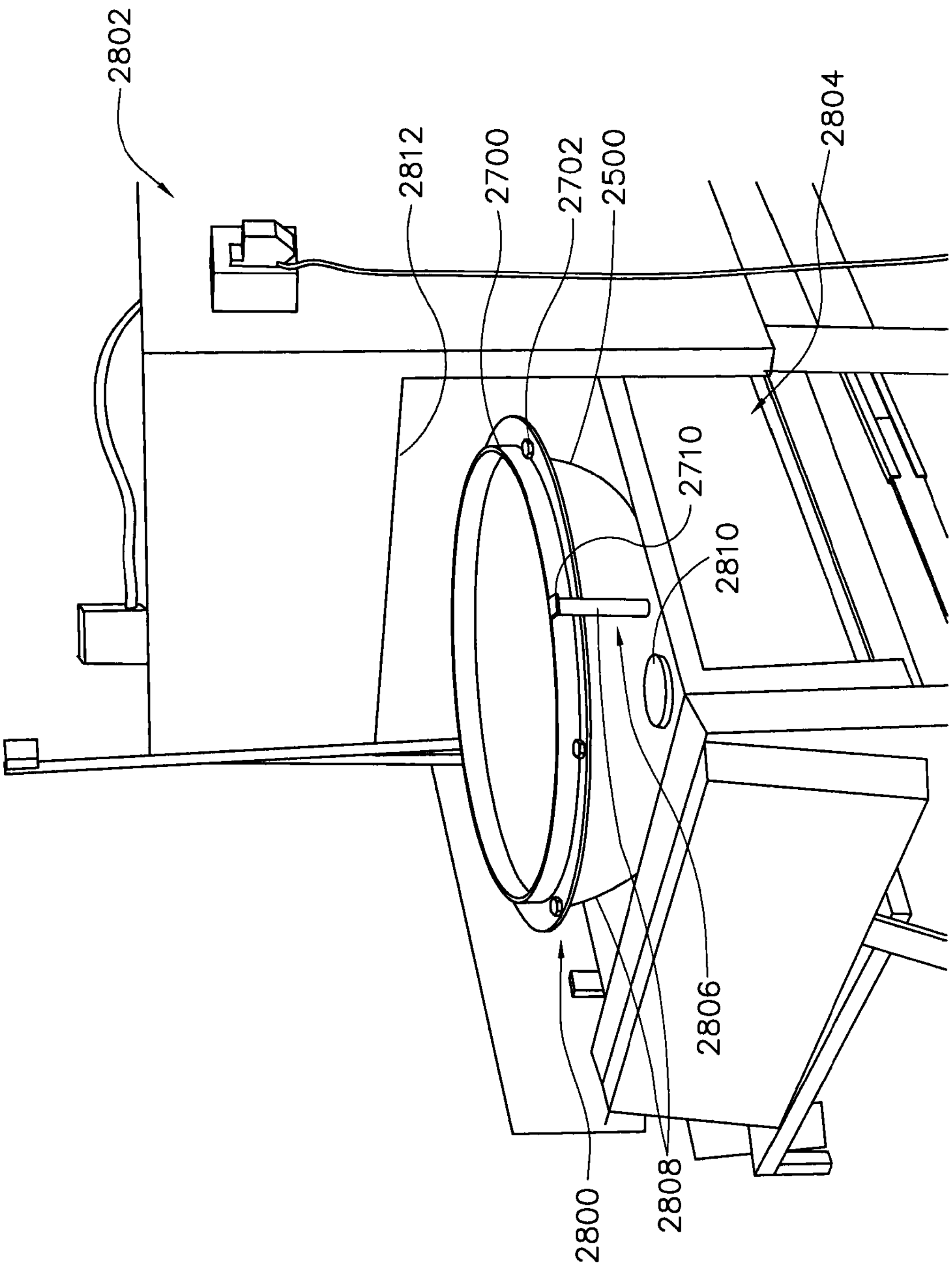
FIG. 28 depicts an oven used in forming the shell of the light collection system of FIG. 3 in accordance with an exemplary embodiment.
Figure 37:
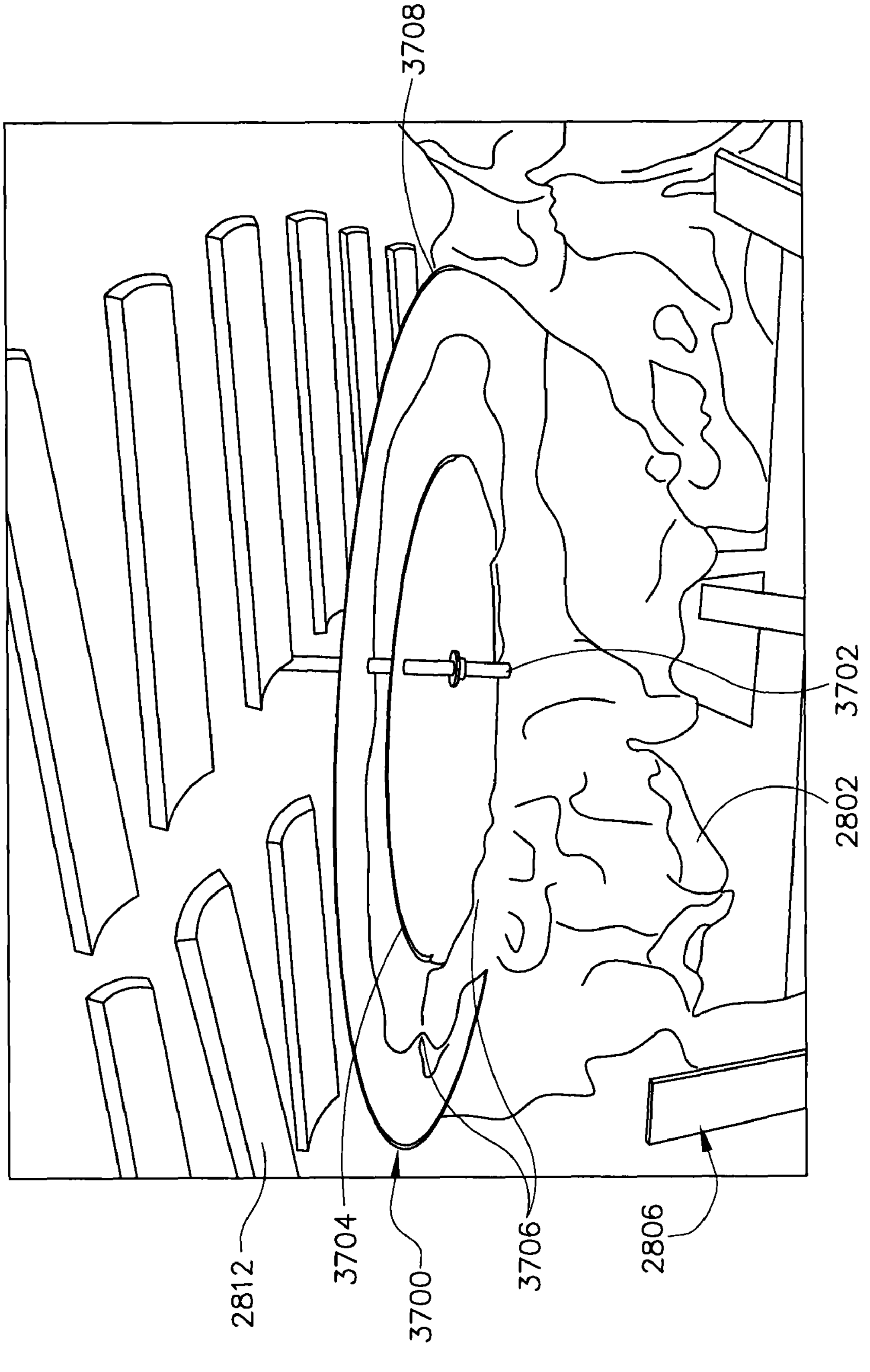
FIG. 37 depicts a second view of the oven of FIG. 28 used in forming the shell of the light collection system of FIG. 3 in accordance with an exemplary embodiment.

With reference to FIGS. 28 and 37, a clamped sheet 2800 and an oven 2802 are shown in accordance with an exemplary embodiment. Clamped sheet 2800 is sandwiched between positioning clamp 2500 and mounting clamp 2702 and grasped using braces 2710. Oven 2802 may include a drawer 2804, a turnstile 2806, heating elements 2812, and a blind 3700. Drawer 2804 may be slid out from a heating cavity of oven 2802 to allow placement of clamped sheet 2800 on turnstile 2806. Turnstile 2806 may include a plurality of legs 2808 which extend from a base 2810. In an exemplary embodiment, heating elements 2812 may include twelve 240 Volt infrared heating elements operated fully on though other heating elements 2812 may be used without limitation. Clamped sheet 2800 may be positioned on turnstile 2806 and drawer 2804 may be closed. At least a portion of an interior surface of oven 2802 may be formed of a reflective material to improve heat distribution.

With reference to FIG. 37, blind 3700 may be suspended from a surface of oven 2802. For example, a rod 3702 may support blind 3700 from a top surface 3710 of oven 2802. In an exemplary embodiment, blind 3700 is suspended between heating elements 2812 and turnstile 2806. Blind 3700 may be suspended approximately three inches below heating elements 2812 and approximately eight inches above clamped sheet 2800. In the exemplary embodiment of FIG. 37, blind 3700 includes an inner ring 3704, a plurality of spokes 3706, and an outer ring 3708. Inner ring 3704 may be solid and extend from rod 3702 approximately eleven inches. The plurality of spokes 3706 connect inner ring 3704 with outer ring 3708 and provide support for outer ring 3708. The plurality of spokes 3706 may have a length of approximately six inches. Outer ring 3708 may be solid and may have a thickness of approximately one inch. Blind 3700 promotes uneven heat distribution from heating elements 2812 on clamped sheet 2800 to achieve a desired shape for the light collector material using vacuum molder 2400. For example, blind 3700 maintains an approximate center portion of clamped sheet 2800 cooler relative to an edge of clamped sheet 2800 which extends beyond outer ring 3708 and relative to a portion of clamped sheet 2800 which extends between outer ring 3708 and inner ring 3704 to promote formation of an oblate shaped dome. Blind 3700 may be formed of aluminum or other suitable material that promotes uneven heating based on the type of heating elements used.

With continuing reference to FIGS. 23 and 28, in an operation 2314, clamped sheet 2800 is rotated on turnstile 2806 to obtain even heat distribution over sheet 2700. As known to those skilled in the art, base 2810 of turnstile 2806 may be rotated by an actuator or manually. In an exemplary embodiment, turnstile 2810 may be rotated at 1.5-6 revolutions per minute though other rotation rates may be used without limitation. In an operation 2316, clamped sheet 2800 is removed from the oven. In an exemplary embodiment, clamped sheet 2800 is heated for approximately 3-3.5 minutes. In an operation 2318, the heated clamped sheet 2800 is positioned on vacuum molder 2400. In an exemplary embodiment, heated clamped sheet 2800 is maintained level as it is positioned on vacuum molder 2400.

In an operation 2320, a vacuum is drawn to pull sheet 2700 into a desired shape. For example, approximately 1.6-6 inches of mercury may be drawn on the vacuum. Seal 2406 assists in maintaining a vacuum in tub 2402. In an operation 2322, sheet 2700 is cooled with compressed air. For example, compressed air at approximately 80 pounds per square inch supply pressure is circulated circumferentially around sheet 2700. In an operation 2324, a determination is made concerning whether or not a desired shape is achieved. If a desired shape is achieved, processing continues at an operation 2326. If a desired shape is not achieved, processing continues at operation 2320. In an exemplary embodiment, 2-3 repetitions of operations 2320-2324 may be performed. In operation 2326, the sheet of light collector material is allowed to cool further. In an operation 2328, light collector 300 is released from positioning clamp 2500 and mounting clamp 2702 by removing fasteners 2708.

Figure 29:
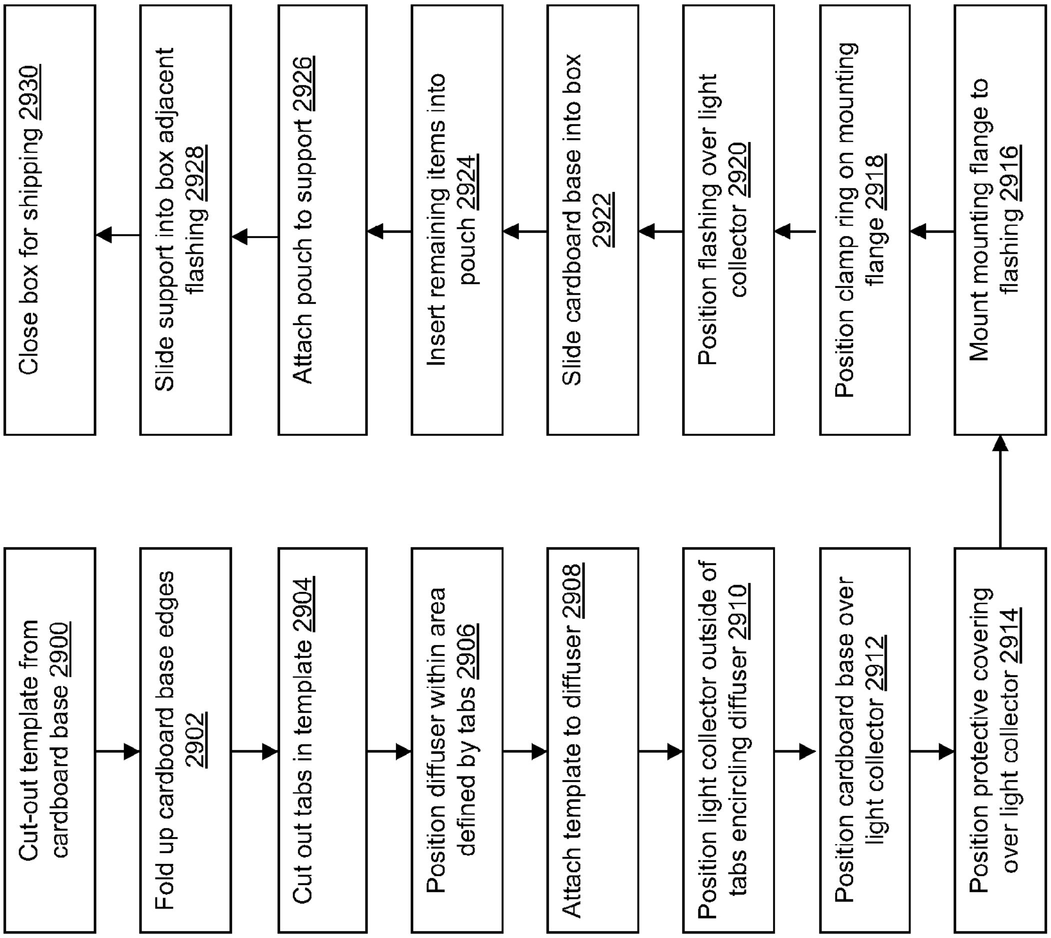
FIG. 29 depicts a flow diagram illustrating exemplary operations performed in packaging the light pipe system of FIG. 2*a* in accordance with an exemplary embodiment.
Figure 30:
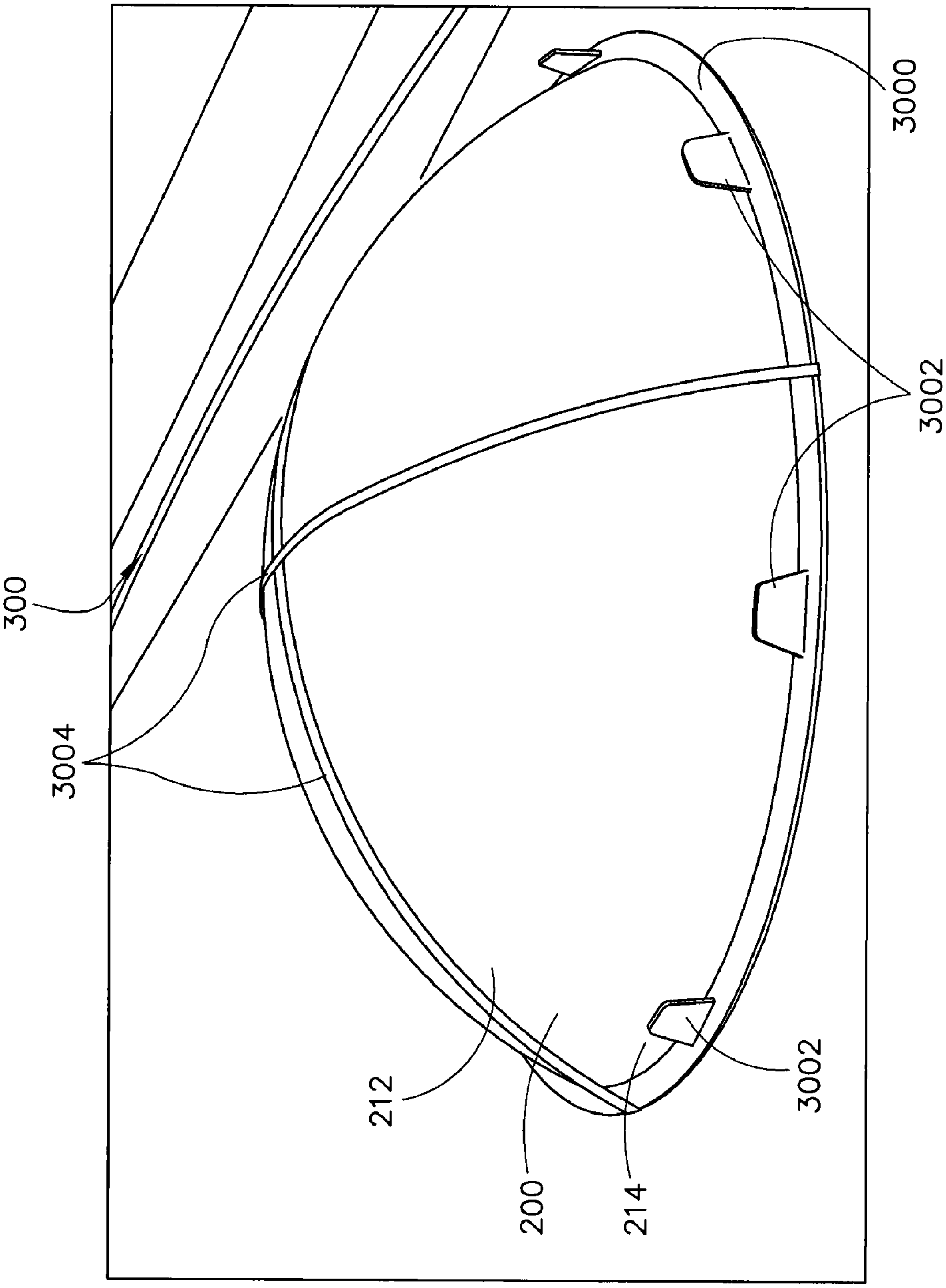
FIG. 30 depicts a diffuser packaging in accordance with an exemplary embodiment.
Figure 31:
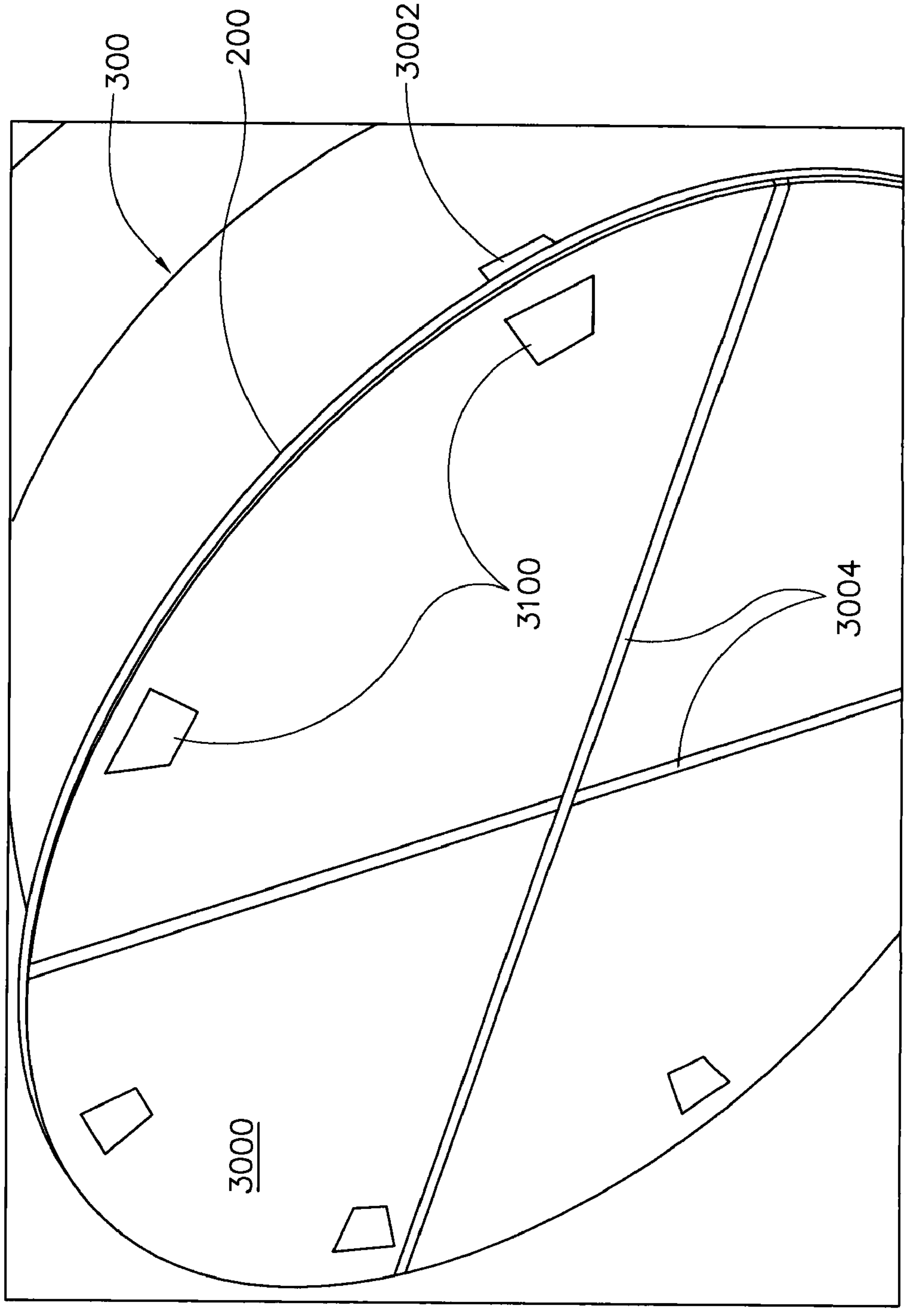
FIG. 31 depicts a light collector packaging in accordance with an exemplary embodiment.
Figure 32:
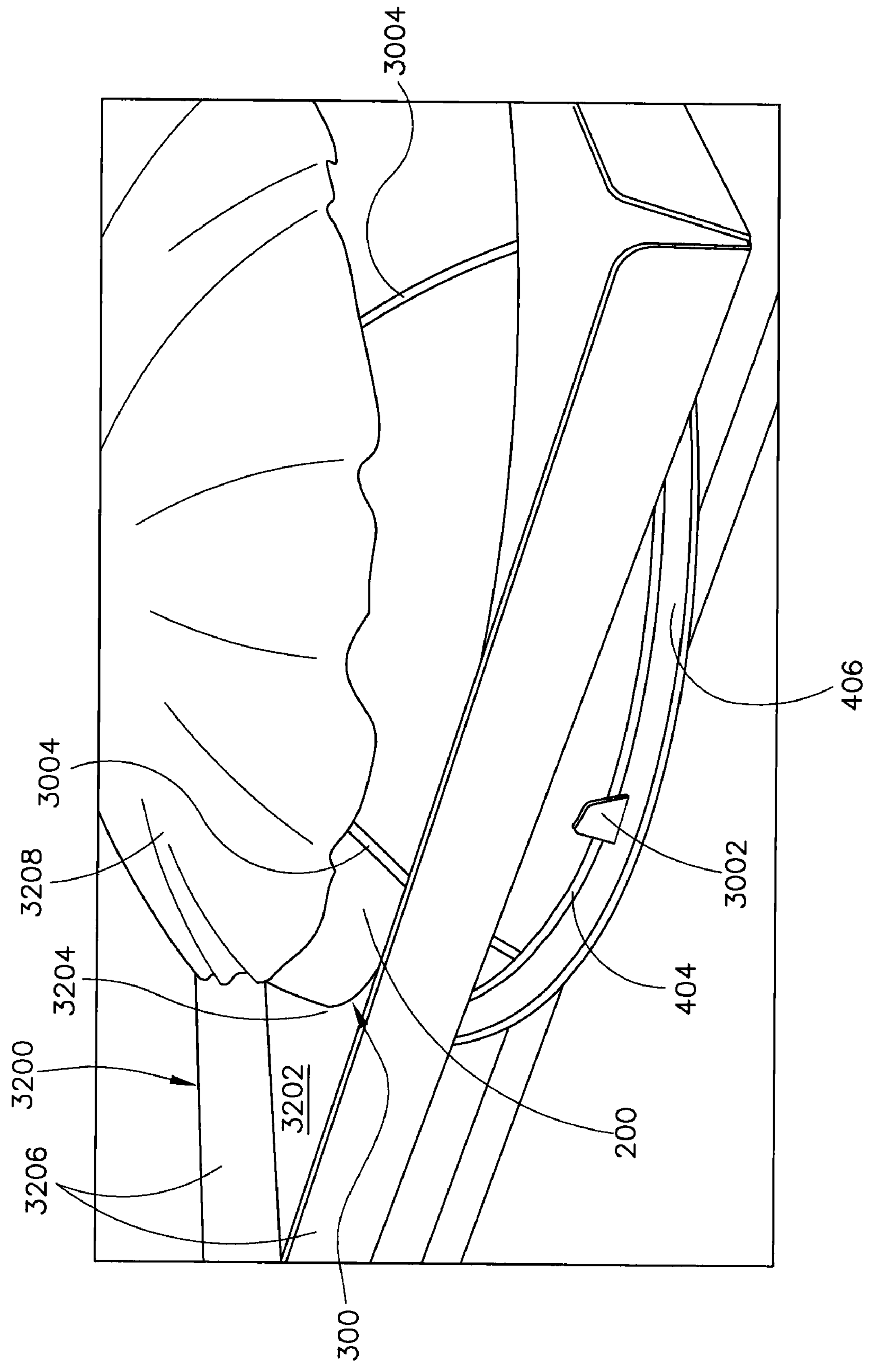
FIG. 32 depicts placement of a cardboard base in accordance with an exemplary embodiment.

With reference to FIG. 29, exemplary operations are described that may be performed in packaging light pipe system 102 for shipment. Additional, fewer, or different operations may be performed, depending on the embodiment. The order of presentation of the operations is not intended to be limiting. With reference to FIGS. 29, 30, and 32, in an operation 2900, a template 3000 is cut-out from a positioning base 3200 leaving an aperture 3204 in positioning base 3200. With reference to FIGS. 29 and 32, in an operation 2902, a plurality of edges 3206 of positioning base 3200 are folded-up from a base 3202. With reference to FIGS. 29-31, in an operation 2904, a plurality of tabs 3002 are partially cut-out from and folded up from template 3000 to form apertures 3100. Template 3000 is sized and shaped based on the size and shape of the components of light pipe system 102. In an exemplary embodiment, template 3000 is sized and shaped to define a size of an aperture to cut in a roof/wall in which light pipe system 102 is mounted. The plurality of tabs 3002 are positioned generally to fit against tapered portion 214 of diffuser 200. In an operation 2906, diffuser 200 is positioned within an area defined by the plurality of tabs 3002. In an operation 2908, template 3000 is attached to diffuser 200. For example, in an exemplary embodiment a plurality of rubber bands 3004 are used to extend around template 3000 and diffuser 200 and to hold template 3000 and diffuser 200 together. In an operation 2910, light collector 300 is positioned outside of the plurality of tabs 3002 as shown with reference to FIGS. 31 and 32. As a result, diffuser 200 fits within light collector 300.

Figure 33:
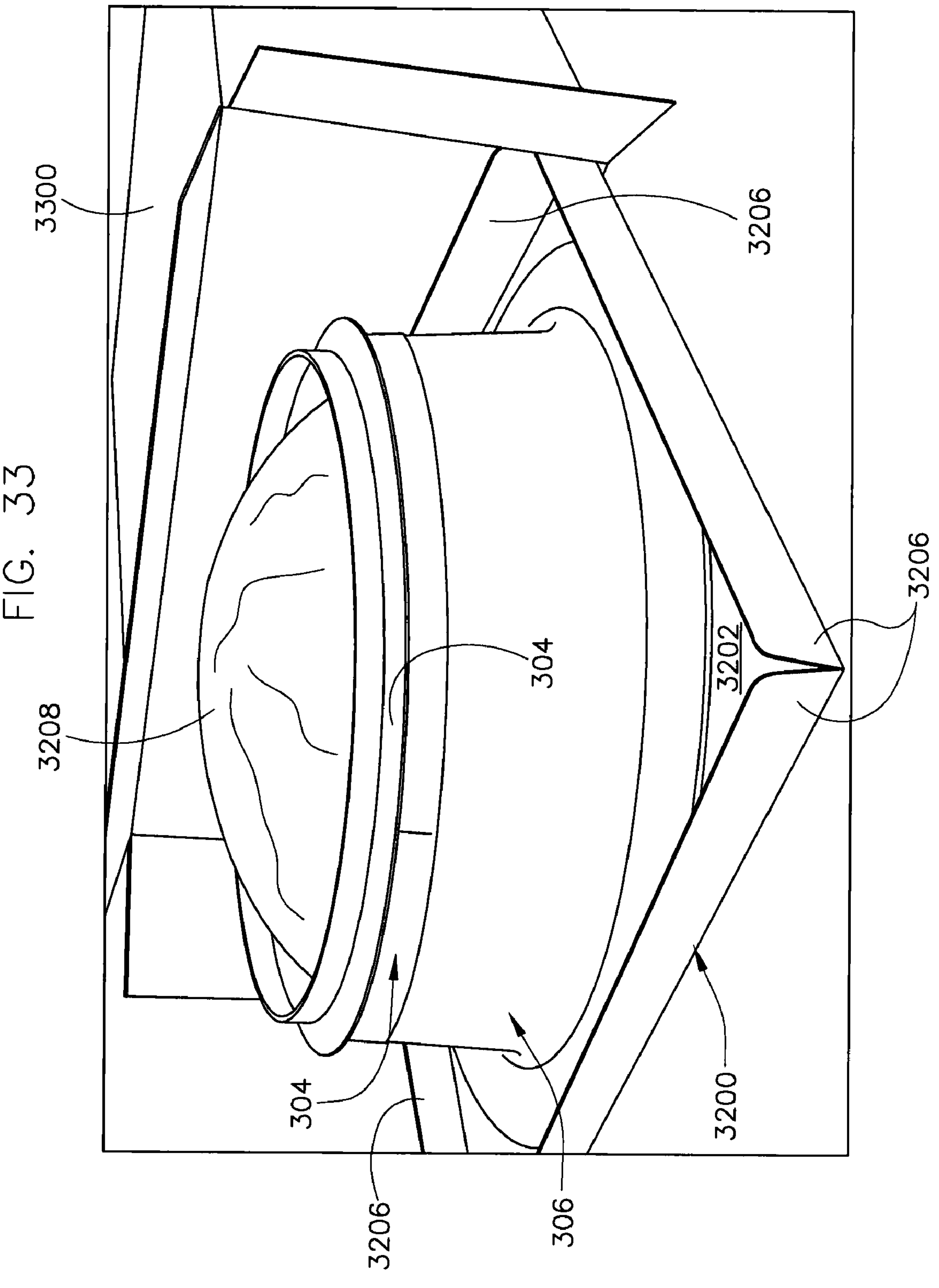
FIG. 33 depicts a flashing packaging in accordance with an exemplary embodiment.
Figure 34:
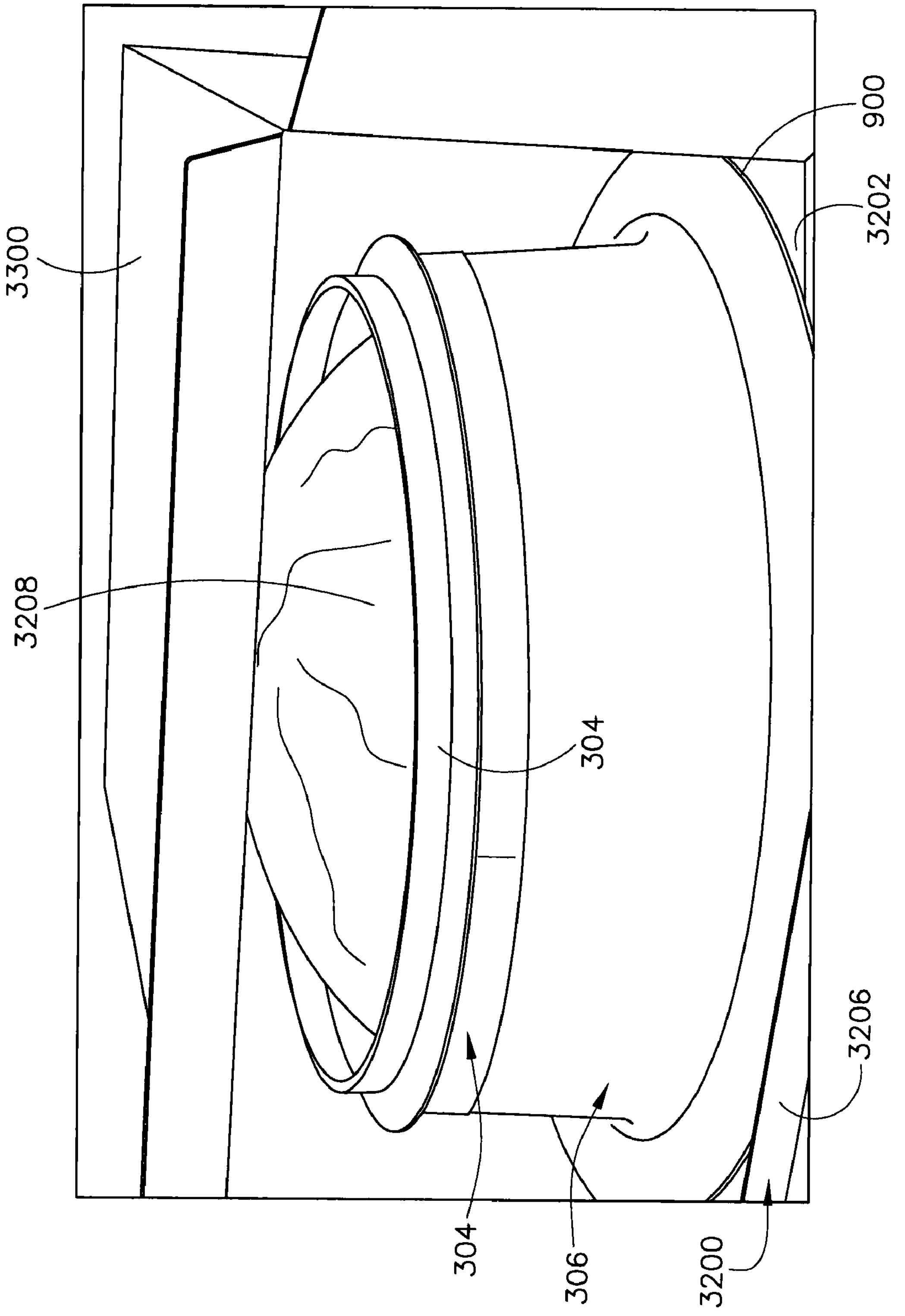
FIG. 34 depicts a light pipe system packaging in accordance with an exemplary embodiment.

With reference to FIGS. 29 and 32, in an operation 2912, positioning base 3200 is positioned over light collector 300 so that aperture 3204 fits over light collector 300 and rests on flange 406 of light collector 300. In an operation 2914, a protective covering 3208 is placed over shell 404 of light collector 300. With reference to FIGS. 29, 33, and 34, in an operation 2916, mounting flange 304 is mounted to flashing 306. For example, with reference to FIG. 9*a*, joint 914 may be formed using a Tog-L-Loc® sheet metal joining system such as that developed by BTM Corporation of Marysville, Mich. A sealant also may be applied between wall 410 of mounting flange 304 and first mounting surface 702 of flashing 306. In an operation 2918, clamp ring 302 is positioned on mounting flange 304. For example, clamp ring 302 may be fastened to mounting flange 304 using fastener holes 402 and one or more fasteners 900. In an operation 2920, flashing 306 is positioned over light collector 300. In an operation 2922, positioning base 3200 is slid into a box 3300. Shipping materials may include cardboard and wood though other materials may be used without limitation.

Figure 35:
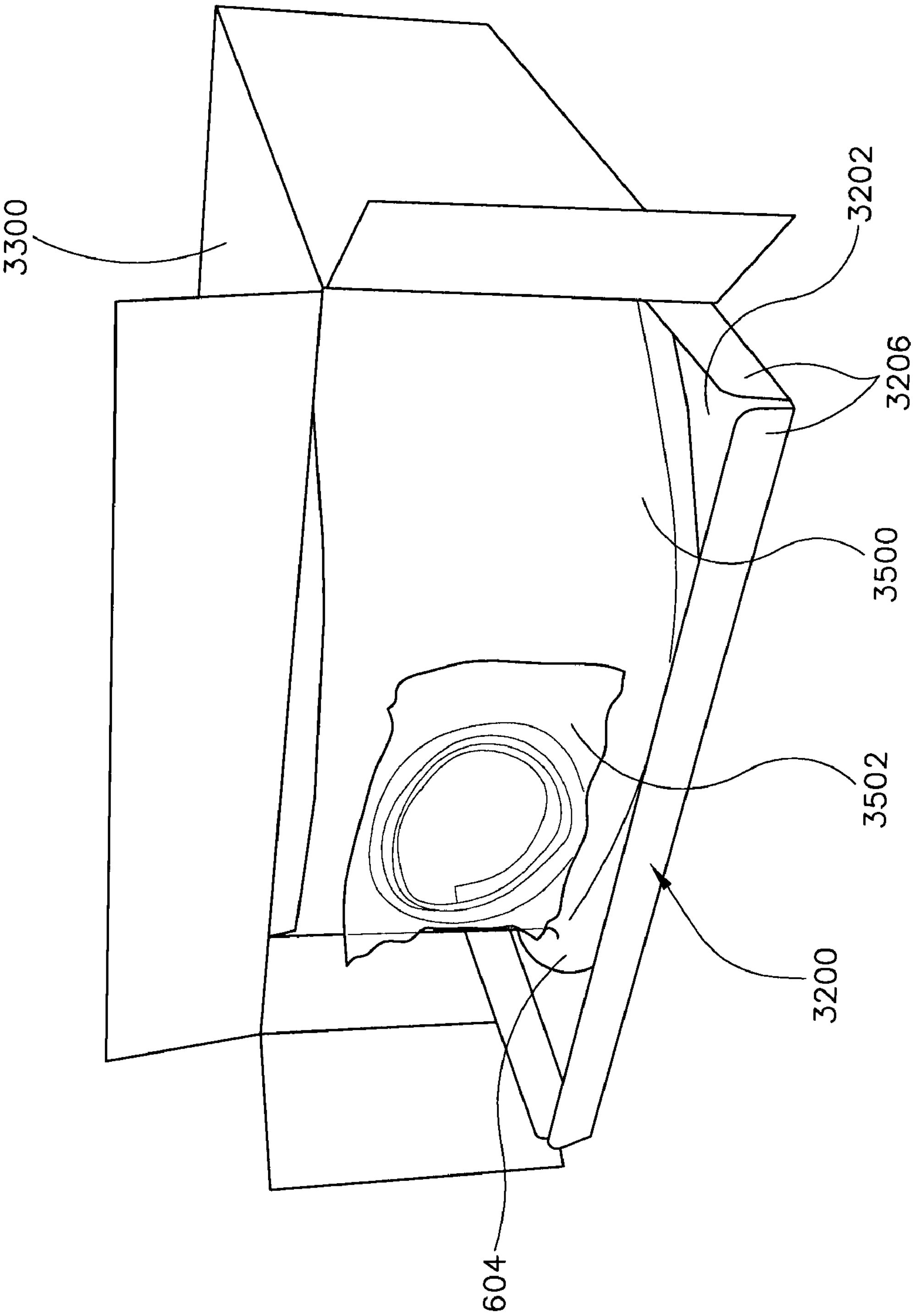
FIG. 35 depicts an accessory packaging in accordance with an exemplary embodiment.

With reference to FIGS. 29 and 35, in an operation 2924, additional installation materials are placed in a pouch 3502. For example, first gasket 908, second gasket 910, a plurality of fasteners 900, and fasteners 912 may be placed in pouch 3502. In an operation 2924, pouch 3502 is attached to a support 3500. Support 3500 may be formed of cardboard having a height that corresponds with box 3300 so that support 3500 protects against crushing of box 3300. In an operation 2928, support 3500 is slid into box 3300 adjacent flashing 306. In an operation 2930, box 3300 is closed for shipping.

Figure 36A:
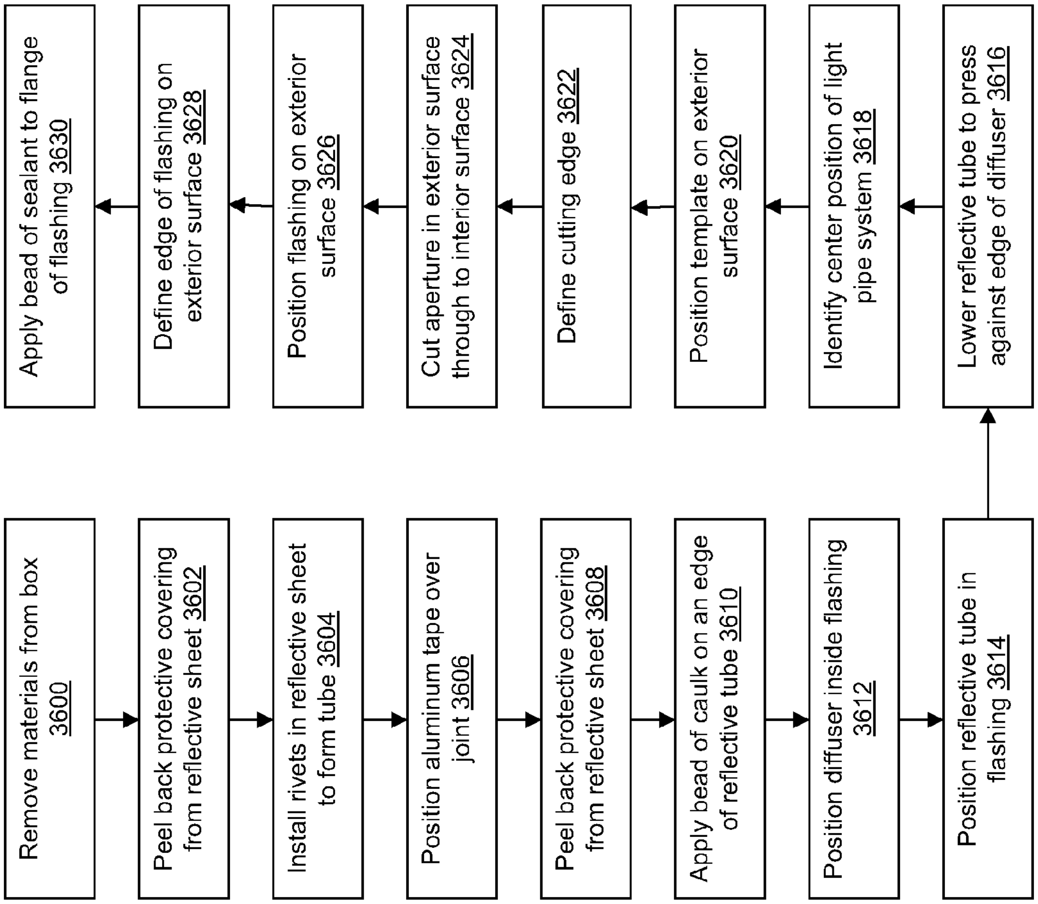
FIGS. 36*a*-36*b* depicts a flow diagram illustrating exemplary operations performed in installing the light pipe system of FIG. 2*a* in accordance with an exemplary embodiment.
Figure 36B:
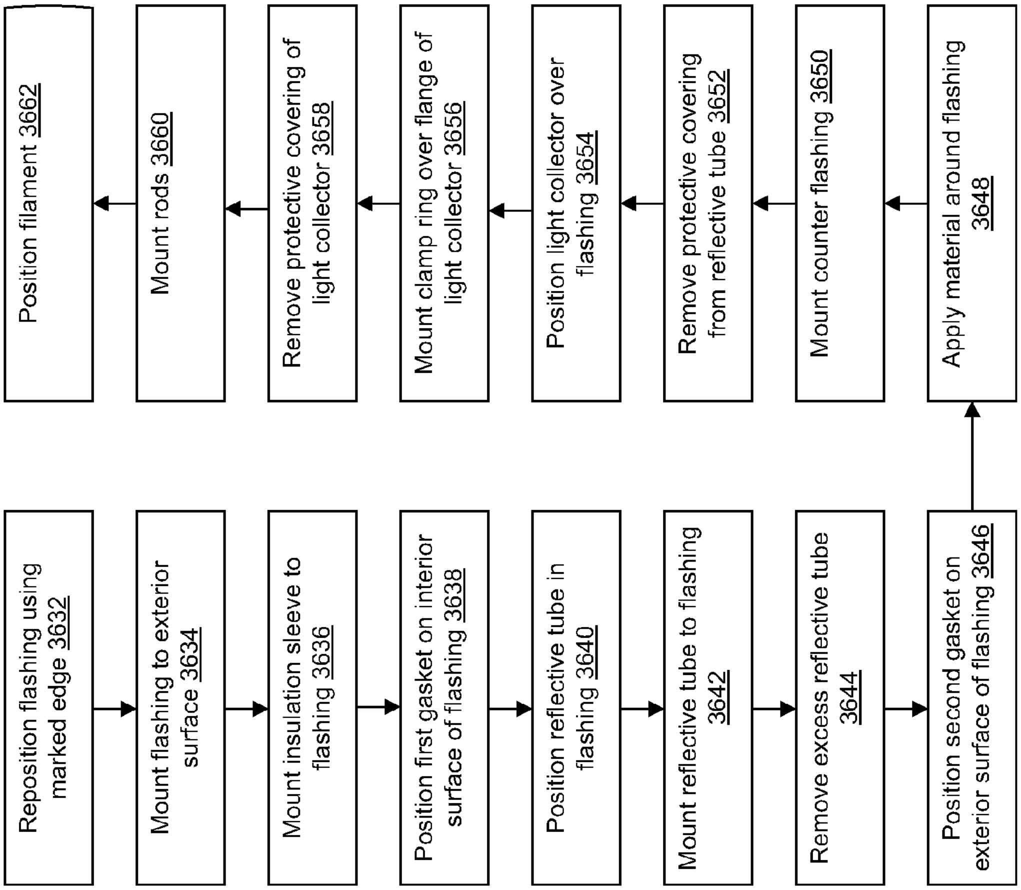

With reference to FIGS. 36*a*-36*b*, exemplary operations are described that may be performed in installing light pipe system 102. Additional, fewer, or different operations may be performed, depending on the embodiment. The order of presentation of the operations is not intended to be limiting. In an operation 3600, materials are removed from box 3300. In an operation 3602, a protective covering is pulled back from an interior surface of a sheet of reflective material used to form reflective tube 202. The protective covering is pulled back a sufficient distance to allow opposed ends of the sheet of reflective material to overlap for creating joint 208. In an operation 3604, closed end rivets 210 are installed in the reflective sheet to form reflective tube 202. In an operation 3606, aluminum tape is positioned over joint 208. In an operation 3608, the protective covering is pulled back from the interior surface of the sheet of reflective material forming reflective tube 202. The protective covering is pulled back a sufficient distance to apply caulk along an edge of wall 206. In an operation 3610, a bead of caulk is applied to the exposed edge of reflective material forming reflective tube 202. For example, 100% silicone may be applied. In an operation 3612, diffuser 200 is positioned within flashing 306. In an operation 3614, reflective tube 202 is positioned within flashing 306 which assists in centering reflective tube 202 about diffuser 200. In an operation 3616, the edge of reflective tube 202 including the bead of caulk is pressed against tapered edge 214 of diffuser 200 to form the seal as shown with reference to FIG. 2*b*.

In an operation 3618, a center position of the installed light pipe system is identified on the roof/wall on which light pipe system 102 is to be mounted. In an operation 3620, template 3000 is centered on the identified center position. In an operation 3622, an edge is defined using the template on the roof/wall to identify a cutting pattern. In an operation 3624, an aperture is cut in the exterior surface of the roof/wall using the defined edge. The aperture is cut though to the interior surface of the roof/wall. In an operation 3626, flashing 306 is positioned on the exterior surface of the roof/wall. In an exemplary embodiment, mounting flange 304 is already attached to flashing 306 as described with reference to operation 2916. Flashing 306 generally is centered about the aperture cut in the exterior surface of the roof/wall. In an operation 3628, a flange edge around flange 604 of flashing 306 is defined on the exterior surface of the roof/wall. In an operation 3630, a bead of sealant is applied to a surface of flange 604 of flashing 306 which abuts the exterior surface of the roof/wall. In an operation 3632, the surface of flange 604 of flashing 306 including the bead of sealant is repositioned against the exterior surface of the roof/wall using the defined flange edge.

In an operation 3634, flashing 306 is mounted to the exterior surface of the roof/wall. For example, roof grip screws may be used which extend through a portion of flange 604 of flashing 306 and into the surface of the roof/wall. In an operation 3636, an insulation sleeve is mounted to an interior surface of flashing 306. In an operation 3638, first gasket 908 is positioned on an interior surface of flashing 306 as shown with reference to FIG. 9*a*. In an operation 3640, reflective tube 202 is positioned in flashing 306 and leveled. In an operation 3642, reflective tube 202 is mounted to flashing 306 for example using fasteners 912 as shown with reference to FIG. 9*a*. In an operation 3644, any reflective tube 202 extending above peripheral edge 608 of flashing 306 is removed by cutting and/or tearing. In an operation 3646, second gasket 910 is positioned on the interior surface of flashing 306 as shown with reference to FIG. 9*a*. In an operation 3648, roofing or siding material is applied around flashing 306 as known to those skilled in the art. In an operation 3650, a counter flashing is mounted to mounting flange 304 and/or flashing 306 to further divert moisture away from light pipe system 102.

In an operation 3652, the protective covering of reflective tube 202 is removed from reflective tube 202. In an operation 3654, light collector 300 is positioned over flashing 306. In an exemplary embodiment, light collector 300 is snap fit onto second mounting surface 706 of flashing 306. In an operation 3656, clamp ring 302 is positioned over flange 406 of light collector 300. For example, a plurality of fasteners 900 are used to connect clamp ring 302 and flange 408 of mounting flange 304 as shown with reference to FIG. 9*a*. In an operation 3658, protective covering 3208 is removed from light collector 300. In an operation 3660, a rod is mounted to mounting flange 304 an/or flashing 306. In an operation 3662, a filament is mounted between the rods to discourage birds from congregating near light pipe system 102. A cone skirt may be positioned about diffuser 200.

Figure 38:
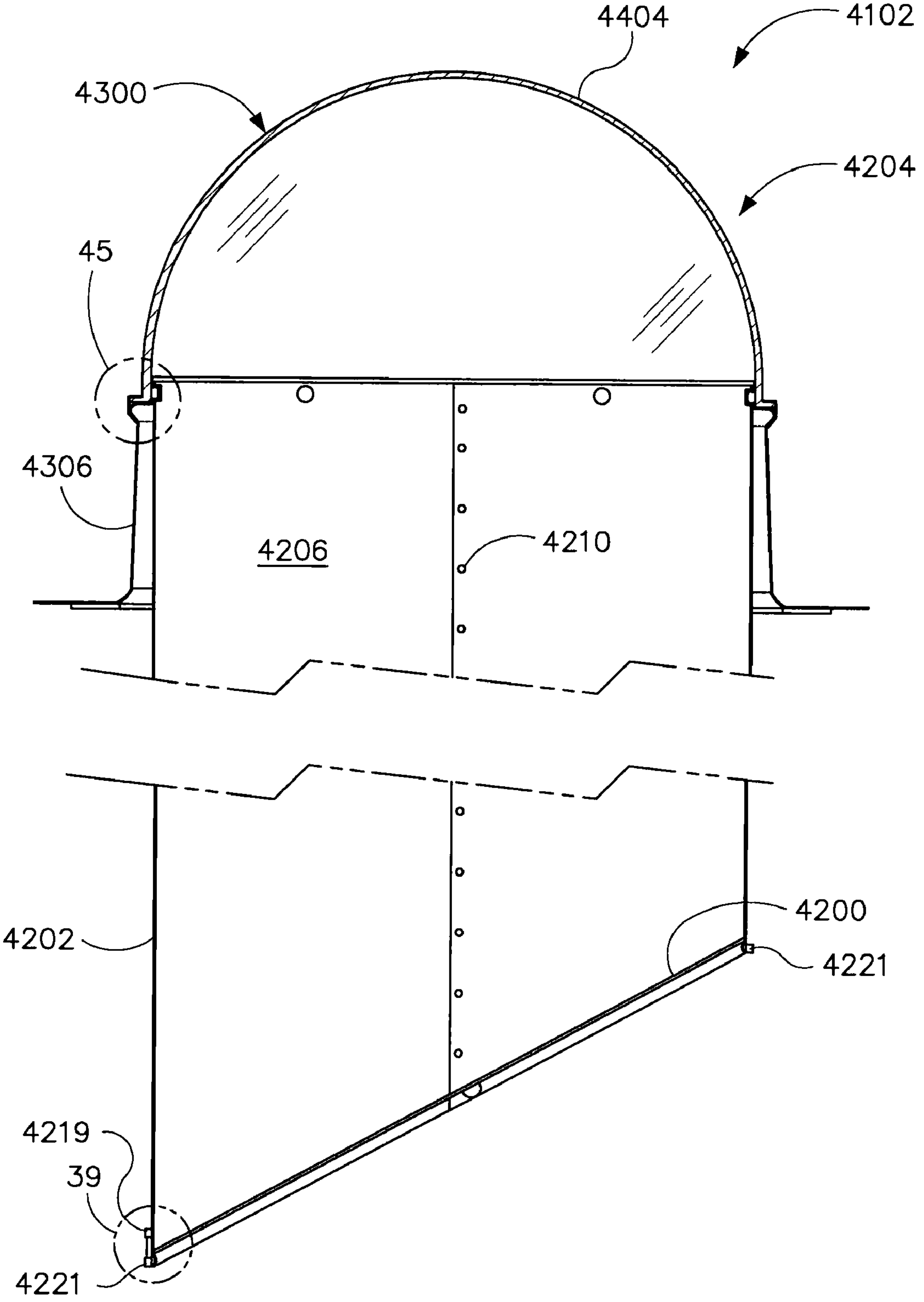
FIG. 38 depicts an elevation view of a light pipe system according to another embodiment.

With reference to FIG. 38, a light pipe system 4102 is shown in accordance with another exemplary embodiment to provide lateral illumination within a room or enclosure. In the illustrated embodiment, light pipe system 4102 is formed of components having a generally circular shape though other shapes may be used without limitation. Light pipe system 4102 includes a diffuser 4200, a reflective tube 4202, and a light collection system 4204. Reflective tube 4202 is formed from, or includes, a sheet of highly efficient, reflective material. For example, silver or mirror coated aluminum, MIRO®, etc. may be used as known to those skilled in the art. Alternatively, the material may have a white reflective surface, such as a white powder-coated surface. The sheet of material with a reflective surface or coating may be rolled to form a tube having a wall 4206 and joined along a joint 4208. In an exemplary embodiment, the joint 4208 is joined using rivets 4210, though other fastening methods and mechanisms may be used without limitation. Aluminum tape may be placed over the rivets 4210. Reflective tube 4202 may be formed to have a variety of lengths and to form a tube having a variety of diameters (or cross-sectional shapes) based on the characteristics of diffuser 4200, of light collection system 4204, of the roofing/wall defining the interior space, and/or of the interior space to be illuminated. According to one embodiment, tube 4202 has a first end (shown as a top end or external end to receive light) that forms a generally circular-shaped opening (e.g. mouth, etc.) and lies in a plane substantially perpendicular to the longitudinal axis of the collection device 4300 and reflective tube 4202, and a second end (shown as a bottom end or internal end to emit light) having a generally elliptical-shaped opening in a plane that lies at an angle substantially non-perpendicular to the longitudinal axis.

Figure 39:
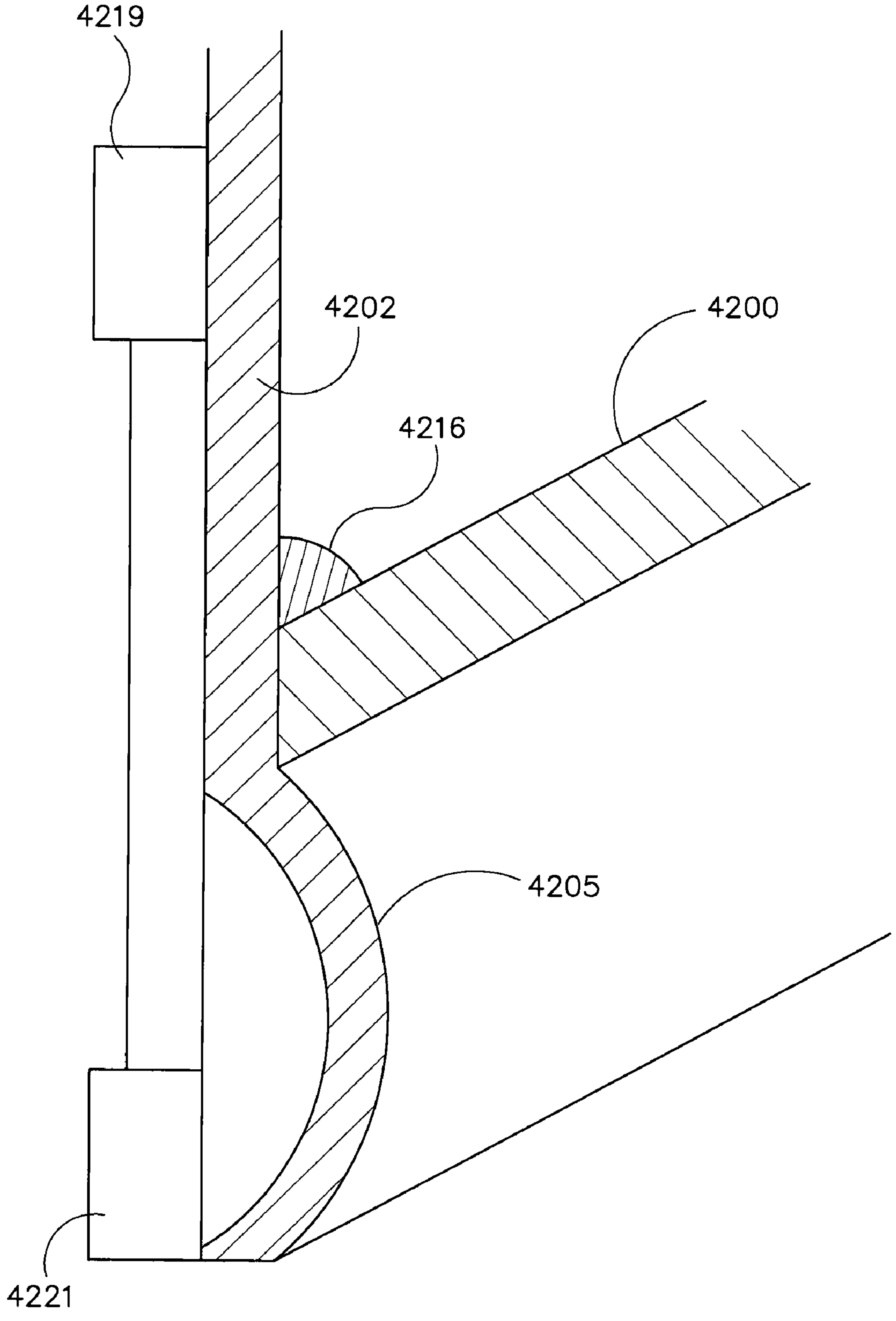
FIG. 39 depicts a detailed view of a portion of the light pipe system according to the embodiment of FIG. 38.

Diffuser 4200 may be a prismatic diffuser and may be planar (as shown) or may have a concave shape such as that shown in FIG. 2*a*, and may be formed from a substantially clear acrylic material with a P12 refractive diffuser pattern. In the exemplary embodiment of FIG. 38, diffuser 4200 is mounted within reflective tube 4202 at an angle that is non-perpendicular to the longitudinal axis of the reflective tube. According to one embodiment, the angle is substantially within the range of approximately 30-60 degrees, and more particularly approximately 45 degrees, although other angles may be used to suit particular applications. With reference to FIG. 39, diffuser 4200 may be supported at a desired angle within tube 4202 by one or more projections 4205 (e.g. lances, dimples, divots, etc.) formed or otherwise provided in wall 4206 of tube 4202 to hold diffuser 4200 in place during application or installation of a sealant and/or adhesive material. A sealant and/or adhesive material 4216 may be used to seal diffuser 4200 within wall 4206 of reflective tube 4202 to reduce condensation, dust, heat loss, and the build-up of other materials within an interior space formed by wall 4206 of reflective tube 4202. The seal provided by the sealant is intended to prevent or minimize air exchange and thus the intrusion of contaminants such as moisture, heat, dust, dirt, particulate matter, etc. from the room environment to the interior space of the light pipe defined within the reflective tube and the diffuser. The sealant thus minimizes or prevents condensation or accumulation of other foreign material upon the diffuser 4200, thereby enhancing the light transmission and performance of the light pipe system. Adhesive/sealant 4216 may comprise a silicone material, such as hot melt silicone intended to provide superior adhesion and strength to the assembly. As used herein, the term "mount" includes join, unite, connect, associate, insert, hang, hold, affix, attach, fasten, bind, paste, secure, bolt, screw, rivet, solder, weld, and other like terms. In an exemplary embodiment, no fastener is used to mount diffuser 4200 within reflective tube 4202. A bead of adhesive/sealant 4216 may be applied to an inner surface of wall 4206 of reflective tube 4202 and a about a peripheral edge of diffuser 4200. Diffuser 4200 may have a perimeter defined by an elliptical shape to fit snugly at an angle within tube 4202, if tube 4202 is a circular tube, or may have any perimeter shape intended to fit snugly at an angle within a reflective tube having other desired cross-sectional shapes.

With further reference to FIGS. 38 and 39, reflective tube 4202 or wall 4206 may be outfitted with a supplemental light source 4221 and wireless transceiver 4219, such as previously described with reference to FIGS. 2*a*-2*c*.

The angular positioning of diffuser 4202 is intended to direct light from tube 4202 in a direction that is primarily non-parallel to the longitudinal axis, such that light is directed laterally outward in a room in a manner that is substantially normal or perpendicular to the angle of the diffuser. The ability to disperse light in a laterally outward direction (as opposed to vertically downward direction) is intended to permit customizing the illumination pattern within the room (e.g., toward walls, corners, recesses, etc.) by setting the diffuser at a desired angle within the tube, and by rotating the light pipe system to the desired polar orientation within an opening in the rooftop before fixing the light pipe in place. According to one embodiment, a light pipe system 102 as previously shown and described may be used within a central or main portion of a room to be illuminated, and a light pipe system 4102 may be used in peripheral or other suitable locations of the room to provide enhanced illumination of walls or other locations along the sides of the room.

Figure 40:
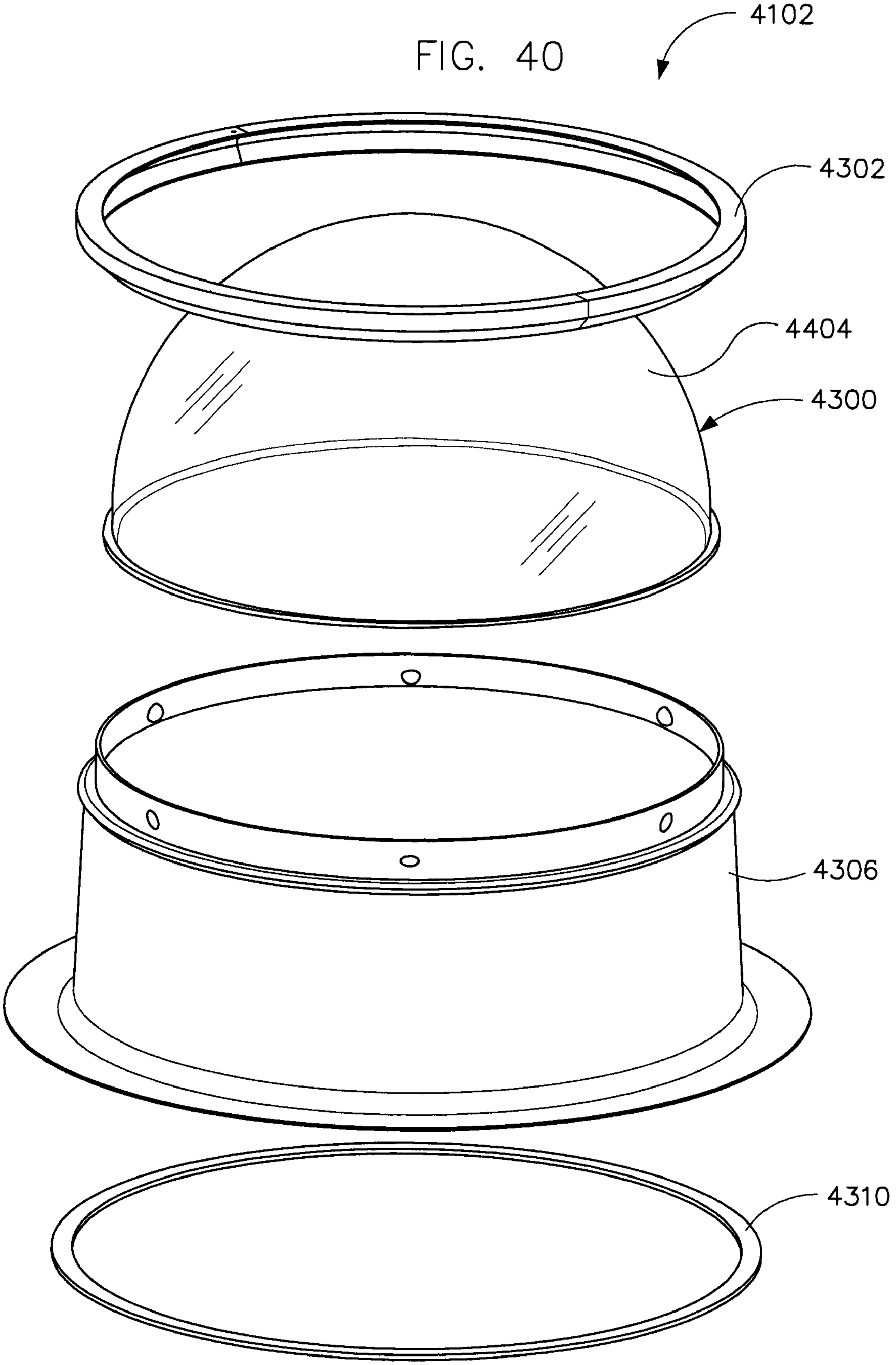
FIG. 40 depicts an exploded perspective view of a light collection portion of the light pipe system according to the embodiment of FIG. 38.
Figure 41:
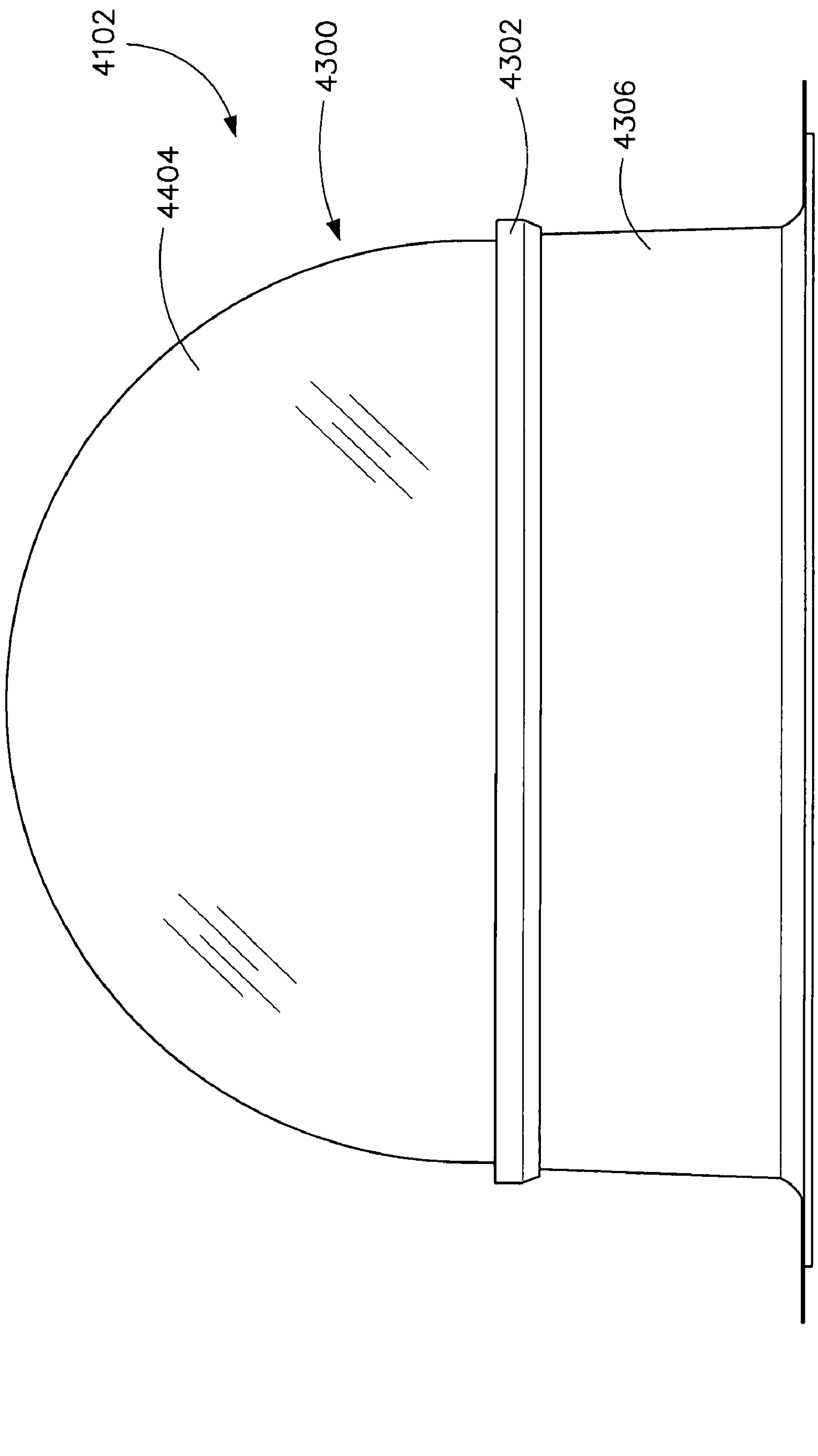
FIG. 41 depicts an elevation view of a light collection portion of the light pipe system according to the embodiment of FIG. 38.

With reference to FIGS. 40 and 41, light collection system 4204 is further shown in accordance with an exemplary embodiment. Light collection system 4204 may include a light collector 4300, a clamp ring 4302, and a flashing 4306. Flashing 4306 is shown for example to be substantially circular and may have a slight conical shape and is positioned to encircle and to mount to an external first (e.g. top) portion of reflective tube 4202. The first portion (e.g. top) of reflective tube 4202 is opposite a second portion (e.g. bottom) of the tube at which diffuser 4200 is located (see FIGS. 38 and 43). Flashing 4306 is positioned on a surface to which the light pipe system is mounted for use. The surface, for example, may be a roof or an exterior wall of a building. Flashing 4306 may be formed of aluminum or other suitable material. Reflective tube 4202 extends through the surface to the interior space to allow natural light into the interior space. A ring shaped gasket or seal 4310 or other material may be provided between flashing 4306 and the building surface to provide a weather-resistant and thermally-insulative boundary between light pipe 4102 and the building. Seal 4310 may be a foam material (e.g. silicone foam, etc.) applied to an underside of flange 4604 of flashing 4306 to improve ease of use and reduce installation errors.

With further reference to FIGS. 40 and 41, light collector 4300 includes a shell 4404 and a flange 4406. In an exemplary embodiment, light collector 4300 is formed of a sheet of acrylic or other robust and transparent material using a free forming process that uses air pressure differentials to form shell 4404 of light collector 4300 without a mold as described with reference to FIG. 23. Alternatively, shell 4404 may be formed in an injection molding process to provide a lower cost alternative. In an exemplary embodiment, shell 4404 has an oblate shape and is configured to interrupt sunlight, both direct and diffuse, and direct such sunlight into the reflective tube. Flange 4406 of light collector 4300 defines a generally circular opening which is positioned so that shell 4404 covers the interior space formed by reflective tube 4202.

Figure 45:
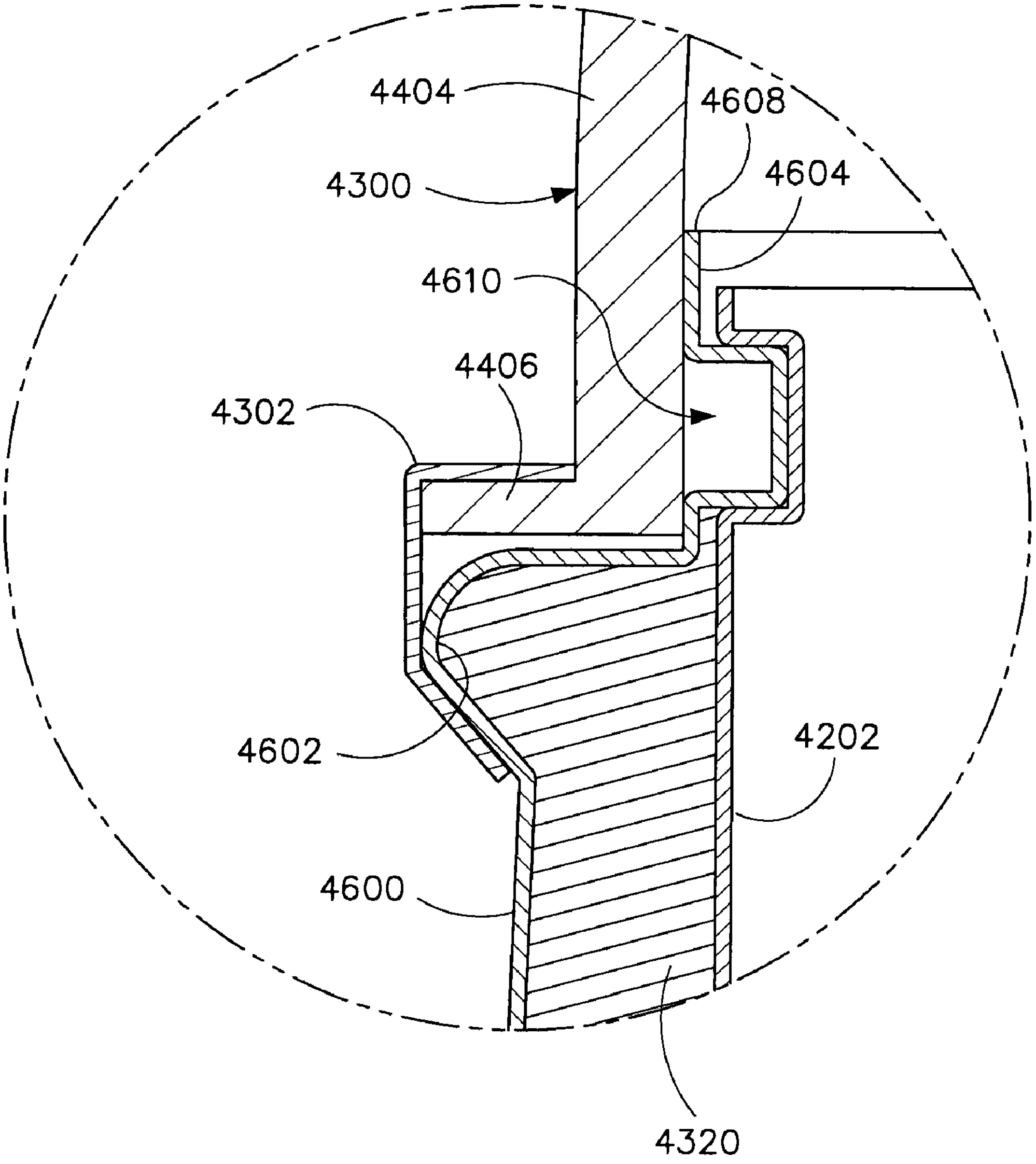
FIG. 45 depicts a detailed view of a portion of the light pipe system according to the embodiment of FIG. 38.

As shown in FIGS. 40 and 45, clamp ring 4302 is shown as a substantially circular clamp, such as a "band" or "barrel" or "ring" clamp and is positioned over flange 4406 of light collector 4300. Clamp ring 4302 positions flange 4406 adjacent to a rim 4302 of flashing 4306 to hold shell 4404 in a desired radially and axially aligned location with flashing 4306 and reflective tube 4202, while permitting a small amount of vertical (i.e., axial) movement to accommodate thermal expansion and the like. According to one embodiment, the vertical clearance is approximately 0.060 inches, although other suitable clearances may be provided. Clamp ring 4302 may be staked or otherwise secured, once installed, to inhibit removal and to provide a tamper-resistant closure with flange 4406 of light collector 4300 mounted and held between clamp ring 4302 and rim 4302. Clamp ring 4302 may be formed of aluminum or other suitable material and may be preformed as a continuous piece (e.g. roll-formed, etc.), or may be formed from multiple segmented sections.

Figure 42:
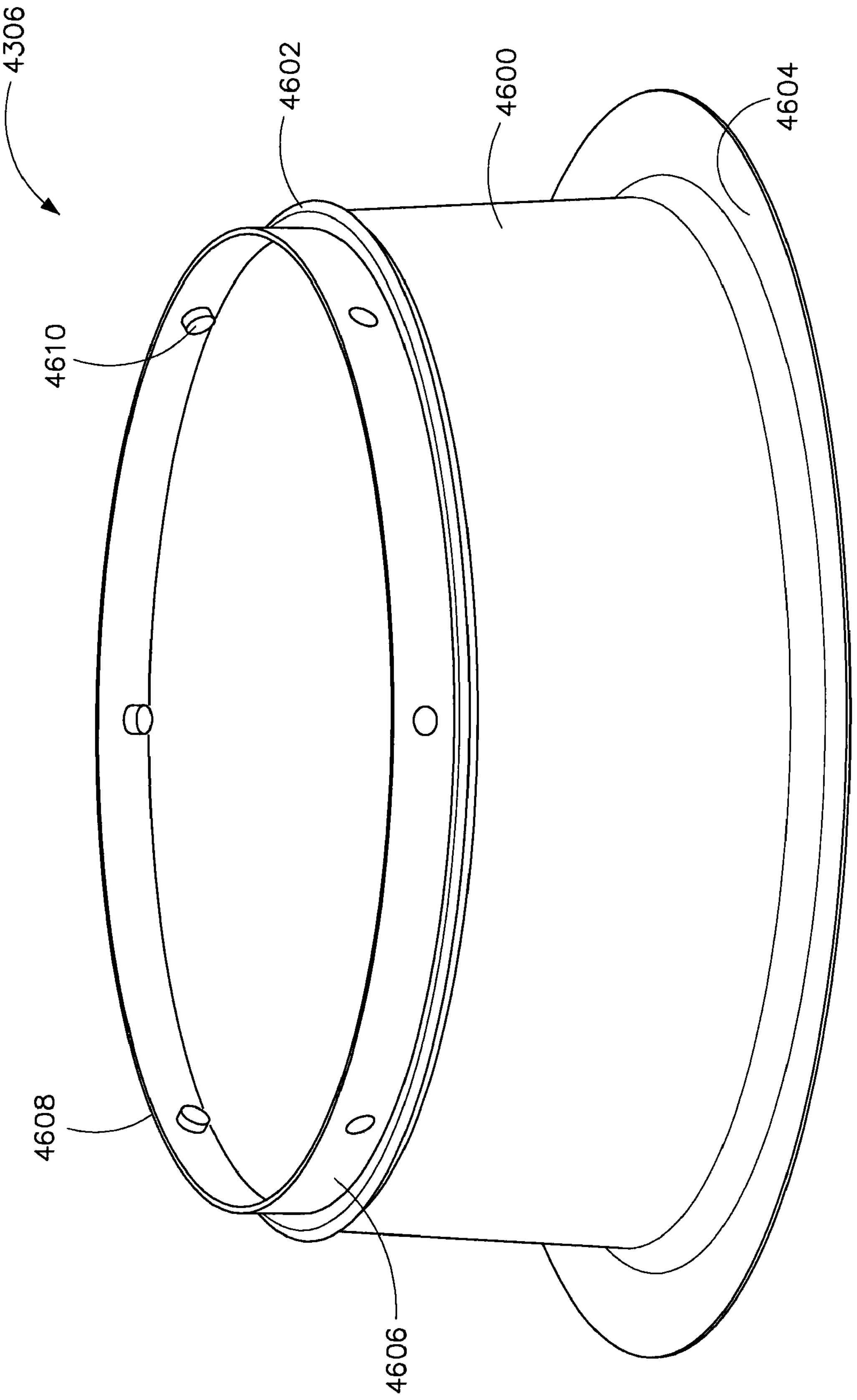
FIG. 42 depicts a perspective view of a flashing portion of the light pipe system according to the embodiment of FIG. 38.
Figure 44:
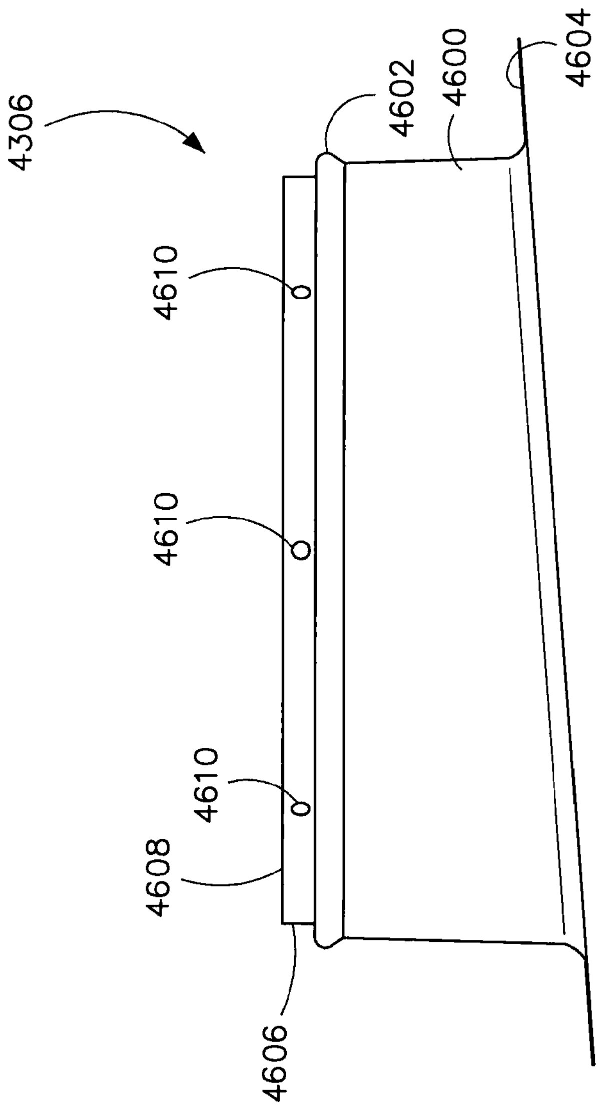
FIG. 44 depicts an elevation view of a flashing portion of the light pipe system according to another embodiment.

With reference to FIG. 42, flashing 4306 is shown further in accordance with an exemplary embodiment. In an exemplary embodiment, flashing 4306 is formed of a single sheet of spun aluminum with no seams in order to minimize the potential for leakage. Flashing 4306 may include a wall 4600, rim 4602 (circular protrusion, etc.), a flange 4604, a mounting wall 4606 and a peripheral edge 4608. Peripheral edge 4608 forms a generally circular shape along the top of mounting wall 4606 and lies in a plane substantially perpendicular to the longitudinal axis of the collection device and reflective tube, and lies opposite flange 4604. As known to those skilled in the art, roofing or siding materials may be positioned to cover at least a portion of flashing 4306 including flange 4604. Flange 4604 may extend in a plane that is substantially perpendicular to a longitudinal axis (see FIG. 42), such as for use on a horizontal rooftop or surface. According to other embodiments, flange 4604 may be disposed at an angle to the longitudinal axis (see FIG. 44) such as for use on a sloped or angled rooftop or surface.

Figure 43:
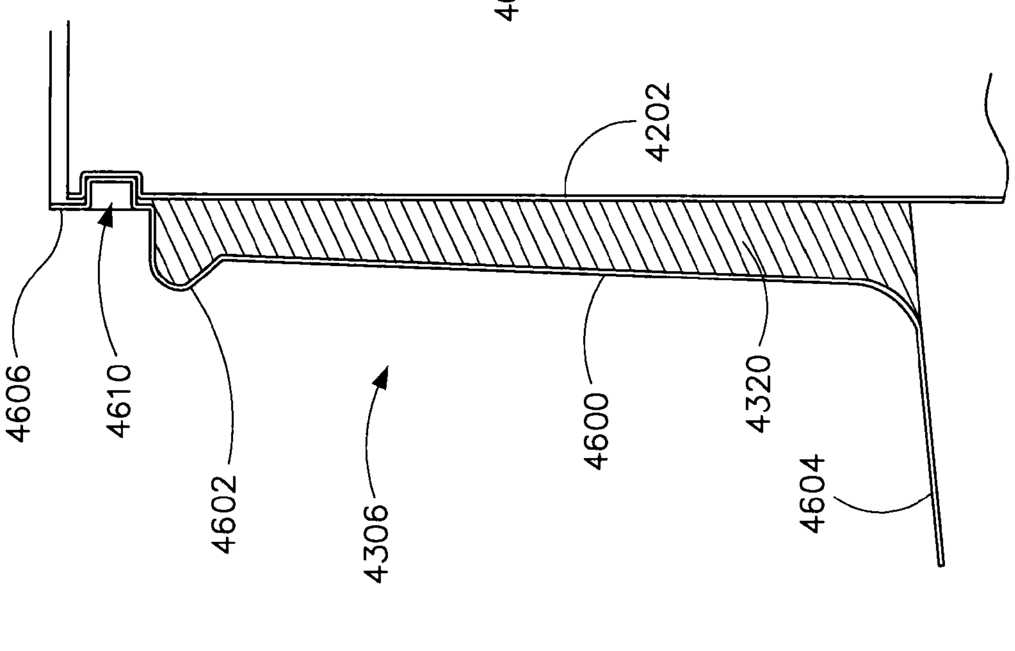
FIG. 43 depicts a partial cross-sectional view of the light pipe system according to the embodiment of FIG. 38.

With reference to FIGS. 43 and 45, flashing 4306 may be secured to reflective tube 4202 by a plurality of "stakes" 4610 so that tube 4202 is radially and axially aligned with flashing 4306 and collector 4300. An annular space between flashing 4306 and an external surface of tube 4202 may be filled with a weather-resistant and thermally insulative material 4320 such as a polyurethane foam which may include isocyanate, silicone foam or the like which may be installed by spray application or injection or other suitable procedure. According to one embodiment, insulative material is applied in a stepped process where the flashing and reflective tube assembly are rotated about a common axis and a first step involves injection of a first volume of foam into the gap for a full revolution and the foam allowed to expand such that it partially fills the gap, and then a second step involves rotating the assembly a second revolution while injecting a second volume of foam into the gap and allowing the foam to expand to fill the gap. According to other embodiments, additional steps may be used as desired. The multi-step process is intended to improve control of the foaming process by permitting selectively incremental amounts of insulative foam material to be applied to minimize the potential for deflecting the reflective tube as the foam material expands in the gap, and avoids or minimizes the need for 'trimming' excess foam that expands beyond the bottom edge of the flashing and reflective tube. The components of the light pipe system 4102 are intended to permit complete assembly in a factory setting so that the assembled device may be shipped as a substantially complete assembly to an installation site to minimize the on-site variables and the potential installation errors.

According to other embodiments, the features of this light pipe system 4102 with the angled diffuser for lateral illumination within a room may include any one or more of the components and features shown and described with reference to light pipe system 102 and FIGS. 2*a*-9*b*.

The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more". The exemplary embodiments may be implemented as a method, apparatus, or article of manufacture using standard programming and/or engineering techniques to produce software, firmware, hardware, or any combination thereof to control a device to implement the disclosed embodiments. The term "computer readable medium" can include, but is not limited to, magnetic storage devices (e.g., hard disk, floppy disk, magnetic strips, . . . ), optical disks (e.g., compact disk, digital versatile disk, . . . ), smart cards, flash memory devices, etc. Additionally, it should be appreciated that a carrier wave can be employed to carry computer-readable media such as those used in transmitting and receiving electronic mail or in accessing a network such as the Internet or a local area network. The network access may be wired or wireless.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The functionality described may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A lighting device, comprising:

a substantially cylindrical tube defining an interior and an exterior, and a longitudinal axis extending between a first end and a second end, the first end of the tube defining a substantially cylindrical opening disposed in a plane at a first angle that is substantially perpendicular to the longitudinal axis, and the second end of the tube defining a substantially elliptical opening disposed in a plane at a second angle that is substantially non-perpendicular to the longitudinal axis;

a reflective surface disposed on the interior of the tube;

a substantially cylindrical flashing disposed about the exterior of the tube;

a substantially transparent dome coupled to the tube proximate the first end; and a diffuser coupled to the tube proximate the second end.

2. The lighting device of claim 1, wherein the second angle is within a range of approximately 10 degrees to 80 degrees.

3. The lighting device of claim 1, wherein the second angle is within a range of approximately 30 degrees to 60 degrees.

4. The lighting device of claim 1, wherein the second angle is approximately 45 degrees.

5. The lighting device of claim 1, wherein the diffuser comprises a substantially planar member having an elliptical-shaped perimeter and is configured to fit within the elliptical opening of the second end of the tube.

6. The lighting device of claim 5 further comprising a seal between the diffuser and the tube to prevent entry of contaminants into an interior space within the tube, wherein the contaminants include at least one contaminant selected from the group consisting of moisture, heat and dust.

7. The lighting device of claim 1 further comprising a plurality of projections disposed proximate the second end and extending inwardly from the interior of the tube, the projections configured to at least partially support the diffuser.

8. The lighting device of claim 1, wherein the diffuser comprises a substantially convex member having an elliptical-shaped perimeter and is configured to fit at least partially within the elliptical opening of the second end of the tube.

9. The lighting device of claim 1, wherein the diffuser comprises a substantially concave member having an elliptical elliptical-shaped perimeter and configured to fit at least partially within the elliptical opening of the second end of the tube.

10. The lighting device of claim 1, further comprising a layer of foam insulation disposed at least partially within an annular opening between tube and the flashing.

11. The lighting device of claim 1, wherein the flashing further comprises a circumferential ridge adjacent to a lower edge of the dome, and further comprising a band clamp disposed about the ridge and the lower edge of the dome, the band clamp substantially preventing movement of the dome in a radial direction relative to the longitudinal axis and permitting movement of the dome in an axial direction relative to the longitudinal axis.

12. The lighting device of claim 1, wherein the flashing comprises a first end and a second end, the first end of the flashing defining a substantially cylindrical opening disposed in a plane that is substantially perpendicular to the longitudinal axis, and the second end of the tube defining a substantially elliptical opening disposed in a plane at an angle that is substantially non-perpendicular to the longitudinal axis.

13. A lighting device, comprising:

a tube defining an interior and an exterior, and a longitudinal axis extending between a first end and a second end, the first end of the tube configured to receive light from a light source, and the second end of the tube configured to emit the light to an interior of a building;

a reflective surface disposed on the interior of the tube;

a flashing disposed about the exterior of the tube;

a substantially transparent dome coupled to the tube proximate the first end; and a diffuser coupled to the tube at an angle that is non-perpendicular to the longitudinal axis and configured to direct the light into the interior of the building in a direction that is non-parallel to the longitudinal axis.

14. The lighting device of claim 13 wherein the reflective surface comprises a white reflective surface.

15. The lighting device of claim 13 wherein the reflective surface comprises a mirror reflective finish.

16. The lighting device of claim 13 further comprising a guard disposed proximate the second end of the tube.

17. The lighting device of claim 16 wherein the guard comprises a substantially cylindrical wall portion formed from a helically wound wire.

18. The lighting device of claim 17 wherein the guard further comprises attachment loops arranged in a variably offset configuration and configured for attachment of the guard to a corrugated roof panel.

19. A method of making a lighting device, comprising:

providing a tube defining an interior with a reflective surface and an exterior, and a longitudinal axis extending between a first end and a second end, the first end of the tube configured to receive light from a light source, and the second end of the tube configured to transmit the light to an interior of a building;

coupling a flashing about the exterior of the tube;

coupling a dome to the flashing proximate the first end of the tube;

providing at least one projection extending inwardly toward the axis and disposed proximate the second end of the tube;

supporting a diffuser at least temporarily on the projection;

applying a bead of a hot melt silicone material substantially along an interface between the second end of the tube and the perimeter of the diffuser; and curing the hot melt silicone material while the diffuser is supported on the projection.

20. The method of claim 19, further comprising the step of positioning the diffuser at an angle that is non-perpendicular to the longitudinal axis.

21. The method of claim 19, further comprising the step of insulating an space between the flashing and the exterior of the tube with an insulation material.

22. The method of claim 21, wherein the step of insulating further comprises injecting an expandable foam material in incremental applications in a multi-step process.

23. The method of claim 19, wherein the step of coupling the dome to the flashing further comprises securing a circumferential clamp about a lower end of the dome and a ridge on the flashing.

24. The method of claim 19, further comprising the step of attaching the flashing to a building so that the first end of the tube is disposed external to the building and the second end of the tube is disposed internal to the building.

25. A lighting device, comprising:

a tube defining an interior and an exterior, and a longitudinal axis extending between a first end and a second end, the first end of the tube configured to receive light from an exterior light source, and the second end of the tube configured to emit at least a portion of the light to an interior of a building;

a reflective surface disposed on the interior of the tube;

a flashing disposed about the exterior of the tube;

a substantially transparent dome coupled to the tube proximate the first end;

a supplemental light source disposed proximate the second end of the tube; and a transceiver coupled to the supplemental light source, the transceiver configured to receive a wireless signal for control of the supplemental light source and to communicate a status of the supplemental light source to a controller.

26. A lighting device, comprising:

a tube defining an interior and an exterior, and a longitudinal axis extending between a first end and a second end, the first end of the tube configured to receive light from an exterior light source, and the second end of the tube configured to emit at least a portion of the light to an interior of a building;

a reflective surface disposed on the interior of the tube;

a flashing disposed about the exterior of the tube;

a substantially transparent dome coupled to the tube proximate the first end; and a supplemental light source disposed proximate the second end of the tube;

wherein the supplemental light source comprises one or more LEDs.

27. The lighting device of claim 26 wherein the LEDs are disposed substantially about a perimeter of the tube.

28. A lighting device, comprising:

a tube defining an interior and an exterior, and a longitudinal axis extending between a first end and a second end, the first end of the tube configured to receive light from an exterior light source, and the second end of the tube configured to emit at least a portion of the light to an interior of a building;

a reflective surface disposed on the interior of the tube;

a flashing disposed about the exterior of the tube;

a substantially transparent dome coupled to the tube proximate the first end;

a supplemental light source disposed proximate the second end of the tube; and a diffuser coupled proximate the second end of the tube.

29. The lighting device of claim 28 wherein the diffuser is coupled to the tube at an angle non-perpendicular to the longitudinal axis.

30. The lighting device of claim 26 wherein the LEDs are disposed about an exterior perimeter of the tube and adjacent to a reflector.

31. The lighting device of claim 30 wherein the LEDs are configured to emit light toward the reflector for dispersion to the interior of the building.

32. The lighting device of claim 31 wherein the LEDs are coupled to the tube by a supplemental LED mounting surface.

33. The lighting device of claim 32 further comprising a layer of a high emissivity material disposed on at least one of the tube, the supplemental LED mounting surface, and the reflector proximate the LEDs.

34. The lighting device of claim 26 further comprising a photovoltaic panel configured to provide a source of electrical power to the LEDs.

35. The lighting device of claim 34 wherein the photovoltaic panel is coupled to the flashing.

36. A lighting device, comprising:

a tube defining an interior and an exterior, and a longitudinal axis extending between a first end and a second end, the first end of the tube configured to receive light from an exterior light source, and the second end of the tube configured to emit at least a portion of the light to an interior of a building;

a substantially transparent dome coupled to the tube proximate the first end;

a reflective surface disposed on the interior of the tube;

a supplemental light source coupled to the tube proximate the second end of the tube;

an optical light dispersing device coupled to the tube proximate the second end of the tube and configured to disperse light from the supplemental light source toward the interior of the building; and a transceiver operably coupled to the supplemental light source, the transceiver configured to receive a wireless signal for variable control of the supplemental light source in response to an ambient light level in the interior of the building.

37. The lighting device of claim 36 wherein the optical light dispersing device comprises a reflector.

38. The lighting device of claim 37 wherein the reflector is arranged in the form of a skirt disposed about the tube adjacent to the supplemental light source.

39. A lighting device, comprising:

a tube defining an interior and an exterior, and a longitudinal axis extending between a first end and a second end, the first end of the tube configured to receive light from an exterior light source, and the second end of the tube configured to emit at least a portion of the light to an interior of a building;

a substantially transparent dome coupled to the tube proximate the first end;

a reflective surface disposed on the interior of the tube;

a supplemental light source coupled to the tube proximate the second end of the tube; and an optical light dispersing device coupled to the tube proximate the second end of the tube and configured to disperse light from the supplemental light source toward the interior of the building;

wherein the supplemental light source comprises a plurality of LEDs coupled to a supplemental mounting surface that is attached substantially about a perimeter of the tube.

40. The lighting device of claim 39 wherein the supplemental mounting surface comprises a band attached to the tube.

41. The lighting device of claim 39 wherein the LEDs provide a source of indirect lighting by emitting light in a radially outward direction toward the reflector for dispersion by the reflector toward the interior of the building.

42. The lighting device of claim 39 further comprising a layer of a high emissivity material disposed on at least one of the tube, the supplemental mounting surface, and the reflector proximate the LEDs.

43. The lighting device of claim 39 further comprising a photovoltaic device configured to provide a source of electrical power to the LEDs.

44. The lighting device of claim 43 wherein the photovoltaic device is coupled to the tube.

45. A lighting device, comprising:

a tube defining an interior and an exterior, and a longitudinal axis extending between a first end and a second end, the first end of the tube configured to receive light from an exterior light source, and the second end of the tube configured to emit at least a portion of the light to an interior of a building;

a substantially transparent dome coupled to the tube proximate the first end;

a reflective surface disposed on the interior of the tube;

a supplemental light source coupled to the tube proximate the second end of the tube;

an optical light dispersing device coupled to the tube proximate the second end of the tube and configured to disperse light from the supplemental light source toward the interior of the building; and a diffuser coupled to the tube proximate the second end of the tube.

46. A lighting device, comprising:

a tube defining an interior and an exterior, and a longitudinal axis extending between a first end and a second end, the first end of the tube configured to receive light from an exterior light source, and the second end of the tube configured to emit at least a portion of the light to an interior of a building;

a reflective surface disposed on the interior of the tube;

a flashing disposed about the exterior of the tube;

a substantially transparent dome coupled to the tube proximate the first end;

a conical skirt disposed proximate the second end of the tube; and a reflective surface disposed on an interior surface of the conical skirt;

wherein the conical skirt is at least partially defined by a segment of a cone;

wherein the conical skirt has a first end coupled proximate the second end of the tube and a second end extending toward the interior of the building.

47. The lighting device of claim 46 wherein the conical skirt is configured to further direct the portion of the light emitted from the second end of the tube toward the interior of the building.

48. The lighting device of claim 46 wherein a plane defined by the second end of the tube is angled with respect to a plane defined by the first end of the tube.

49. The lighting device of claim 46 wherein the tube defines a substantially cylindrical first portion of a passage for the light and the conical skirt defines a substantially non-cylindrical second portion of the passage for emitting the light to the interior of the building.

* * * * *